United States Patent
Cross et al.

(10) Patent No.: US 12,452,290 B2
(45) Date of Patent: *Oct. 21, 2025

(54) SECURITY MODEL UTILIZING MULTI-CHANNEL DATA WITH VULNERABILITY REMEDIATION CIRCUITRY

(71) Applicant: Wells Fargo Bank, N.A., San Francisco, CA (US)

(72) Inventors: Shane Cross, Matthews, NC (US); Daniel Fricano, San Francisco, CA (US); Thomas Gilheany, San Francisco, CA (US); Peter Anatole Makohon, Charlotte, NC (US); Dale Miller, San Francisco, CA (US); Charles Steven Edison, San Francisco, CA (US); Kodzo Wegba, San Francisco, CA (US); James Bonk, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,234

(22) Filed: Jun. 13, 2024

(65) Prior Publication Data

US 2024/0333753 A1 Oct. 3, 2024

Related U.S. Application Data

(63) Continuation of application No. 17/129,801, filed on Dec. 21, 2020, now Pat. No. 12,015,630, which is a
(Continued)

(51) Int. Cl.
*H04L 9/40* (2022.01)
*H04L 43/045* (2022.01)

(52) U.S. Cl.
CPC ........ *H04L 63/1433* (2013.01); *H04L 43/045* (2013.01); *H04L 63/1425* (2013.01); *H04L 63/18* (2013.01)

(58) Field of Classification Search
CPC ............. H04L 63/1433; H04L 63/1425; H04L 63/18; H04L 43/045
See application file for complete search history.

(56) References Cited

U.S. PATENT DOCUMENTS

| | | | |
|---|---|---|---|
| 5,898,780 | A | 4/1999 | Liu et al. |
| 6,266,695 | B1 | 7/2001 | Huang et al. |

(Continued)

FOREIGN PATENT DOCUMENTS

| | | |
|---|---|---|
| CA | 111865941 A | 10/2020 |
| CN | 105743880 A | 7/2016 |

(Continued)

OTHER PUBLICATIONS

Allodi & Massacci, "Security Events and Vulnerability Data for Cybersecurity Risk Estimation," Risk Analysis 37(8), pp. 1606-1627 (2017).
(Continued)

*Primary Examiner* — Sarah Su
(74) *Attorney, Agent, or Firm* — Foley & Lardner LLP

(57) ABSTRACT

A system includes a data channel configured to provide device connectivity data associated with an entity, a data channel communication network configured to communicate the device connectivity data from the data channel, and a processing circuit communicatively coupled to the data channel via the data channel communication network. The processing circuit is structured to identify a vulnerability associated with a property of the device connectivity data, generate a scanner uniform resource locator (URL) based on the property of the device connectivity data, the scanner
(Continued)

URL including a parametrized scanner executable structured to accept as a parameter at least a part of the property of the device connectivity data, and transmit the scanner URL to a computing system.

20 Claims, 21 Drawing Sheets

Related U.S. Application Data continuation-in-part of application No. 17/081,275, filed on Oct. 27, 2020, now Pat. No. 11,706,241.

(60) Provisional application No. 63/007,045, filed on Apr. 8, 2020.

(56) References Cited

U.S. PATENT DOCUMENTS

| | | |
|---|---|---|
| 6,282,546 B1 | 8/2001 | Gleichauf et al. |
| 7,284,274 B1 | 10/2007 | Walls et al. |
| 7,676,841 B2 | 3/2010 | Sobchuk et al. |
| 7,756,989 B2 | 7/2010 | Goldszmidt et al. |
| 7,849,507 B1 | 12/2010 | Bloch et al. |
| 7,864,700 B2 | 1/2011 | Shepard et al. |
| 7,870,243 B1 | 1/2011 | Aikens et al. |
| 7,983,189 B2 | 7/2011 | Bugenhagen |
| 8,028,066 B2 | 9/2011 | Lewis |
| 8,121,049 B2 | 2/2012 | Lidstrom et al. |
| 8,832,832 B1 | 9/2014 | Visbal |
| 8,856,023 B2 | 10/2014 | Bantz et al. |
| 8,898,784 B1 | 11/2014 | Alexander et al. |
| 9,088,615 B1 | 7/2015 | Avlasov et al. |
| 9,166,999 B1 | 10/2015 | Kulkarni |
| 9,294,498 B1 | 3/2016 | Yampolskiy et al. |
| 9,306,965 B1 | 4/2016 | Grossman et al. |
| 9,392,003 B2 | 7/2016 | Amsler |
| 9,401,851 B2 | 7/2016 | Kakadia et al. |
| 9,401,926 B1 | 7/2016 | Dubow et al. |
| 9,432,389 B1 | 8/2016 | Khalid et al. |
| 9,461,897 B1 | 10/2016 | Babcock et al. |
| 9,686,150 B2 | 6/2017 | Gesmann |
| 9,686,308 B1 | 6/2017 | Srivastava |
| 9,703,851 B2 | 7/2017 | Ramesh et al. |
| 9,742,793 B2 | 8/2017 | Bryant et al. |
| 9,794,145 B2 | 10/2017 | Vasseur et al. |
| 9,811,667 B2 | 11/2017 | Hugard et al. |
| 9,819,626 B1 | 11/2017 | Berg et al. |
| 9,921,942 B1 | 3/2018 | Makohon et al. |
| 9,935,865 B2 | 4/2018 | Ganesan et al. |
| 9,973,524 B2 | 5/2018 | Boyer et al. |
| 9,973,892 B1 | 5/2018 | Parshin et al. |
| 10,091,220 B2 | 10/2018 | Shabtai et al. |
| 10,104,109 B2 | 10/2018 | Singla et al. |
| 10,198,581 B2 | 2/2019 | Sreenivas et al. |
| 10,218,736 B2 | 2/2019 | Ng et al. |
| 10,277,619 B1 | 4/2019 | Clark et al. |
| 10,289,973 B2 | 5/2019 | Feller et al. |
| 10,360,525 B1 | 7/2019 | Milden et al. |
| 10,382,491 B2 | 8/2019 | Digiambattista et al. |
| 10,410,158 B1 | 9/2019 | Yumer et al. |
| 10,496,816 B2 | 12/2019 | Iyer et al. |
| 10,498,756 B2 | 12/2019 | Yampolskiy et al. |
| 10,515,328 B2 | 12/2019 | Rasumov |
| 10,530,666 B2 | 1/2020 | Venkitapathi et al. |
| 10,601,854 B2 | 3/2020 | Lokamathe et al. |
| 10,802,858 B2 | 10/2020 | Gunda |
| 10,812,518 B1 | 10/2020 | Belton et al. |
| 10,956,849 B2 | 3/2021 | Wu et al. |
| 11,178,007 B1 | 11/2021 | Belton et al. |
| 11,451,572 B2 | 9/2022 | Yampolskiy et al. |
| 11,522,898 B1 | 12/2022 | Belton et al. |
| 11,551,293 B1 | 1/2023 | Soccorsy et al. |
| 11,636,213 B1 | 4/2023 | Elgressy et al. |
| 11,652,828 B1 | 5/2023 | Fricano et al. |
| 11,706,241 B1 | 7/2023 | Cross et al. |
| 11,720,686 B1* | 8/2023 | Cross ............... G06F 9/455 726/25 |
| 11,777,992 B1* | 10/2023 | Cross ............... H04L 63/0876 726/5 |
| 11,824,885 B1 | 11/2023 | Belton |
| 12,015,630 B1* | 6/2024 | Cross ............... H04L 63/1433 |
| 12,126,644 B2* | 10/2024 | Seetharamaiah ... H04L 63/1425 |
| 2003/0083938 A1 | 5/2003 | Smith et al. |
| 2003/0167405 A1 | 9/2003 | Freund et al. |
| 2004/0209634 A1 | 10/2004 | Hrastar |
| 2007/0113100 A2 | 5/2007 | Oliphant |
| 2007/0136200 A1 | 6/2007 | Frank et al. |
| 2008/0222283 A1 | 9/2008 | Ertugrul et al. |
| 2009/0193007 A1 | 7/2009 | Mastalli et al. |
| 2010/0082379 A1 | 4/2010 | Chan et al. |
| 2011/0243553 A1 | 10/2011 | Russell |
| 2011/0317559 A1 | 12/2011 | Kern et al. |
| 2012/0158944 A1 | 6/2012 | Tiwari et al. |
| 2012/0232948 A1 | 9/2012 | Wolf et al. |
| 2012/0254671 A1 | 10/2012 | Francisco et al. |
| 2012/0304300 A1 | 11/2012 | Labumbard |
| 2013/0041713 A1 | 2/2013 | Henrich et al. |
| 2014/0082739 A1 | 3/2014 | Chess et al. |
| 2014/0115514 A1 | 4/2014 | Hackborn et al. |
| 2014/0181892 A1 | 6/2014 | Von Bokern et al. |
| 2014/0223464 A1 | 8/2014 | Moran et al. |
| 2014/0317730 A1 | 10/2014 | Ashley et al. |
| 2015/0033349 A1 | 1/2015 | Oliphant et al. |
| 2015/0134618 A1 | 5/2015 | Teterin et al. |
| 2015/0172204 A1 | 6/2015 | Anderson et al. |
| 2015/0195154 A1 | 7/2015 | Hevizi et al. |
| 2015/0215334 A1* | 7/2015 | Bingham ............ H04L 63/1425 726/23 |
| 2015/0281004 A1 | 10/2015 | Kakadia et al. |
| 2016/0171415 A1 | 6/2016 | Yampolskiy et al. |
| 2016/0212176 A1 | 7/2016 | Lango et al. |
| 2016/0248797 A1 | 8/2016 | Yampolskiy et al. |
| 2016/0261624 A1 | 9/2016 | Berger et al. |
| 2016/0380843 A1 | 12/2016 | Duncan et al. |
| 2017/0034023 A1 | 2/2017 | Nickolov et al. |
| 2017/0220964 A1 | 8/2017 | Datta Ray |
| 2017/0295181 A1 | 10/2017 | Parimi et al. |
| 2018/0013769 A1 | 1/2018 | Robinson et al. |
| 2018/0032736 A1 | 2/2018 | Inagaki et al. |
| 2018/0048534 A1 | 2/2018 | Banga et al. |
| 2018/0077573 A1 | 3/2018 | Werdell et al. |
| 2018/0084060 A1 | 3/2018 | Xie et al. |
| 2018/0091558 A1 | 3/2018 | Daugherty et al. |
| 2018/0129989 A1 | 5/2018 | Bowers |
| 2018/0219833 A1 | 8/2018 | Reddy |
| 2018/0295154 A1 | 10/2018 | Crabtree et al. |
| 2018/0352025 A1 | 12/2018 | Anya et al. |
| 2018/0375735 A1 | 12/2018 | Hale |
| 2018/0375892 A1 | 12/2018 | Ganor |
| 2018/0376329 A1 | 12/2018 | Gapastione et al. |
| 2019/0132323 A1 | 5/2019 | Williams |
| 2019/0222553 A1 | 7/2019 | Wu et al. |
| 2019/0223125 A1 | 7/2019 | Simon |
| 2019/0253447 A1 | 8/2019 | Sweeney et al. |
| 2019/0266529 A1 | 8/2019 | Barday et al. |
| 2019/0268366 A1 | 8/2019 | Zeng et al. |
| 2019/0268377 A1 | 8/2019 | Parry |
| 2019/0306731 A1 | 10/2019 | Raghuramu et al. |
| 2020/0012796 A1 | 1/2020 | Trepagnier et al. |
| 2020/0034762 A1 | 1/2020 | Rasumov |
| 2020/0034763 A1 | 1/2020 | Rasumov |
| 2020/0068031 A1 | 2/2020 | Kursun et al. |
| 2020/0076835 A1 | 3/2020 | Ladnai et al. |
| 2020/0076853 A1 | 3/2020 | Pandian et al. |
| 2020/0077265 A1 | 3/2020 | Singh et al. |
| 2020/0089887 A1 | 3/2020 | Luthra et al. |
| 2020/0092319 A1 | 3/2020 | Spisak et al. |
| 2020/0097880 A1 | 3/2020 | Agarwal et al. |
| 2020/0112586 A1* | 4/2020 | Cooper ............... H04L 12/283 |
| 2020/0169477 A1 | 5/2020 | Gottschalk et al. |
| 2020/0195673 A1 | 6/2020 | Lee |
| 2020/0274902 A1 | 8/2020 | Gopal et al. |
| 2020/0287813 A1 | 9/2020 | Kutch et al. |

(56) References Cited

U.S. PATENT DOCUMENTS

| | | | |
|---|---|---|---|
| 2020/0296136 A1 | 9/2020 | Liu et al. |
| 2020/0311298 A1 | 10/2020 | Dunjic et al. |
| 2020/0394309 A1 | 12/2020 | Angelo et al. |
| 2021/0012288 A1 | 1/2021 | Mroczka |
| 2021/0014252 A1 | 1/2021 | Usher et al. |
| 2021/0035116 A1 | 2/2021 | Berrington et al. |
| 2021/0044611 A1 | 2/2021 | Norrie |
| 2021/0058422 A1 | 2/2021 | Obrecht et al. |
| 2021/0064420 A1 | 3/2021 | Goudarzi et al. |
| 2021/0064758 A1 | 3/2021 | Zettel et al. |
| 2021/0075678 A1 | 3/2021 | Seetharaman et al. |
| 2021/0099454 A1 | 4/2021 | Rahimi et al. |
| 2021/0136089 A1 | 5/2021 | Costea et al. |
| 2021/0176270 A1 | 6/2021 | Yampolskiy et al. |
| 2021/0185565 A1 | 6/2021 | Kalderen et al. |
| 2021/0194851 A1 | 6/2021 | Barton et al. |
| 2021/0203673 A1 | 7/2021 | Dos Santos et al. |
| 2021/0211347 A1 | 7/2021 | Vasseur et al. |
| 2021/0216928 A1 | 7/2021 | O'Toole et al. |
| 2021/0306341 A1 | 9/2021 | Tiwari et al. |
| 2021/0392154 A1 | 12/2021 | Waplington |
| 2022/0012990 A1 | 1/2022 | Tortola et al. |
| 2022/0035905 A1 | 2/2022 | Lu et al. |
| 2022/0150271 A1 | 5/2022 | Shah |
| 2022/0201009 A1 | 6/2022 | Dhoble et al. |
| 2022/0255926 A1 | 8/2022 | Crabtree et al. |
| 2022/0261483 A1 | 8/2022 | Tam et al. |
| 2022/0292189 A1 | 9/2022 | Silberman et al. |
| 2022/0294816 A1 | 9/2022 | Martin et al. |
| 2022/0400131 A1 | 12/2022 | Shao et al. |
| 2023/0087052 A1 | 3/2023 | Korja et al. |
| 2023/0113375 A1 | 4/2023 | Thomas et al. |
| 2023/0153443 A1 | 5/2023 | Coppins et al. |
| 2023/0229785 A1 | 7/2023 | Jurado et al. |
| 2023/0247042 A1 | 8/2023 | Luttwak et al. |
| 2023/0291754 A1 | 9/2023 | Fricano et al. |
| 2023/0300165 A1* | 9/2023 | Fricano | H04L 63/20 726/25 |
| 2023/0344856 A1 | 10/2023 | Mosko et al. |
| 2023/0379359 A1* | 11/2023 | Nakano | G06F 16/9566 |
| 2023/0388306 A1 | 11/2023 | Kaji et al. |
| 2024/0015185 A1 | 1/2024 | Cross et al. |
| 2024/0346151 A1 | 10/2024 | Goswami et al. |

FOREIGN PATENT DOCUMENTS

| | | | | |
|---|---|---|---|---|
| CN | 107347076 A | * | 11/2017 | G06F 21/577 |
| CN | 108881129 A | * | 11/2018 | |
| CN | 109274632 A | * | 1/2019 | H01L 63/101 |
| CN | 110119620 A | | 8/2019 | |
| CN | 110708296 A | | 1/2020 | |
| CN | 111756702 A | | 10/2020 | |
| CN | 111756718 A | | 10/2020 | |
| CN | 112261708 A | | 1/2021 | |
| CN | 112419074 A | | 2/2021 | |
| CN | 115345401 A | | 11/2022 | |
| CN | 115603992 A | * | 1/2023 | |
| CN | 115994363 A | | 4/2023 | |
| CN | 116132161 A | | 5/2023 | |
| CN | 116614418 A | | 8/2023 | |
| CN | 116980159 A | | 10/2023 | |
| CN | 117494092 A | | 2/2024 | |
| CN | 117787714 A | | 3/2024 | |
| CN | 118018229 A | * | 5/2024 | |
| CN | 118337485 A | * | 7/2024 | H04L 63/02 |
| CN | 118451688 A | * | 8/2024 | H04L 63/1416 |
| EP | 2 323 429 A2 | | 5/2011 | |
| EP | 2 985 715 A1 | | 2/2016 | |
| EP | 2985974 A1 | * | 2/2016 | H04L 61/5007 |
| EP | 3 770 786 A1 | | 1/2021 | |
| KR | 20220066114 A | | 3/2022 | |
| PT | 3151505 T | | 5/2015 | |
| WO | WO-01/59989 A2 | | 8/2001 | |
| WO | WO-03/075125 A2 | | 9/2003 | |
| WO | WO-2005/064854 A1 | | 7/2005 | |
| WO | WO-2005/109212 A2 | | 11/2005 | |
| WO | WO-2007/010541 A2 | | 1/2007 | |
| WO | WO-2008/103286 A2 | | 8/2008 | |
| WO | WO-2013/166126 A1 | | 11/2013 | |
| WO | WO-2015/084152 A1 | | 6/2015 | |
| WO | WO-2017/039506 A2 | | 3/2017 | |
| WO | WO-2017/081639 A2 | | 5/2017 | |
| WO | WO-2018/084808 A1 | | 5/2018 | |
| WO | WO-2018/223235 A1 | | 12/2018 | |
| WO | WO-2019/075795 A1 | | 4/2019 | |
| WO | WO-2019/121043 A1 | | 6/2019 | |
| WO | WO-2019/140876 A1 | | 7/2019 | |
| WO | WO-2019/190793 A1 | | 10/2019 | |
| WO | WO-2020/060503 A1 | | 3/2020 | |
| WO | WO-2020/176066 A1 | | 9/2020 | |
| WO | WO-2020/227335 A1 | | 11/2020 | |
| WO | WO-2021/081516 A1 | | 4/2021 | |
| WO | WO-2021/082966 A1 | | 5/2021 | |
| WO | WO-2021/158227 A1 | | 8/2021 | |
| WO | WO-2021/164872 A1 | | 8/2021 | |
| WO | WO-2021/183939 A1 | | 9/2021 | |
| WO | WO-2021/202833 A1 | | 10/2021 | |
| WO | WO-2021/243321 A1 | | 12/2021 | |
| WO | WO-2022/087510 A1 | | 4/2022 | |
| WO | WO-2023273152 A1 | * | 1/2023 | H04L 63/1416 |
| WO | WO-2024/186592 A1 | | 9/2024 | |

OTHER PUBLICATIONS

Informatica Documentation; "Key Performance Indicators" 2 pages dated Apr. 22, 2020: https://docs.informatica.com/data-integration/b2b-data-exchange/10-2-2/developer-guide/dashboard-and-reports/key-performance-indicators.html.

Oracle Help Center "Setting Up Performance Monitoring" 21 pages 2019.

ScienceLogic; "IT Performance Reporting & Dashboards" dated Apr. 22, 2020 https://sciencelogic.com/solutions/it-infrastructure-monitoring.

SecurityScorecard; "Vendor Security Risk Management" dated Apr. 22, 2020 8 pages https://securityscorecard.com/solutions/third-party-risk-management.

Tavabi, et al., "Challenges in Forecasting Malicious Events from Incomplete Data," WWW '20: Companion Proceedings of the Web Conference 2020, pp. 603-610 (2020).

Servicenow; "Service level management PA dashboard," 2025, Xanadu IT Service Management, 7 pages, Retrieved from https://www.servicenow.com/docs/bundle/xanadu-it-service-management/page/product/service-level-management/concept/slm-pa-dashboard.html.

* cited by examiner

605

| INTELLIGENCE | ITEM | DIMENSION | VALUE |
|---|---|---|---|
| | DEFAULT FOR NEWLY DISCOVERED ITEMS | INTELLIGENCE | 4 |
| | 0 - 90 DAYS | INTELLIGENCE | 9 |
| | 90 - 180 DAYS | INTELLIGENCE | 8 |

610

| TECHNOLOGY | ITEM | DIMENSION | VALUE |
|---|---|---|---|
| | SERVER 2007 | TECHNOLOGY | 7 |
| | WEBSITE.COM | TECHNOLOGY | 9 |
| | VENDOR.NET | TECHNOLOGY | 7 |

615

| PERIMETER | ITEM | DIMENSION | VALUE |
|---|---|---|---|
| | 2087/tcp | PERIMETER | 5 |
| | 22/tcp | PERIMETER | 9 |
| | 3306/tcp | PERIMETER | 9 |

620

| SECURITY CONTROLS | ITEM | DIMENSION | VALUE |
|---|---|---|---|
| | SECURITY FIRMWARE | CONTROLS | 5 |
| | EMAIL POLICY | CONTROLS | 4 |

625

| ATTACK SURFACE | ITEM | DISCOVERED INSTANCES |
|---|---|---|
| | 22/tcp | 3 |
| | IIS 6.0 | 1 |
| | INTELLIGENCE HIT: CVE Nnnnn | 2 |

| RISK SCORE: | LOW 0.0 - 3.9 | ELEVATED 4.0 - 6.9 | HIGH 7.0 - 10.0 | EMERGENCY >10 |
|---|---|---|---|---|

FIG. 6

REMEDIATION EXECUTABLES    WELCOME, VENDOR X!

LIST OF VULNERABILITIES

| COMPONENT | IP | PORT | VULNERABILITY | SEVERITY | FILTER BY: NONE | |
|---|---|---|---|---|---|---|
| MAIL | 1.2.3.4 | 22 | SSH PORT OPEN | LOW | FIX | VIEW |
| APPLICATION X | 1.2.4.3 | 75 | OUT OF DATE | MEDIUM | FIX | VIEW |
| APPLICATION Y | 1.3.2.4 | 38 | CRITICAL BUG | HIGH | FIX | VIEW |

FIG. 19

SECURITY MODEL UTILIZING MULTI-CHANNEL DATA WITH VULNERABILITY REMEDIATION CIRCUITRY

CROSS-REFERENCE TO RELATED PATENT APPLICATIONS

This application is a continuation of U.S. patent application Ser. No. 17/129,801, filed Dec. 21, 2020, which is a continuation-in-part of U.S. patent application Ser. No. 17/081,275, filed Oct. 27, 2020, now U.S. Pat. No. 11,706, 241, which claims the benefit of U.S. Provisional Patent Application No. 63/007,045, filed Apr. 8, 2020, each of which is incorporated by reference herein in its entirety.

TECHNICAL FIELD

The present disclosure relates generally to computer architecture and software for information security and cybersecurity. Cybersecurity systems and methods utilizing multi-channel data are described. A computer-based information security model utilizing multi-channel fusion is also described, as are the related system architecture and software.

BACKGROUND

In a computer networked environment such as the Internet, users and entities such as people or companies maintain data in computer systems connected to networks. The data, systems, and networks are prone to various security vulnerabilities, misconfigurations, and partial implementations, which may lead to cybersecurity vulnerabilities, which, in turn, may lead to cybersecurity attacks. Early and preemptive detection can prevent or minimize the impact of cybersecurity attacks. However, existing cybersecurity monitoring architectures and software limit insights into security vulnerabilities to a particular data plane, such as network, infrastructure, and/or application-related data, and to particular types of security events associated with the particular data plane. Further, such architectures and software require that lists of related computer assets be separately catalogued and maintained. Consequently, new vulnerabilities associated with changes in infrastructure or software ecosystems may be missed if the associated asset has not been timely identified by a security assurance framework.

SUMMARY

An embodiment relates to a computer system. The computer system includes a data channel configured to provide device connectivity data associated with an entity; a data channel communication network configured to communicate the device connectivity data from the data channel; and a processing circuit communicatively coupled to the data channel via the data channel communication network, the processing circuit structured to: identify a vulnerability associated with a property of the device connectivity data; generate a scanner uniform resource locator (URL) based on the property of the device connectivity data, the scanner URL comprising a parametrized scanner executable structured to accept as a parameter at least a part of the property of the device connectivity data; and transmit the scanner URL to a computing system.

An embodiment relates to a computer-implemented method. The method includes receiving device connectivity data associated with an entity; identifying a vulnerability associated with a property of the device connectivity data; generating a scanner uniform resource locator (URL) based on the property of the device connectivity data, the scanner URL comprising a parametrized scanner executable structured to accept as a parameter at least a part of the property of the device connectivity data; and transmitting the scanner URL to a computing system.

An embodiment relates to a non-transitory computer-readable media having instructions stored thereon that, when executed by a processor of a first computing system, cause the first computing system to perform operations comprising: receiving device connectivity data associated with an entity; identifying a vulnerability associated with a property of the device connectivity data; generating a scanner uniform resource locator (URL) based on the property of the device connectivity data, the scanner URL comprising a parametrized scanner executable structured to accept as a parameter at least a part of the property of the device connectivity data; and transmitting the scanner URL to a second computing system.

These and other features, together with the organization and manner of operation thereof, will become apparent from the following detailed description when taken in conjunction with the accompanying drawings.

BRIEF DESCRIPTION OF THE FIGURES

FIG. 6 is an example illustration of a plurality of scoring tables and a visibility table, according to some arrangements;

FIG. 19 is an example illustration of a first user-interactive graphical user interface for an entity-facing portal, according to some arrangements.

Figure 1:
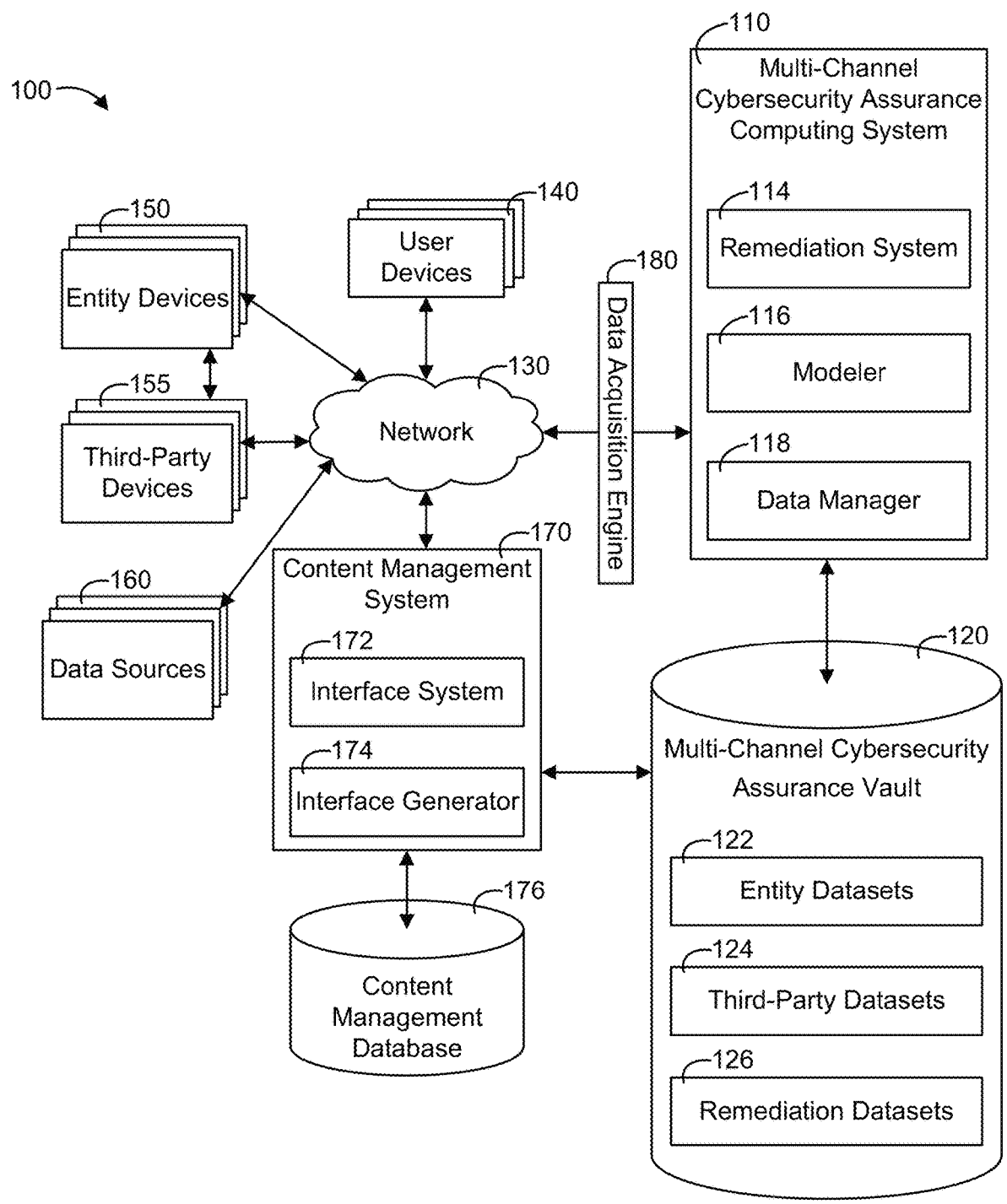
FIG. 1 is a block diagram depicting an example of a multi-channel cybersecurity assurance computing system and computing environment, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems and methods described herein relate generally to fusing multi-channel data based on a security model in a computer network environment. As used herein, the terms "fusing" or "fusion" (e.g., as in "data fusion", "pipeline fusion", "channel fusion") refer to computer-based systems and methods for programmatically enriching data by integrating data streams, data pipelines, data sets, etc. that are related to multi-channel cybersecurity assurance. In some arrangements, the multi-channel data fusion operations are based at least in part on a causal security model that can include entity data associated with an entity. The security data, which may include device connectivity data, software metadata, IP traffic data, etc., can be received from a plurality of data channels and can pertain to a plurality of computing devices. In general, entity data can be analyzed to detect cybersecurity vulnerabilities and/or threats such that cybersecurity risk scores can be generated and aggregated to generate a multi-dimensional score.

As used herein, a "cyber-incident" may be any incident where a party (e.g., user, individual, institution, company) gains unauthorized access to perform unauthorized actions in a computer network environment. A cyber-incident may result from a cybersecurity vulnerability. In many systems, cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices) can go undetected and unaddressed, leading to hacking activities, data breaches, cyberattacks (e.g., phishing attacks, malware attacks, web attacks, and artificial intelligence (AI)-powered attacks), and other detrimental cyber-incidents.

Accordingly, the ability to avoid and prevent cyber threats, such as hacking activities, data breaches, and cyber-attacks, provides entities and users (e.g., provider, institution, individual, and company) improved cybersecurity by fusing multi-channel data associated with entities and users. In particular, fusing multi-channel data can improve the protection of customer data (e.g., sensitive data such as medical records and financial information), protection of products (e.g., proprietary business data such as plans, code and other intellectual property, and strategies), protection of reputation (e.g., customer confidence and market praise), and reduction of financial cost (e.g., falling stock price as result of a data breach, investigation and forensic efforts as a result of a cyberattacks, and legal fees incurred as a result of hacking activities). The causal design and execution of cybersecurity models for detecting and addressing cybersecurity vulnerabilities helps dynamically monitor and discover relationships (e.g., network relationships, hardware relationships, device relationships and financial relationships) between entities and users. The causal approach to multi-channel data and/or pipeline fusion allows cybersecurity models to provide significant improvements to cybersecurity of entities and users by improving network security, infrastructure security, technology security, and data security.

Further, quantifying cybersecurity for entities and users, identifying specific vulnerabilities and mapping them to specific assets provides the technical benefit of generating automatic remediation recommendations and avoiding and preventing successful hacking activities, successful cyber-attacks, data breaches, and other detrimental cyber-incidents. As described herein, the systems and methods of the present disclosure may include generating and exposing to the affected systems access-controlled remediation-related executables. An additional benefit from quantifying cybersecurity risks is automated or automatically-assisted triage of weaknesses, which optimizes the usage of limited resources to achieve rapid technology risk reduction over a given timeframe.

Further, the present disclosure presents a technical improvement of dynamic infrastructure discovery. For example, assets associated with a particular infrastructure can be automatically discovered in the process of fusing multi-channel security data without the need to maintain separate catalogues of network assets, infrastructure assets, operating systems, etc. for a target entity. In some embodiments, the data and/or pipeline fusion operations include scanning for vulnerabilities associated with a particular entity or device identifier, such as a domain identifier (e.g., a top-level domain (TLD) identifier, a subdomain identifier, or a URL string pointing to a particular directory), an IP address, a subnet, etc. Consequently, instead of separately scanning each subclass of assets, a computing system can utilize a fused communication pipeline view into a computing environment of a particular target entity (e.g., via the data acquisition engine 180 of FIG. 1) and centrally manage discovery of different types of assets and associated vulnerabilities—for example, by causing a scan of the relevant components to be initiated in a single operation. The scanning operations, described further herein, may comprise computer-executed operations to identify device connectivity data and/or IP traffic data associated with an entity, determine vulnerabilities based on parsing the device connectivity data and/or IP traffic data and linking the parsed items to various sources of known breach data (e.g., via the data fusion process), and generating a user-interactive multidimensional reporting and scoring interface with links to remediation items and related computer executables.

Referring now to FIG. 1, a block diagram depicting an example of a multi-channel cybersecurity assurance system 110 and a computing environment 100 is shown, according to some arrangements. As shown, the environment 100 comprises the multi-channel cybersecurity assurance system 110, which includes a multi-channel cybersecurity assurance vault 120. The multi-channel cybersecurity assurance system 110 is communicatively coupled, via the data acquisition engine 180, to a plurality of devices 140, 150 and 155, data sources 160 and the content management system 170. The devices 140, 150 and 155 and/or the data sources 160 may initiate and/or route (e.g., provide) device connectivity data, IP traffic data and other types of data, such as additional intelligence data that can be fused by the multi-channel cybersecurity assurance system 110. The content management system 170 can be used to deliver the data fusion outputs (e.g., in the form of various security scores and/or remediation executables) generated by the multi-channel cybersecurity assurance system 110. The data sources 160 may provide data via various separate communication pipelines (e.g., network channels, data communication channels), which may be consolidated (fused) by the data acquisition engine 180 to simplify the management of scanning executables by the multi-channel cybersecurity assurance system 110. For example, the data acquisition engine 180 may provide a single API to access various data generated or routed by devices 140, 150 and 155 and/or by the data sources 160. As described further herein, the devices 140, 150 and 155 may provide device connectivity data, IP traffic data and other system-related data, whereas the data sources 160 are additional data sources that may provide additional intelligence data.

Referring to FIG. 1, the multi-channel cybersecurity assurance system 110 is shown to include a remediation system 114, a modeler 116, and a data manager 118. The computing environment 100 is shown to include a multi-channel cybersecurity assurance vault 120, entity datasets 122, third-party datasets 124, remediation datasets 126, a network 130, one or more user devices 140, one or more entity devices 150, one or more third-party devices 155, one or more data sources 160, a content management system 170, an interface system 172, an interface generator 174, and a content management database 176. These computing systems can include at least one processor (e.g., a physical processor and/or a virtualized processor) and at least one memory (e.g., a memory device and/or virtualized memory).

In general, one or more processing circuits included in the various systems described herein can include a microprocessor, an application specific integrated circuit (ASIC), a field-programmable gate array (FPGA), or combinations thereof. A memory can include electronic, optical, magnetic, or any other storage or transmission device capable of providing the processor with program instructions stored in the memory. Instructions can include executable code from any suitable computer programming language. The memory may store machine instructions that, when executed by the processing circuit, cause the processing circuit to perform one or more of the operations described herein. The memory may also store parameter data to affect presentation of one or more resources, animated content items, etc. on the computing device. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language such as ActionScript®, C, C++, C#, Java®, JavaScript®, JSON, Perl®, HTML, HTML5, XML, Python®, and Visual Basic®.

The operations described in this disclosure can be implemented as operations performed by a data processing apparatus on data stored on one or more computer-readable storage devices or received from other sources. The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can include various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A computer program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output.

In some arrangements, one or more processing circuits can be configured to load instructions from the main memory (or from data storage) into cache memory. Furthermore, the one or more processing circuits can be configured to load instructions from cache memory into onboard registers and execute instructions from the onboard registers. In some implementations, instructions are encoded in and read from a read-only memory (ROM) or from a firmware memory chip (e.g., storing instructions for a Basic I/O System (BIOS)).

The one or more processing circuits can be connected to the cache memory. However, in some implementations, the cache memory can be integrated into the one or more processing circuits and/or implemented on the same circuit or chip as the one or more processing circuits. Some implementations include multiple layers or levels of cache memory, each further removed from the one or more processing circuits. Some implementations include multiple processing circuits and/or coprocessors that augment the one or more processing circuits with support for additional specialized instructions (e.g., a math coprocessor, a floating point coprocessor, and/or a graphics coprocessor). The coprocessor can be closely connected to the one or more processing circuits. However, in some arrangements, the coprocessor is integrated into the one or more processing circuits or implemented on the same circuit or chip as the one or more processing circuits. In some implementations, the coprocessor is further removed from the one or more processing circuits, e.g., connected to a bus. Details regarding processing circuits, memory, and instructions are further explained in detail with reference to FIG. 11.

The computing system can include clients and servers. A client and server are generally remote from each other and typically interact through a communication network. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device at the server.

To provide for interaction with a user, arrangements of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by electronically transmitting documents to and receiving documents from a device that is used by the user; for example, by electronically transmitting web pages to a web browser on a user's client device in response to requests received from the web browser.

Further referring to the components of FIG. 1, one or more entity devices 150 may be used by an entity to perform various actions and/or access various types of data, some of which may be provided over a network 130 (e.g., the Internet, LAN, WAN). An "entity" as used herein may refer to an individual operating one or more entity devices 150 and interacting with resources or data via the entity devices 150. The entity devices 150 may be used to electronically transmit data (e.g., entity data) to the user devices 140, multi-channel cybersecurity assurance system 110, and/or content management system 170. The entity devices 150 can also be used to access websites (e.g., using an Internet browser), cybersecurity risk scores, and user-interactive graphical interfaces (e.g., security dashboard), and/or to receive any other type of data. In one example, an entity associated with an entity device 150 can perform and execute instructions on the content management system 170, multi-channel cybersecurity assurance system 110, and/or multi-channel cybersecurity assurance vault 120. In various arrangements, the entity can use the systems and methods of the present disclosure to monitor computing devices that the entity utilizes, and/or to monitor computing devices of third parties.

One or more third-party devices 155 may be used by a third-party with a relationship to an entity (e.g., provider, vendor, supplier, business partner, a monitored network entity and so on) to perform various actions and/or access various types of data, some of which may be provided over network 130. A "third party" as used herein may refer to an individual operating one or more third-party devices 155, interacting with resources or data via the third-party devices 155. In some arrangements, the third parties can include an organization's partner institutions and/or vendors. The third-party devices 155 may be used to electronically transmit data (e.g., entity data) to the user devices 140, multi-channel cybersecurity assurance system 110, and/or content management system 170, to access websites (e.g., using a browser), supply services, supply products, and to receive and/or transmit any other types of data. For example, a third party can be a statement printing vendor of a financial institution. In another example, a third party could be a credit scoring data vendor of a financial institution. In another example, a third party can be a technology vendor of a financial institution.

One or more user devices 140 (e.g., smartphones, tablets, computers, or smartwatches) may be used by a user to perform various actions and/or access various types of data, some of which may be provided over the network 130. A "user" as used herein may refer to an individual operating one or more user devices 140 and interacting with resources or data via the user devices 140. The user devices 140 may be used to electronically transmit data (e.g., entity data) to other user devices 140, multi-channel cybersecurity assurance system 110, and/or content management system 170. The user devices 140 may also be used to access websites (e.g., using a browser), cybersecurity risk scores, and user-interactive graphical interfaces (e.g., security dashboard), and used to receive any other types of data. In some arrangements, the entity devices 150 and/or user devices 140 have enabled location services which can be tracked over network 130. Location services may use a global positioning system (GPS) or other technologies to determine a location of the entity devices 150 and/or user devices 140. In some arrangements, location information can be used to populate or determine location-related properties of the device connectivity data used by the multi-channel cybersecurity assurance system 110.

In various arrangements, internal users of the multi-channel cybersecurity assurance system 110 may have various levels of access to perform operations and review information (e.g., configure dashboards, determine remediation recommendations, analyze cybersecurity performance). In some arrangements, external users of the multi-channel cybersecurity assurance system 110 may have various levels of access to perform operations and review information (e.g., restricted access, access and review dashboards, review remediation recommendation, review cybersecurity vendor performance). Using a username and credentials, a user (e.g., internal or external) may gain access to perform various operations and review various information. Permissions associated with a user can be used to determine the data that a user has access to. That is, permissions can be used to define the access level for each user. For example, a certain dashboard can be generated that is only accessible to the internal users that have permissions to access the certain dashboard. In some arrangements, permissions can be user-specific and/or each user can have separate and distinct accounts.

Further with respect to the components of FIG. 1, the network 130 may include a local area network (LAN), a wide area network (WAN), a telephone network, such as the Public Switched Telephone Network (PSTN), a wireless link, an intranet, the Internet, or combinations thereof. The multi-channel cybersecurity assurance system 110 and computing environment 100 can also include at least one data processing system or processing circuit, such as entity devices 150 and/or multi-channel cybersecurity assurance system 110. The multi-channel cybersecurity assurance system 110 can communicate via the network 130, for example with multi-channel cybersecurity assurance vault 120, user devices 140, entity devices 150, third-party devices 155, data sources 160, content management system 170, and/or data acquisition engine 180.

The network 130 can enable communication between various nodes, such as the multi-channel security assurance computing system 110 and entity devices 150. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or Ipv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 130 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5 or Cat-6, etc.) and/or wireless links (e.g., radio, satellite, microwave, etc.).

The network 130 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 130 can include short-range wireless links, e.g., via Wi-Fi, BLUETOOTH, BLE, or ZIGBEE, sometimes referred to as a personal area network (PAN) or mesh network. The network 130 may be public, private, or a combination of public and private networks. The network 130 may be any type and/or form of data network and/or communication network.

The network 130 can include a network interface controller that can manage data exchanges with devices in the network 130 (e.g., the user devices 140) via a network interface (sometimes referred to as a network interface port). The network interface controller handles the physical and data link layers of the Open Systems Interconnection (OSI) model for network communication. In some arrangements, some of the network interface controller's tasks are handled by one or more processing circuits. In various arrangements, the network interface controller is incorporated into the one or more processing circuits, e.g., as circuitry on the same chip.

In some arrangements, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various arrangements, the network interface controller implements one or more network protocols such as Ethernet. Generally, the multi-channel cybersecurity assurance system 110 can be configured to exchange data with other computing devices via physical or wireless links through a network interface. The network interface may link directly to another device or to another device via an intermediary device, e.g., a network device such as a hub, a bridge, a switch, or a router, connecting the multi-channel cybersecurity assurance system 110 to the network 130.

Expanding generally on network traffic and packets, the various computing devices described herein (e.g., 140, 150, 155, 160, 170) can originate and/or transmit traffic to the computing environment 100 and multi-channel cybersecurity assurance system 110, via the network 130. The term "traffic" generally refers to data communications between the computing devices and one or more components of the computing environment 100 shown in FIG. 1. For example, a user device (e.g., user devices 140) may submit requests to access various resources (e.g., applications, webpages, services, operating system management-related executables, file system management-related executables, system configuration-related executables) on a host within the computing environment 100 of FIG. 1. In another example, a user device can generate and/or transmit device connectivity data. Further, in an example arrangement described herein, a first device is a user device and a second device is a production host, such as an application server, a mail server, etc. The flow of traffic via the network 130 is multi-directional such that the first device may receive return traffic originated by the second device. The return traffic to the first device via the network 130 may include data responsive to user requests to access the resources on the respective computing system (e.g., on the second device).

Network traffic can be segmented into packets. Each packet is a formatted unit for the data and routing instructions carried via the network 130. As used herein, the term "packet" may refer to formatted units at various levels of the OSI networking and/or TCP/IP models, such that the terms "packet", "IP packet", "segment", "datagram", and "frame" may be used interchangeably. As used herein, the term "packet" can be used to denote monitored network traffic generated by a particular device associated with a monitored entity. However, one of skill will appreciate that information received and transmitted by the computing environment 100 and also be encoded in packets, such as TCP/IP packets.

An example packet includes a header, a footer, and a payload. In some arrangements, packets may also include metadata, which may include further routing information. For example, in some arrangements, packets may be routed via a software-defined networking switch, which may include in the packet further information (metadata) containing routing information for the software-defined networking environment. For example, in addition to a payload, application-layer and/or link-layer in an example packet, may contain a header and/or footer that may include a source address of the sending host (e.g., a user device), destination address of the target host, a source port, a destination port, a checksum or other error detection and correction information, packet priority, traffic class, and/or type of service (ToS), packet length, etc. In arrangements where the network 130 comprises one or more virtual local area networks (VLANs), such that, for example, the various computing devices are on different VLANs, the packet may also contain a VLAN identifier.

Any of the foregoing items in the packet can describe, at least in part, activity in a networked environment. In some arrangements, at least some of the foregoing items may be included in device connectivity data received via a search or discovery engine for Internet-connected devices, as described further herein. For example, an IP packet can include a host address (e.g., IP address) and/or a port number. Device connectivity data provided by a search or discovery engine for Internet-connected devices, can likewise include a property populated with an IP address assigned to a particular device and a port number assigned to a particular software application running on the device in addition to including further information.

Accordingly, any suitable packet and/or device connectivity data may be used by the multi-channel cybersecurity assurance system 110 to identify vulnerabilities in the associated systems (e.g., at the source system identified by the packet, at the destination system identified by the packet). For example, a header, a footer, and/or metadata of a packet may include routing information for the packet. As used herein, "routing information" is defined as source and/or destination information. For instance, in some arrangements, packet includes application-layer level routing information, such as HTTP routing information, TLS routing information, SSL routing information, SMTP routing information, etc. In some arrangements, packet includes transport and/or Internet-link level routing information, such as one or more routing identifiers specific to the TCP, UDP, SCTP, ICPMv4, ICMPv6 protocols, etc. In some arrangements, packet includes data link-layer routing information, such as a source MAC address, destination MAC address, VLAN ID, VLAN priority, etc. In the arrangement of FIG. 1, each packet also contains a payload (e.g., data carried on behalf of an application) encapsulated with routing information. As described further herein, various vulnerabilities may be associated with these various segments of data from particular packets.

Further with respect to the components of FIG. 1, a content management system 170 may be configured to generate content for displaying to users. The content can be selected from among various resources (e.g., webpages, applications). The content management system 170 is also structured to provide content (e.g., via a graphical user interface (GUI)) to the user devices 140 and/or entity devices 150, over the network 130, for display within the resources. For example, in various arrangements, a security dashboard may be integrated in an institution's application or provided via an Internet browser. The content from which the content management system 170 selects may be provided by the multi-channel cybersecurity assurance system 110 via the network 130 to one or more entity devices 150. In some implementations, the content management system 170 may select content to be displayed on the user devices 140. In such implementations, the content management system 170 may determine content to be generated and published in one or more content interfaces of resources (e.g., webpages, applications).

The content management system 170 may include one or more systems (e.g., computer-readable instructions executable by a processor) and/or circuits (e.g., ASICs, Processor Memory combinations, logic circuits) configured to perform various functions of the content management system 170. The content management system 170 can be run or otherwise be executed on one or more processors of a computing device, such as those described below in FIG. 11. In some implementations, the systems may be or include an interface system 172 and an interface generator 174. It should be understood that various implementations may include more, fewer, or different systems relative to those illustrated in FIG. 1, and all such modifications are contemplated within the scope of the present disclosure.

The content management system 170 can also be configured to query the content management database 176 and/or multi-channel cybersecurity assurance vault 120 for information and store information in content management database 176 and/or multi-channel cybersecurity assurance vault 120. In various arrangements, the content management database 176 includes various transitory and/or non-transitory storage media. The storage media may include magnetic storage, optical storage, flash storage, and RAM. The content management database 176 and/or the content management system 170 can use various APIs to perform database functions (e.g., managing data stored in content management database 176). The APIs can include SQL, NoSQL, NewSQL, ODBC, and/or JDBC components.

In some implementations, one or more client devices, e.g., instances of user devices 140, entity devices 150, third-party devices 155, and/or data sources 160, are in communication with a particular database management system (DBMS) or data storage vault, e.g., via a direct link or via the network 130. In some implementations, one or more clients obtain data from the DBMS using queries in a formal query language such as Structured Query Language (SQL), Hyper Text Structured Query Language (HTSQL), Contextual Query Language (CQL), Data Mining Extensions (DMX), or XML Query (Xquery). In some implementations, one or more clients obtain data from the DBMS using an interprocess communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more clients obtain data from the DBMS using natural language or semantic queries. In some implementations, one or more clients obtain data from the DBMS using queries in a custom query language such as a Visualization API Query Language. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus (including, e.g., a processor 1110). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

Further with respect to FIG. 1, the interface system 172 can be configured to provide one or more customized dashboards (e.g., stored in content management database 176) to one or more computing devices (e.g., user devices 140, entity devices 150, third-party devices 155, and/or multi-channel cybersecurity assurance system 110) for presentation. That is, the provided customized dashboards can execute and/or be displayed at the computing devices described herein. In some arrangements, the customized dashboards can be provided within a web browser. In some arrangements, the customized dashboards can comprise PDF files. In some arrangements, the customized dashboards can be provided via email. According to various arrangements, the customized dashboards can be provided on-demand or as part of push notifications. In various arrangements, the interface system 172 executes operations to provide the customized dashboards to the user devices 140, entity devices 150, third-party devices 155, and/or multi-channel cybersecurity assurance system 110 without utilizing the web browser. In various arrangements, the interface system 172 the customized dashboard can be provided within an application (e.g., mobile application, desktop application). The dashboard from which the content management system 170 generates (e.g., the interface generator 174) may be provided to one or more entities, via the network 130, to one or more entity devices 150. In some arrangements, the content management system 170 may select dashboards and/or security reports associated with the entity to be displayed on the user devices 140.

In an example arrangement, an application executed by the user devices 140, entity devices 150, third-party devices 155, and/or multi-channel cybersecurity assurance system 110 can cause the web browser to display on a monitor or screen of the computing devices. For example, the entity may connect (e.g., via the network 130) to a website structured to host the customized dashboards. In various arrangements, hosting the customized dashboard can include infrastructure such as host devices (e.g., computing device) and a collection of files defining the customized dashboard and stored on the host devices (e.g., in a database). The web browser operates by receiving input of a uniform resource locator (URL) into a field from an input device (e.g., a pointing device, a keyboard, a touchscreen, mobile phone, or another form of input device). In response, the interface system 172 executing the web browser may request data such as from the content management database 176. The web browser may include other functionalities, such as navigational controls (e.g., backward and forward buttons, home buttons). The interface system 172 may execute operations of the content management database 176 (or provide data from the content management database 176 to the user devices 140, entity devices 150, third-party devices 155, and/or multi-channel cybersecurity assurance system 110 for execution) to provide the customized dashboards at the user devices 140, entity devices 150, third-party devices 155, and/or multi-channel cybersecurity assurance system 110.

In some arrangements, the interface system 172 can include both a client-side application and a server-side application. For example, a client-side interface system 172 can be written in one or more general purpose programming languages (such as ActionScript®, C, C++, C#, Java®, JavaScript®, JSON, Perl®, Swift, HTML, HTML5, XML, Python®, and Visual Basic®) and can be executed by user devices 140, entity devices 150, and/or third-party devices 155. The server-side interface system 172 can be written, for example, in one or more general purpose programming languages (such as ActionScript®, C, C++, C#, Java®, JavaScript®, JSON, Perl®, Swift, HTML, HTML5, XML, Python®, and Visual Basic®), or a concurrent programming language, and can be executed by the multi-channel cybersecurity assurance system 110 and/or content management system 170.

The interface generator 174 can be configured to generate a plurality of customized dashboards and their properties, such as those described in detail below relative to example FIGS. 6-10. The interface generator 174 can generate customized user-interactive dashboards for one or more entities, such as the entity devices 150 and/or the third-party devices 155, based on data received from multi-channel cybersecurity assurance system 110, any other computing device described herein, and/or any database described herein (e.g., 120, 176). The generated dashboards can include various data (e.g., data stored in the content management database 176 and/or multi-channel cybersecurity assurance vault 120) associated with one or more entities including cybersecurity risk scores (e.g., intelligence, perimeter, technology, and/or security controls), multi-dimensional scores, remediation items, remediation actions/executables, security reports, data analytics, graphs, charts, historical data, historical trends, vulnerabilities, summaries, help information, line of business profiles, domain information, and/or subdomain information.

The content management system 170 can include at least one content management database 176. The content management database 176 can include data structures for storing information such as system definitions for customized dashboards generated via the interface generator 174, animated or other content items, and/or additional information. The content management database 176 can be part of the content management system 170, or a separate component that the content management system 170, the interface system 172, and/or the interface generator 174, can access via the network 130. The content management database 176 can also be distributed throughout the computing environment 100 and multi-channel cybersecurity assurance system 110. For example, the content management database 176 can include multiple databases associated with a specific entity (e.g., entity devices 150), a specific third-party (e.g., third-party devices 155), and/or a specific user device (e.g., user devices 140). In one arrangement, the content management system 170 includes the content management database 176.

The data sources 160 can provide data to the multi-channel cybersecurity assurance system 110. In some arrangements, the data sources 160 can be structured to collect data from other devices on network 130 (e.g., user devices 140, entity devices 150, and/or third-party devices 155) and relay the collected data to the multi-channel cybersecurity assurance system 110. In one example, an entity may have a server and database (e.g., proxy, enterprise resource planning (ERP) system) that stores network information associated with the entity. In this example, the multi-channel cybersecurity assurance system 110 may request data associated with specific data stored in the data source (e.g., data sources 160) of the entity. For example, in some arrangements, the data sources 160 can host or otherwise support a search or discovery engine for Internet-connected devices. The search or discovery engine may provide data, via the data acquisition engine 180, to the multi-channel cybersecurity assurance system 110. In some arrangements, the data sources 160 can be scanned to provide additional intelligence data. The additional intelligence data can include newsfeed data (e.g., articles, breaking news, and television content), social media data (e.g., Facebook, Twitter, Snapchat, and TikTok), geolocation data of users on the Internet (e.g., GPS, triangulation, and IP addresses), governmental databases (e.g., FBI databases, CIA databases, COVID-19 databases, No Fly List databases, terrorist databases, vulnerability database, and certificate databases), and/or any other intelligence data associated with the specific entity of interest.

The computing environment 100 can include a data acquisition engine 180. In various arrangements, the multi-channel cybersecurity assurance system 110 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 130) between the multi-channel cybersecurity assurance system 110, multi-channel cybersecurity assurance vault 120 and systems described herein (e.g., user devices 140, entity devices 150, third-party devices 155, data sources 160, content management system 170). The facilitation of communication can be implemented as an application programming interface (API) (e.g., REST API, Web API, customized API), batch files, and/or queries. In various arrangements, the data acquisition engine 180 can also be configured to control access to resources of the multi-channel cybersecurity assurance system 110 and multi-channel cybersecurity assurance vault 120.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language (e.g., Java, Ruby, C#), an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

In some arrangements, data is exchanged by components of the data acquisition engine 180 using web services. Where data is exchanged using an API configured to exchange web service messages, some or all components of the computing environment may include or may be associated with (e.g., as a client computing device) one or more web service node(s). The web service may be identifiable using a unique network address, such as an IP address, and/or a URL. Some or all components of the computing environment may include circuits structured to access and exchange data using one or more remote procedure call protocols, such as Java remote method invocation (RMI), Windows distributed component object model (DCOM). The web service node(s) may include a web service library comprising callable code functions. The callable code functions may be structured according to a predefined format, which may include a service name (interface name), an operation name (e.g., read, write, initialize a class), operation input parameters and data type, operation return values and data type, service message format, etc. In some arrangements, the callable code functions may include an API structured to access on-demand and/or receive a data feed from a search or discovery engine for Internet-connected devices. Further examples of callable code functions are provided further herein as embodied in various components of the data acquisition engine 180.

The data sources 160 can provide data to the multi-channel cybersecurity assurance system 110 based on the data acquisition engine 180 scanning the Internet (e.g., various data sources and/or data feeds) for data associated with a specific entity. That is, the data acquisition engine 180 can hold (e.g., in non-transitory memory, in cache memory, and/or in multi-channel cybersecurity assurance vault 120) the executables for performing the scanning activities on the data sources 160. Further, the multi-channel cybersecurity assurance system 110 can initiate the scanning operations. For example, the multi-channel cybersecurity assurance system 110 can initiate the scanning operations by retrieving domain identifiers or other entity identifiers from a computer-implemented DBMS or queue. In another example, a user can affirmatively request a particular resource (e.g., domain or another entity identifier) to be scanned, which triggers the operations. In various arrangements, the data sources 160 can facilitate the communication of data between the user devices 140, entity devices 150, and third-party devices 155, such that the data sources 160 receive data (e.g., over network 130) from the user devices 140, entity devices 150, and third-party devices 155 before sending the data other systems described herein (e.g., multi-channel cybersecurity assurance computing system and/or content management system 170). In other arrangements and as described herein, the user devices 140, entity devices 150, and third-party devices 155, and the data sources 160 can send data directly, over the network 130, to any system described herein and the data sources 160 may provide information not provided by any of the user devices 140, entity devices 150, and third-party devices 155. For example, the data sources 160 may provide supplemental intelligence information as discussed above.

As used herein, the terms "scan" and "scanning" refer to and encompass various data collection operations, which may include directly executing and/or causing to be executed any of the following operations: query(ies), search(es), web crawl(s), interface engine operations structured to enable the data acquisition engine 180 to enable an appropriate system interface to continuously or periodically receive inbound data, document search(es), dataset search(es), retrieval from internal systems of previously received data, etc. These operations can be executed on-demand and/or on a scheduled basis. In some embodiments, these operations include receiving data (e.g., device connectivity data, IP traffic data) in response to requesting the data (e.g., data "pull" operations). In some embodiments, these operations include receiving data without previously requesting the data (e.g., data "push" operations). In some embodiments, the data "push" operations are supported by the interface engine operations.

One of skill will appreciate that data received as a result of performing or causing scanning operations to be performed may include data that has various properties indicative of device properties, hardware, firmware, software, configuration information, and/or IP traffic data. For example, in an arrangement, a device connectivity data set can be received. In some embodiments, device connectivity data can include data obtained from a search or discovery engine for Internet-connected devices which can include a third-party product (e.g., Shodan), a proprietary product, or a combination thereof. Device connectivity data can include structured or unstructured data.

Various properties (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some embodiments, device connectivity data can be determined at least in part based on banner data exposed by the respective source entity. For example, device connectivity data can comprise metadata about software running on a particular device of a source entity.

In various arrangements, scanning operations can comprise executables associated with an Internet-wide scanning tool (e.g., port scanning, network scanning, vulnerability scanning, Internet Control Message Protocol (ICMP) scanning, TCP scanning, UDP scanning) for collecting data. Further, in addition to this data, other data collected and fused with the data obtained via scanning may be newsfeed data (e.g., articles, breaking news, television), social media data (e.g., Facebook, Twitter, Snapchat, TikTok), geolocation data of users on the Internet (e.g., GPS, triangulation, IP addresses), governmental databases (e.g., FBI databases, CIA databases, COVID-19 database, No Fly List databases, terrorist databases, vulnerability database, certificate databases), and any other data associated with the specific entity of interest.

In some arrangements, scanning occurs in real-time such that the data acquisition engine 180 continuously scans the data sources 160 for data associated with the specific entity. In various arrangements, scanning may occur in periodic increments such that the data acquisition engine 180 can scan the Internet for data associated with the specific entity periodically (e.g., every minute, every hour, every day, every week, and any other increment of time.) In some embodiments, data acquisition engine 180 may receive feeds from be various data aggregating systems that collect data associated with specific entities. For example, the multi-channel cybersecurity assurance system 110 can receive specific entity data from the data sources 160, via the network 130 and data acquisition engine 180. The information collected by the data acquisition engine 180 may be stored as entity data in the entity datasets 122.

The multi-channel cybersecurity assurance system 110 may be used by institutions to assess and manage multidimensional cybersecurity schemas and information (e.g., perimeter, technology, intelligence, and security controls) relating to entities. The assessment can be accomplished using fused multi-channel data and/or pipelines as described further herein.

In various arrangements, the multi-channel cybersecurity assurance system 110, multi-channel cybersecurity assurance vault 120, and the content management system 170 can be implemented as separate systems or integrated within a single system (sometimes referred to as a "monitoring hub"). The multi-channel cybersecurity assurance system 110 can be configured to incorporate some or all of the functions/capabilities of the content management system 170 and multi-channel cybersecurity assurance vault 120, where an entity and/or third party can be subscribers to the monitoring hub.

The multi-channel cybersecurity assurance system 110 may be configured to communicate over the network 130 via a variety of architectures (e.g., client/server, peer-to-peer). The multi-channel cybersecurity assurance system 110 can be configured to generate and provide cybersecurity risk scores and multi-dimensional scores based on fusing multi-channel pipelines and/or data (e.g., scanning various data channels, receiving various data from data channels, and/or collecting various data from data channels).

The multi-channel cybersecurity assurance system 110 can be communicatively and operatively coupled to the multi-channel cybersecurity assurance vault 120, which may be configured to store a variety of information relevant to entity data and third-party data modelled by modeler 116. Information may be received from user devices 140, entity devices 150, third-party devices 155, data sources 160, and/or content management system 170. The multi-channel cybersecurity assurance system 110 can be configured to query the multi-channel cybersecurity assurance vault 120 for information and store information in the multi-channel cybersecurity assurance vault 120. In various arrangements, the multi-channel cybersecurity assurance vault 120 includes various transitory and/or non-transitory storage media. The storage media may include magnetic storage, optical storage, flash storage, and RAM. The multi-channel cybersecurity assurance vault 120 and/or the multi-channel cybersecurity assurance system 110 can use various APIs to perform database functions (i.e., managing data stored in the multi-channel cybersecurity assurance vault 120). The APIs can include, for example, SQL, NoSQL, NewSQL, ODBC, and/or JDBC.

In some arrangements, an entity (e.g., service provider, financial institution, goods provider) may submit entity data to multi-channel cybersecurity assurance system 110 and provide information about cybersecurity analyses (e.g., entity perimeter data, entity security data, entity technology security data, and/or entity security controls data), which may be stored in multi-channel cybersecurity assurance vault 120 (e.g., entity datasets 122). In addition, multi-channel cybersecurity assurance system 110 may be configured to retrieve data via the data acquisition engine 180 (e.g., perimeter data of an entity, security data of an entity, technology security data of an entity, and/or security controls data of an entity), and data may be stored in the entity datasets 122 of multi-channel cybersecurity assurance vault 120. In various arrangements, multi-channel cybersecurity assurance system 110 may be configured to retrieve third-party data via network 130 (e.g., third-party perimeter data, third-party security data, third-party technology security data, and/or third-party security controls data) which may be stored in the third-party datasets 124 of multi-channel cybersecurity assurance vault 120.

The data manager 118 can be configured to perform data fusion operations, including operations to generate and/or aggregate various data structures stored in multi-channel cybersecurity assurance vault 120, which may have been acquired as a result of scanning operations or via another EDI process. For example, the data manager 118 can be configured to aggregate entity data stored in the multi-channel cybersecurity assurance vault 120. The entity data may be a data structure associated with a specific entity and include various data from a plurality of data channels. In some embodiments, the data manager 118 can be configured to aggregate line-of-business data stored in the multi-channel cybersecurity assurance vault 120. The line-of-business data may be a data structure associated with a plurality of line-of-business of an entity and indicate various data from a plurality of data channels based on line-of-business (e.g., information technology (IT), legal, marketing and sales, operations, finance and accounting).

The data manager 118 can also be configured to receive a plurality of entity data. In some arrangements, the data manager 118 can be configured to receive data regarding the network 130 as a whole (e.g., stored in entity datasets 122) instead of data specific to particular entity. The received data that the data manager 118 receives can be data that multi-channel cybersecurity assurance system 110 aggregates and/or data that the multi-channel cybersecurity assurance system 110 receives from the data sources 160 and/or any other system described herein.

As previously described, the multi-channel cybersecurity assurance system 110 can be configured to receive information regarding various entities on the network 130 (e.g., via device connectivity data). Further, the multi-channel cybersecurity assurance system 110 can be configured to receive and/or collect information regarding interactions that a particular entity has on the network 130 (e.g., via IP traffic data). Further, the multi-channel cybersecurity assurance system 110 can be configured to receive and/or collect additional intelligence information. Accordingly, the received or collected information may be stored as entity data in an entity datasets 122. In various arrangements, the entity datasets 122 can include entity profiles generated as described further herein.

The multi-channel cybersecurity assurance system 110 can be configured to electronically transmit information and/or notifications relating to various metrics (e.g., cybersecurity dimensions, cybersecurity risk scores, multi-dimensional scores, vulnerabilities), dashboards (e.g., graphical user interfaces) and/or models it determines, analyzes, fuses, generates, or fits to entity data and/or other data. This may allow a user of a particular one of the entity devices 150 to review the various metrics, dashboards or models which the multi-channel cybersecurity assurance system 110 determines. Further, the multi-channel cybersecurity assurance system 110 can use the various metrics to identify remediation actions for entities. The multi-channel cybersecurity assurance system 110 can cause a message to be sent to the content management system 170 and/or the entity devices 150 indicating that one or more remediation actions should be completed.

The modeler 116 implements data fusion operations of the cybersecurity assurance computing system 110. In various arrangements, the modeler 116 can be configured to receive a plurality of data (e.g., entity data) from a plurality of data sources (e.g., data manager 118, multi-channel cybersecurity assurance vault 120, user devices 140, entity devices 150, third-party devices 155, data sources 160) via one or more data channels (e.g., over network 130). Each data channel may include a network connection (e.g., wired, wireless, cloud) between the data sources and the multi-channel cybersecurity assurance system 110. For example, the modeler 116 could receive entity data from the data manager 118 based on the data manager 118 determining new entity data or identifying updated entity data. In another example, the modeler 116 could receive geolocation data from a user device (e.g., user devices 140) indicating a current location of a user associated with the entity (e.g., an employee).

In some arrangements, the modeler 116 can also be configured to collect a plurality of data from a particular data source or from a plurality of data sources based on electronically transmitting requests to the data sources via the plurality of data channels, managed and routed to a particular data channel by the data acquisition engine 180. A request submitted via the data acquisition engine 180 may include a request for scanning publicly available information exposed by the target entity (e.g., banner information). In some embodiments, the request submitted via the data acquisition engine 180 may include information regarding access-controlled data being requested from the entity. In such cases, the request can include trust verification information sufficient to be authenticated by the target entity (e.g., multi-factor authentication (MFA) information, account login information, request identification number, a pin, certificate information, a private key of a public/private key pair). This information should be sufficient to allow the target entity to verify that a request is valid.

The information regarding data requested via the data acquisition engine 180 may be any type of entity data described herein. The request may also include a deadline by which the requested data should be provided (e.g., in a response). For example, a request could be sent to an entity device (e.g., entity devices 150) for a list of utilized software utilized in a particular timeframe (e.g., currently, in the past day, in the past week, etc.) and indicating that the list should be provided within the next seven days or according to another suitable timeline. In some arrangements, a request can be linked to a response with the requested data (e.g., network information, domain information, subdomain information, infrastructure, software) to enable linking of a particular request to a particular response. In some arrangements (e.g., where requests comprise remediation recommendations that may comprise internal infrastructure components), the modeler 116 is structured to receive an access-controlled response from the target entity via the data acquisition engine 180. The access-controlled response may include information sufficient to be authenticated by an internal computer system. For example, in an arrangement, a remediation request may relate to a particular software-related vulnerability identified on a target system. The remediation request may comprise a link (e.g., a URL) to an internally-hosted update/patch verification tool, which the operator of the target entity may point at the instance of software installed on the operator's server to verify that remediation (e.g., installation of a recommended patch/security update) was successful. The link to the update/patch verification tool may be access-controlled and the response may comprise instructions to execute the tool and authentication information therefor.

In various arrangements, the modeler 116 can be configured to initiate a scan, via the data acquisition engine 180, for a plurality of data from a plurality of data sources based on analyzing device connectivity data, network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity. The operations to fuse various properties of data returned via the scan can include a number of different actions, which can parsing device connectivity data, packet segmentation, predictive analytics, cross-referencing to data regarding known vulnerabilities, and/or searching data regarding application security history. These operations can be performed to identify hosts, ports, and services in a target computer network environment. The target computer network environment can be identified by a unique identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some arrangements, one or more particular target computer network environments can be linked to an entity profile (e.g., in the entity datasets 122). In one example, scanning can include parsing out packet and/or device connectivity data properties that may indicate available UDP and TCP network services running on the target computer network environment. In another example, scanning can include parsing out packet and/or device connectivity data that indicates the operating systems (OS) in use on the target computer network environment. In yet another example, scanning and data fusion operations can include retrieving content from a news source that indicates a particular security vulnerabilities in a particular component (e.g., software, port number, operating system) identified from the parsed packet data. These various data items can be relationally mapped to one another using any suitable property designated as a mapping key, using a combination of properties, or using a segment of a property. Some examples or mapping keys may include IP addresses, software, application, port number, protocol name and/or protocol version, entity or company name, company location, device location, etc. However, one of skill will appreciate that other suitable properties derived from device connectivity data, IP packet data, and/or intelligence data can be used as mapping keys.

The modeler 116 may be also configured to execute cybersecurity analyses as part of the data fusion operations. The outputs of these operations can include one or more cybersecurity risk scores and/or multi-dimensional scores based on the received, collected, and/or scanned and fused data. A multi-dimensional score (sometimes referred to herein as "composite score") can be indicative of overall cybersecurity threat level. That is, the multi-dimensional score can incorporate various cybersecurity risk dimensions and their corresponding scores. Accordingly, the modeler 116 can quantify the vulnerabilities and risk of the entity. In various arrangements, a higher score may be indicative of a stronger overall cybersecurity level. For example, a higher score (e.g., 9.5 out of 10) may be reflective of a stronger overall cybersecurity level of an entity. In some arrangements, a higher score may be indicative of a lower overall cybersecurity level. For example, a higher score (e.g., 9.5 out of 10) may be indicative of a lower overall cybersecurity level of an entity.

In various arrangements, cybersecurity multi-channel data fusion operations can be performed on a plurality of entities such that each entity associated with an entity computing device can have a profile and each profile can be enriched periodically or in real-time. Entity profiles can be created, updated, and tracked by the modeler 116 such that cybersecurity risk scores and/or multi-dimensional scores can be generated, and vulnerabilities can be recorded. Entity profiles are further explained in detail with reference to FIG. 5.

In various arrangements, vulnerabilities can be determined based on any software feature, hardware feature, network feature, or combination of these, which could make an entity vulnerable to cyber threats, such as hacking activities, data breaches, and cyberattacks. In turn, cyber-threats increase the probability of cyber-incidents. Accordingly, a vulnerability can be a weakness that could be exploited to gain unauthorized access to or perform unauthorized actions in a computer network environment (e.g., computing environment 100). For example, obsolete computing devices and/or obsolete software may present vulnerabilities and/or threats in a computer network environment. In another example, certain network frameworks may present vulnerabilities and/or threats in a computer network environment. In yet another example, business practices of an entity may present vulnerabilities and/or threats in a computer network environment. In yet another example, published content on the Internet may present vulnerabilities in a computer network environment. In yet another example, third-party computing devices and/or software may present vulnerabilities and/or threats in a computer network environment. Accordingly, as shown, all devices (e.g., servers, computers, any infrastructure), all data (e.g., network information, vendor data, network traffic, user data, certificate data, public and/or private content), all practices (e.g., business practices, security protocols), all software (e.g., frameworks, protocols), and any relationship an entity has with another entity can present vulnerabilities and/or threats in a computer network environment that could lead to one or more cyber-incidents.

Accordingly, the modeler 116 can be configured to determine one or more vulnerabilities. Vulnerabilities can be determined based on receiving vulnerability datasets from a plurality of data feeds and/or querying the stored datasets in multi-channel cybersecurity assurance vault 120 (e.g., in particular, entity datasets 122, and third-party datasets 124). In various arrangements, the received vulnerabilities and queried vulnerabilities can be cross-referenced against items of data received, collected, and/or scanned by the multi-channel cybersecurity assurance system 110 (e.g., via the data acquisition engine 180 and/or multi-channel cybersecurity assurance vault 120). The received vulnerability datasets can include a list of known vulnerabilities in cybersecurity (e.g., computer hardware, software, network communication, configuration settings, and/or mitigation techniques). The queried vulnerabilities can be based on the modeler 116 providing one or more parameters to the multi-channel cybersecurity assurance vault 120 and subsequently receiving data matching (e.g., properties in subsets of data and/or packets of data) the one or more parameters to infer that a vulnerability is present. That is, utilizing the metadata (e.g., entity datasets 122, third-party datasets 124, remediation datasets 126) stored within the multi-channel cybersecurity assurance vault 120 and based on identifying properties in the metadata, inferences and determinations can be made regarding vulnerabilities if one or more parameters (or properties) match metadata of entity profiles. For example, a query could be executed by the modeler 116 that includes a parameter (or property) indicating to return all entity profiles with an open port 80 (e.g., "All Entity—Open Port 80"). In this example, the query would return each entity profile that includes an open port 80 (e.g., vulnerability). In another example, a query could be executed by the modeler 116 that includes a parameter (or property) indicating return entity profiles in the financial industry that run TellerSuite Software (e.g., "Financial Entity—Run Teller-Suite Software"). In this example, the query would return each entity profile that is associated with financial industry and runs TellerSuite Software (e.g., vulnerability). In some arrangements, returning the requested values can comprise operations to retrieve updated device connectivity data and/or parse the "port" property from the data to create a subset of devices where port 80 is used. Returning the requested values can further comprise operations to ping or otherwise initiate a call to or gather data regarding the subset of devices to determine which devices have port 80 open. Collectively, these operations can be referred to as scanning operations.

In various arrangements, once vulnerabilities are determined, each identified vulnerability can be stored in a security parameters dataset (e.g., in multi-channel cybersecurity assurance vault 120) such that the security parameters dataset can be cross-referenced to identify vulnerabilities in data. In some arrangements, the security parameters dataset can also include weights assigned to individual vulnerabilities such that certain vulnerabilities can be weighted higher (e.g., indicative of increased cybersecurity risk) than other vulnerabilities.

Expanding generally on the data fusion aspects of generating the cybersecurity risk scores and multi-dimensional score in the schema of the modeler 116, each cybersecurity risk score can be representative of a cybersecurity dimension of the multi-dimensional score that can be calculated based on fusing various properties of data that have been assigned to each particular dimension. For example, a port property can be mapped to the technology security dimension.

Modeler 116 (or data manager 118) can be configured to assign dimensions to each item of data that have been received, collected, and/or scanned. Each item of data can be linked to one or more specific data channels and each cybersecurity dimension can include a plurality of items of data (collectively referred to herein as "subsets of data"). Accordingly, each cybersecurity dimension can include a subset of data that the modeler 116 can utilize to analyze and generate cybersecurity risk scores for each cybersecurity dimension. In various arrangements, each cybersecurity dimension can be incorporated into the multi-dimensional score such that standardized overall cybersecurity can be quantified. That is, each entity profile can receive a multi-dimensional score such that entity profiles can be compared, historical information can be tracked, and trends over time can be established. Accordingly, the security model described herein standardizes the generation of cybersecurity risk scores and multi-dimensional scores such that modeler 116 can provide consistent and stable multi-channel data fusion operations on entities.

For example, an illustrative scoring table below (between 0 and 10) discloses a plurality of values (e.g., sometimes referred to herein as "impact" and/or "impact values") assigned to a plurality of items (e.g., potential vulnerabilities and threats) of a specific entity (Table 1):

| Item | Dimension | Value |
| --- | --- | --- |
| 53/tcp | Perimeter | 5 |
| Software App U | Technology | 8 |
| Server V | Technology | 1 |
| Public Content W | Intelligence | 2 |
| Firewall X | Security Controls | 9 |
| 89/udp | Perimeter | 7 |
| Access Policy | Security Controls | 8 |
| Encryption Y | Security Controls | 5 |
| Private Content Z | Intelligence | 6 |

As shown, the values assigned by the modeler 116 can be based on retrieving values of items from a lookup table or by a user entering values. In some arrangements, the impact values represent a Federal Information Processing Standard (FIPS) Publication 199 confidentiality impact level. In some arrangements, the impact values are determined based on suitable vulnerability database risk-scoring methodologies, such as the Common Vulnerability Scoring System (CVSS). In some arrangements, the impact values are defined by another entity or organization, which can be internal or external to the entity that manages and/or operates the systems described herein. For example, the impact values can be based on raw scores assigned to various attack vectors, which may be scored according to how easily the underlying vulnerabilities can be exploited. In some arrangements, the impact values can be received and/or determined using data intelligence collection, penetration testing, system administration data, and/or data related to various security-related technical tasks. Accordingly, in some arrangements, the source data for deriving and assigning the impact values can be retrieved from system administration logs, operations logs, and/or access logs, any of which may be automatically generated by the respected source system(s) in the course of system operation. In one example and as shown above, "Software App U" was assigned a value of 8, which could indicate "Software App U" is more vulnerable or poses a larger threat to cybersecurity, whereas "Server V" was assigned a value of 1, which could indicate "Server V" is less vulnerable or poses a reduced threat to cybersecurity. In various arrangements, each item in the subsets of data can be given a value by the modeler 116.

In another example, an illustrative visibility table (sometimes referred to as "attack surfaces") below discloses instances discovered through scanning and assigned to a plurality of properties (e.g., potential vulnerabilities and threats) of a specific entity (Table 2):

| Item | Discovered Instances |
| --- | --- |
| 53/tcp | 7 |
| Software App U | 3 |
| Server V | 15 |
| Public Content W | 29 |
| Firewall X | Y |
| 89/udp | 4 |
| Access Policy | Y |
| Encryption Y | N |
| Private Content Z | 1 |

As shown, the values assigned above by the modeler 116 can be a count of instances a specific item was located and/or determined based on the received, collected, and/or scanned entity data, such that the number of discovered instances is reported relative to the number of IP traffic packets or to the number of unique source entities, destination entities, port numbers, MAC addresses, IP addresses, or communication protocols in the data set of IP traffic packets returned by a particular scan operation. Further, as shown, the security controls dimension (sometimes referred to herein as "mitigating security dimension") can be given a "Y" or "N" such that "Y" is indicative of the item being discovered and "N" is indicative of the item not being discovered. In one example and as shown above, "Software App U" was discovered to have 3 instances on the computer network environment of the entity and/or associated with the entity, whereas "Server V" was discovered to have 15 instances on the computer network environments of the entity and/or associated with the entity.

With reference to Table 1 and Table 2 above, the illustrative scoring table and illustrative visibility table can be combined to generate a combined table of a plurality of items of a specific entity (Table 3):

| Item | Dimension | Value | Discovered Instances |
|---|---|---|---|
| 53/tcp | Perimeter | 5 | 7 |
| Software App U | Technology | 8 | 3 |
| Server V | Technology | 1 | 15 |
| Public Content W | Intelligence | 2 | 29 |
| Firewall X | Security Controls | 9 | Y |
| 89/udp | Perimeter | 7 | 4 |
| Access Policy | Security Controls | 8 | Y |
| Encryption Y | Security Controls | 5 | N |
| Private Content Z | Intelligence | 6 | 1 |

In various arrangements, a variety of computational operations can be performed by the modeler 116 to generate a cybersecurity risk score for each dimension. An example equation for the generating a cybersecurity risk score for a specific dimension can be found in the equation below (Equation 1):

$$\{T, P, I\} = \max\left(10, \sqrt{\bar{x} * x_{max}} + \frac{\sum_{i=1}^{n} x_i \in \{8\}}{\sum_{j=1}^{n} [x_j]} + \frac{\sum_{i=1}^{n} x_i \in \{9\}}{\sum_{j=1}^{n} [x_j]} + \frac{\sum_{i=1}^{n} x_i \in \{10\}}{\sum_{j=1}^{n} [x_j]}\right)$$

The following table describes the notation as it shall be used hereafter. The notation is denoted as follows:
T: Technology Security Dimension
P: Perimeter Security Dimension
I: Intelligence Security Dimension
$x_{max}$: Maximum value
$\bar{x}$: Average value A calculation of a cybersecurity risk score for the technology security dimension utilizing Equation 1 is shown below (with reference to Table 3):

$$\text{Software } App \ U - 345 \text{ instances of value } 8$$

$$\text{Server } U - 15 \text{ instances of value } 1$$

$$\text{Mean (average) value: } \frac{8+1}{3+15} = 8.05$$

$$\text{Maximum value: Max}(8, 1) = 8$$

$$\text{Square Root of Product: } \sqrt{0.025 * 8} = 0.2$$

where adjustments can be made for value 8's, 9's and 10's such that vulnerabilities and threats can be emphasized (e.g., weighted). In various arrangements, weights can be added or removed from any value.

$$\frac{\sum_{i=1}^{n} x_i \in \{8\}}{\sum_{j=1}^{n} [x_j]} =$$

$$3 \text{ instances of value 8 of total of 2 items} = \frac{3 \text{ eights}}{2 \text{ items}} = \frac{3}{2} = 1.5$$

$$\frac{\sum_{i=1}^{n} x_i \in \{9\}}{\sum_{j=1}^{n} [x_j]} = 0$$

$$\frac{\sum_{i=1}^{n} x_i \in \{10\}}{\sum_{j=1}^{n} [x_j]} = 0$$

where the integration of all the calculation can generate a cybersecurity risk score for the technology security dimension:

$$\{T\} = \max(10, 8.05 + 1.5 + 0 + 0) = 9.55$$

where the lower the score for Equation 1 may be indicative of increased cybersecurity (decreased threat level).

In various arrangements, similar operations and calculations can be performed to generate various cybersecurity risk scores for various dimensions. To further the example above, the additional cybersecurity risk scores can be as follows:

$$\text{Perimeter Cybersecurity Score} = \{P\} = 8.29$$

$$\text{Intelligence Cybersecurity Score} = \{I\} = 4.63$$

An example of generating a security controls score (sometimes referred to herein as "mitigating security score") for the security controls dimension is shown below (Equation 2):

$$\{C\} = \frac{\text{Sum of Control Values}}{100}$$

A calculation of a cybersecurity risk score for the security controls dimension utilizing Equation 2 is shown below (with reference to Table 3):

$$\frac{9+8}{100} = 0.17$$

where the higher the score for Equation 2 may be indicative of increased cybersecurity.

In various arrangements, the cybersecurity dimensions can be aggregated to generate a multi-dimensional score for an entity profile. Generating a multi-dimensional score for the cybersecurity dimensions is shown below (Equation 3):

$$\{M\} = \left(\frac{\{I\} + \{P\} + \{T\}}{3}\right) - \{S\}$$

A calculation of a multi-dimensional score utilizing Equation 3 is shown below (with reference to above cybersecurity risk scores):

$$\{M\} = \left(\frac{4.63 + 8.29 + 9.55}{3}\right) - 0.17 = 7.32$$

where the lower the score for Equation 3 may be indicative of increased cybersecurity.

One of skill will appreciate that Equations 1-3 herein are representative of a particular arrangement and/or group of arrangements and other arrangements are contemplated. The risks of a given individual item may be re-assessed periodically (for example, as a technology matures and becomes more or less secure). As such, the risk scoring and measuring algorithms should be reviewed regularly, and may be updated as the system is refined. Accordingly, in various arrangements, properties parsed from device connectivity data can be included in (mapped to) a particular security dimension (e.g., the technology dimension, the perimeter security dimension, the intelligence security dimension) based on any of the following non-exclusive list of items: device data, application data, infrastructure component data, device connectivity data, and IP traffic data. Various roll-up aggregation methods, including counts, averages, median values, mode values, and various statistical data (percentiles, time series data, etc.) can be used to calculate the score. Various data analysis techniques may be used to normalize the data, generate projections, etc. For example, data can be normalized via linear scaling, log scaling, clipping, z-scoring, etc. Data can be used as a basis for generating projections using regression, moving averages, weighted values (e.g., weighted averages), etc.

Accordingly, in operation, a scan may return device connectivity data. Device connectivity data can be parsed to identify a particular infrastructure component, such as a web server's operating system version. The particular infrastructure component can be included in a particular security dimension, such as the technology security dimension. One or more vulnerabilities and impact values can be determined for the particular infrastructure component based at least in part on the data received via various additional data sources. A count of identified occurrences for each vulnerability may be determined and assigned an impact value. The data can be weighted and/or otherwise aggregated according to the impact value, number of occurrences, or other factors. Data analysis and/or machine learning techniques, systems, and/or methods can be applied to the data to generate one or more projections. Based on the weighted and/or otherwise aggregated data and based on the projection(s), a security score for the particular dimension can be calculated. The security score can be aggregated with other security scores for other items indicated by the received device data, application data, infrastructure component data, device connectivity data, and/or IP traffic data to arrive at the score for the particular dimension and/or a multi-dimensional score.

In various arrangements, a multi-dimensional score can be categorized based on a variety of rules and/or factors. In one example, the categories could be low, medium, high, and critical, (e.g., according to the nomenclature used in the CVSS), National Institute of Standards and Technology (NIST) cybersecurity framework, or another suitable nomenclature) where each category can be defined based on a scoring chart. That is, low could be defined as a multi-dimensional score between 0.0-3.99, medium could be defined as a multi-dimensional score between 4.0-6.99, high could be defined as a multi-dimensional score between 7.0-10.00, and critical could be defined as a multi-dimensional score above 10.00. Accordingly, with reference to the above multi-dimensional score, the entity with the score 7.32 may be categorized as high. In some arrangements, each category may include requirements and/or rules for an entity to follow. The rules can include computer-based operations (e.g., initiate a temporary communication shutoff until a multi-dimensional score goes below a certain value, require certain changes to the computer network environment of an entity such as disabling a port and/or taking an infrastructure component offline, perform various other remediation actions). In some arrangements, entities categorized as low may need to be enriched less frequently (e.g., every week), whereas entities categorized as critical may need to be enriched more frequently (e.g., in real-time, every 5 minutes, every hour, every day).

In some arrangements, weights can be given to specific dimensions such that cybersecurity risk scores can be modified utilizing an arithmetic operation. In one illustrative example, the intelligence security score may be multiplied by a factor of 0.5. In various arrangements, the number of cybersecurity dimensions can be added or removed such that additional calculations for additional cybersecurity dimensions can be generated and the equations (e.g., Equation 1, 2, and 3) can be updated accordingly and/or fewer calculations for fewer cybersecurity dimensions can be generated and the equations can be updated accordingly.

Accordingly, as multi-dimensional scores and cybersecurity risk scores change and/or are updated based on multi-channel fusion operations, a remediation system 114 can be configured to actively execute (e.g., in real-time) various operations that override default operations of the respective computing system where the vulnerability was identified. In various arrangements, the remediation system 114 can determine actions (e.g., proactive, reactive, and mitigation operations) responsive to fusing multi-channel data and generating scores. In one arrangement, proactive actions can include identifying and addressing potential vulnerabilities and/or threats before a cyber-incident occurs. In another arrangement, reactive actions can include identifying and addressing potential vulnerabilities and/or threats contemporaneously with a cyber-incident or after a cyber-incident occurs. In yet another arrangement, mitigation actions can include implementing computer-based policies and processes to reduce the possibility of future cyber-incidents.

In various arrangements, the predetermined threshold can be set by a user or identified by one or more processing circuits (e.g., modeler 116) based on analyzing the entity data. Predetermined thresholds can be based on inequalities (e.g., greater then, less then, between), Boolean algebra (e.g., and, or, nor), binary logic (e.g., truth table, tautologies, and logical equivalences), and/or equations (e.g., quadratic, linear, radical, exponential, rational).

In various arrangements, other operations can include trending, pattern recognition, and notification operations. Trending and pattern recognition operations can be executed to identify trends and/or patterns in various entity data (e.g., historical multi-dimensional scores, historical cybersecurity risk scores, historical vulnerabilities, historical threats, and/or any other historical entity data properties). That is, based on evaluating entity datasets 122 and/or third-party datasets 124, and based on generating multi-dimensional scores and/or cybersecurity risk scores, one or more processing circuits of the modeler 116 can identify trends and/or patterns (e.g., linear, exponential, seasonality, random, damped window, stationary, AI, and/or cyclical trends and/or patterns) of the various entity data. The notification operation may be executed in response to trends and/or pattern recognition operations. The notification operations can provide alerts to various computing devices (e.g., multi-channel cybersecurity assurance system 110, user devices 140, entity devices 150, third-party devices 155, data sources 160).

The multi-channel cybersecurity assurance system 110 can include a remediation system 114. In various arrangements, the remediation system 114 can be configured to track and provide remediation actions to entity profiles. In various arrangements, the remediation system 114 can determine appropriate system actions responsive to identifying trends, patterns, and providing notifications. The remediation system 114 can analyze the received, collected, and tracked data performed by the modeler 116 to determine (e.g., generate recommendations for) various remediation items. Remediation items can be any item identified in the data fusion operations that could be a potential vulnerability or threat to the scanned entity and/or any other entity that has a relationship with the scanned entity. Remediation items can be stored in the remediation dataset 126 of the multi-channel cybersecurity assurance vault 120, and remediation actions can be generated and provided to an entity and/or any other entity that has a relationship with the entity. In various arrangements, the remediation actions can be any a specific action and/or actions that the scanned entity and/or any other entity that has a relationship with the scanned entity should remediate.

For example, if it is determined that port 40 is open on computing device X, a remediation item may be generated and stored in the remediation datasets 126 and a remediation action may be generated and sent to the entity requesting that port 40 be closed on computing device X. In another example, if it is determined there is a vulnerability with Software Y, a remediation item may be generated and stored in the remediation datasets 126 and a remediation action may be generated and transmitted to the entity requesting that Software Y be uninstalled on all computing devices. In both examples, each remediation item can be tracked such that historical data and trend data can stored in the remediation datasets 126. Further in both examples, in subsequent data fusion operations, the remediation system 114 can determine if one or more remediation items have been remediated.

In various arrangements, the remediation system 114 can independently verify, separate from a data fusion operation, that a remediation item has been completed by scanning the plurality of data channels for entity data, receiving new or updated device connectivity data and/or IP traffic data and fusing this data to determine an updated cybersecurity score.

In various arrangements, the remediation system 114 can generate a long term trend summary associated with the entity and based on the detected vulnerabilities and progress of the at least one remediation. The long term trend summary can be included in the user-interactive cybersecurity dashboard. In various arrangements, the long term trend summary can include various graphs, charts, pictures, statistics indicating current vulnerabilities, current remediation items, deadlines for remediating the remediation items, cybersecurity risk scores and trends, multi-dimensional scores and trends. Additional details associated with the remediation system 114 and long term trend summaries is described further with reference to FIGS. 6-10.

Figure 2:
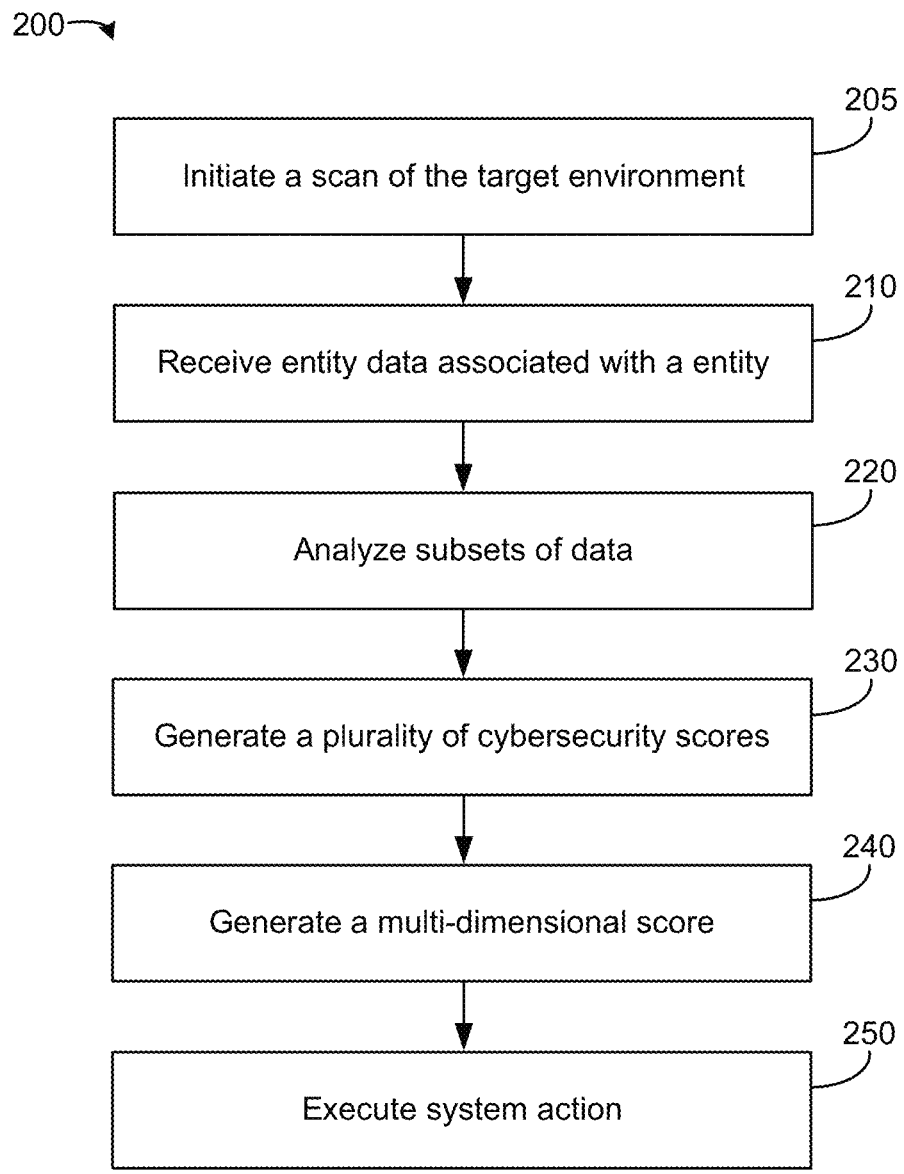
FIG. 2 is a flowchart for a method of analyzing multi-channel data based on a security model in a computer network environment, according to some arrangements.

Referring now to FIG. 2, a flowchart for a method 200 of fusing multi-channel data based on a security model in a computer network environment is shown, according to some arrangements. Multi-channel cybersecurity assurance system 110 and computing environment 100 can be configured to perform method 200.

In broad overview of method 200, at block 205, the one or more processing circuits (e.g., multi-channel cybersecurity assurance system 110 in FIG. 1, computer system 1100 in FIG. 11) initiate a scan of a target computer network environment. At block 210, one or more processing circuits receive entity data associated with an entity. At block 220, the one or more processing circuits analyze subsets of data. At block 230, the one or more processing circuits generate a plurality of cybersecurity risk scores. At block 240, the one or more processing circuits generate a multi-dimensional score. At block 250, the one or more processing circuits execute a system action (e.g., a remediation action). Additional, fewer, or different operations may be performed depending on the particular arrangement. In some arrangements, some or all operations of method 200 may be performed by one or more processors executing on one or more computing devices, systems, or servers. In various arrangements, each operation may be re-ordered, added, removed, or repeated.

Referring to method 200 in more detail, at block 205, the one or more processing circuits (e.g., multi-channel cybersecurity assurance system 110 in FIG. 1) can initiate a scan of the target computer network environment via the data acquisition engine 180 of FIG. 1. The target computer network environment can be identified by a unique identifier, such as a domain identifier (e.g., a top-level domain (TLD) identifier, a subdomain identifier, a URL string pointing to a particular directory), an IP address, and/or a subnet. Further, the target computer network environment can be defined with more granularity to encompass a particular component (e.g., an entity identified by an IP address, applications/operating systems/exposed API functions associated with a particular port number, IP address, subnet, and/or domain identifier). In some arrangements, one or more particular target computer network environments can be linked to an entity profile (e.g., in the entity datasets 122 of FIG. 1). According to various arrangements, scanning operations can be executed according to a class/tier of the target infrastructure and/or on-demand. In some arrangements, scanning includes generating and transmitting to the target system a request for access-controlled information, the request comprising authentication information. In some arrangements, instead or in addition to performing a scan, a scanless operation can be initiated to identify existing (e.g., cached, previously stored) entity profile information. Advantageously, in the event the perimeter of the system needs to be secured such that Internet communications are undesirable, a scanless operation can help identify vulnerabilities without gaining system exposure to external entities.

Referring to method 200 in more detail, at block 210, the one or more processing circuits can receive, via one or more data channels (e.g., via the data acquisition engine 180), entity data associated with an entity, wherein the entity data includes subsets of data associated with specific data channels or data sources. Each data channel of the plurality of data channels may be communicatively connected to the one or more processing circuits via a data channel communication network such that each data channel can be a computing device (e.g., user devices 140, entity devices 150, third-party devices 155, data sources 160) that can store data. In various arrangements, the entity data of an entity can contain items such that a plurality of items can be included in the subsets of data. In some arrangements, each data channel may include a subset of data such that the entity data can be subsets of data. For example, subsets of data can include properties parsed from device connectivity data and/or packet segments parsed from IP traffic data. The one or more processing circuits can also analyze network properties and network information of a target computer network environment associated with the entity. Further, the one or more processing circuits can also collect entity data by querying a plurality of data sources (e.g., user devices 140, entity devices 150, third-party devices 155, data sources 160). In some arrangements, analyzing network properties and network information of a target computer network environment associated with the entity can be based on evaluating domain and subdomain Internet protocol (IP) traffic and/or based on additional relevant intelligence data collected internally or via third-party systems.

At block 220, the one or more processing circuits can analyze the subsets of data comprising assigning each subset of data to a specific cybersecurity dimension of a plurality of cybersecurity dimensions based on correlating one or more properties of the subset of data to one or more vulnerabilities of the subsets of data to determine an impact of each vulnerability.

Assigning the subsets of data can be based on various rules and/or factors. In various arrangements, each cybersecurity dimension can include specific properties or characteristics such that each subset of data can be assigned to one or more cybersecurity dimensions (e.g., intelligence, technology, perimeter, security controls) that best matches the specific characteristics of the cybersecurity dimension as shown, for example, in FIG. 6. In various arrangements, each subset of data can include properties such that the properties of each subset of data can be analyzed to determine one or more vulnerabilities and the impact of each vulnerability. Properties can include any data parsed from device connectivity data. Additionally, properties can include timestamps (e.g., date, time), domain relationships (domain IP traffic, domain outbound and inbound connections, domain average traffic, domain packet size, domain name system (DNS)), subdomain relationships (subdomain IP traffic, subdomain outbound and inbound connections, subdomain average traffic, subdomain packet size, subdomain name system (DNS), and network environment (computing devices, infrastructure, software, databases, Internet protocols, logs).

In some arrangements in data fusion operations, some subsets of data can be discarded based on a determination of duplicate data (e.g., data deduplication). In particular, the one or more processing circuits can analyze the subsets of data based on their properties and remove duplicate records from the entity data. Data deduplication can be utilized to improve storage utilization and network data transfers to reduce the number of bytes that are transmitted and preserve or increase the bandwidth available to other system operations.

At block 230, the one or more processing circuits can generate a plurality of cybersecurity risk scores based at least on the detected one or more vulnerabilities and the impact of each vulnerability, wherein each cybersecurity risk score is associated with one of the plurality of cybersecurity dimensions. In various arrangements, each cybersecurity risk score can be unique and be indicative of the cybersecurity of a specific dimension of an entity. Each entity may be associated with an entity profile such that the cybersecurity risk scores can be associated with the entity profile of the entity. In some arrangements, the generated plurality of cybersecurity risk scores can include performing various arithmetic computations and weighting various computations such that various computations can have greater influence or less influence on the cybersecurity dimensional score.

At block 240, the one or more processing circuits can generate a multi-dimensional score based on aggregating the plurality of cybersecurity risk scores. Aggregating the plurality of cybersecurity risk scores can include performing various arithmetic computations on the cybersecurity risk scores and weighting various cybersecurity risk scores such that have greater influence or less influence on the multi-dimensional score.

At block 250, the one or more processing circuits can execute a system action responsive to evaluating the multi-dimensional score and/or the identified vulnerabilities. For example, in response to identifying a multi-dimensional score of an entity being above a predetermined threshold (e.g., greater than 10, greater than or equal to 10), a task may be executed that disables all or at least some communication (e.g., email, file uploads, any other network communication) between an entity and one or more other entities. In another example, in response to identifying a specific port is open (e.g., port 40, port 92), a shut down (or close) task may be executed on the port that is open such that the communications interface associated with the port is disabled. In yet another example, in response to a determination of a failure or abnormal termination of a previously active computer server, a switching (e.g., sometimes referred to as "failover") task can be executed to failover to a redundant or standby computer server. In yet another example, in response to a determination of a failure or abnormal termination of a previously active segment of a network, a switching (e.g., sometimes referred to as "failover") task can be executed to failover to a redundant or standby segment of the network. In yet another example, in response to identifying an attack (e.g., a DDOS attack, code injection) on a target computer environment, a task can be executed redirecting network traffic to a specific IP address to a decoy non-production environment where production resources cannot be compromised by the attack. In yet another example, a remediation recommendation and/or related executables can be generated and transmitted to the target computer system. The system actions described herein can be executed on internal systems and/or included in a remediation recommendation for execution on the relevant external system where the vulnerability is identified.

Figure 3:
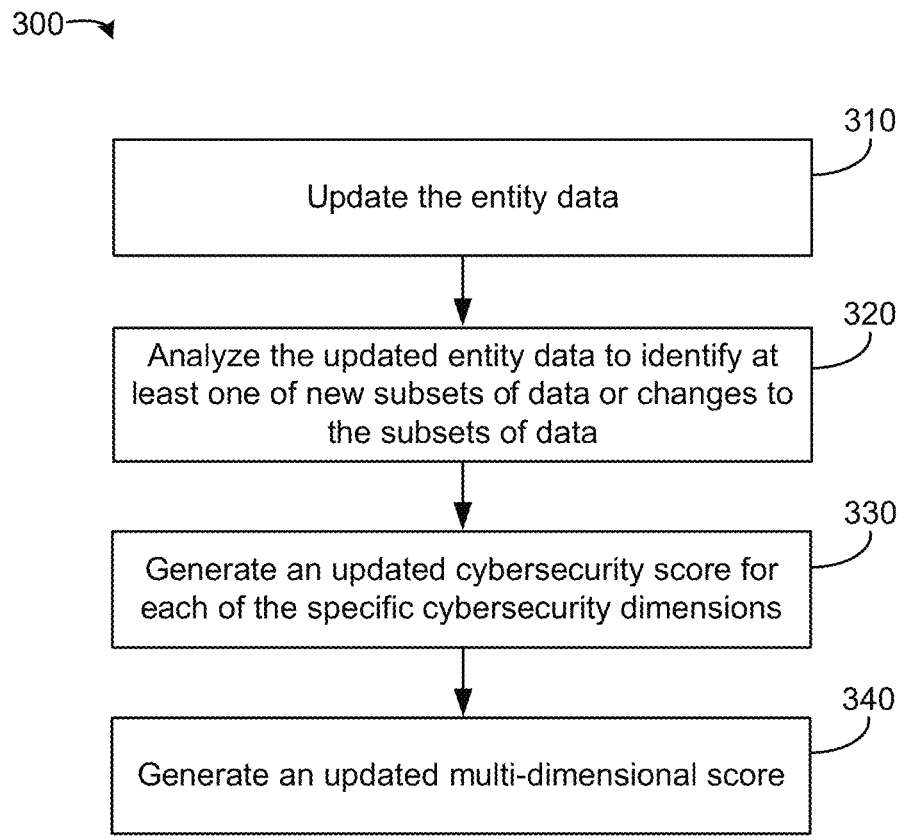
FIG. 3 is a flowchart for a method of analyzing multi-channel data based on a security model in a computer network environment, according to some arrangements.

Referring now to FIG. 3, a flowchart for a method 300 of updating security model data in a computer network environment is shown, according to some arrangements. Multi-channel cybersecurity assurance system 110 and computing environment 100 can be configured to perform operations of the method 300.

In broad overview of method 300, at block 310, one or more processing circuits (e.g., multi-channel cybersecurity assurance system 110 in FIG. 1, computer system 1100 in FIG. 11) update the entity data. At block 320, the one or more processing circuits analyze the updated entity data to identify at least one of a new subsets of data or changes to the subsets of data. At block 330, the one or more processing circuits generate an updated cybersecurity risk score for each of the specific cybersecurity dimensions. At block 240, the one or more processing circuits generate an updated multi-dimensional score. Additional, fewer, or different operations may be performed depending on the particular arrangement. In some arrangements, some or all operations of method 300 may be performed by one or more processors executing on one or more computing devices, systems, or servers. In various arrangements, each operation may be re-ordered, added, removed, or repeated.

Referring to method 300 in more detail, at block 310, the one or more processing circuits (e.g., multi-channel cybersecurity assurance system 110 in FIG. 1) can update the entity data based on receiving additional, updated or new data via the plurality of data channels. In various arrangements, updating the entity data can include adding additional data channels based on identifying additional Internet-connected entities (e.g., new computer added to the network, new news outlet). In some arrangements, updating can occur in real-time such that entity data is continuously updated. In other arrangements, updating can occur based on a difference in a period of time between the most recently generated plurality of cybersecurity risk scores that is before the generation of the updated cybersecurity risk score for each of the specific cybersecurity dimensions. In some arrangement, the previous entity data can be saved in a database (e.g., multi-channel cybersecurity assurance vault 120) such that historical data and trends can be identified.

At block 320, the one or more processing circuits can analyze the updated entity data to identify at least one of new subsets of data or changes to the subsets of data associated with the most recent receipt occurring before the receipt of additional data. In various arrangements, the one or more processing circuits can compare previously stored data (e.g., in multi-channel cybersecurity assurance vault 120) with the updated entity data to determine if a change in the subsets of data occurred. In another arrangement, the one or more processing circuits can identify a new subset of data based on cross-referencing various data sources.

At block 330, the one or more processing circuits can, in response to determining at least one a new subset of data or a change to at least one previous subset of data, generate an updated cybersecurity risk score for each of the specific cybersecurity dimensions. The updated cybersecurity risk score can be re-associated with the entity profile of the entity. In various arrangements, the updated cybersecurity risk score may be indicative of additional vulnerabilities or threats previously not identified. In some arrangement, the cybersecurity risk scores can be saved in a database (e.g., multi-channel cybersecurity assurance vault 120) such that historical data and trends can be identified.

At block 340, the one or more processing circuits can generate an updated multi-dimensional score based on aggregating the plurality of cybersecurity risk scores. In various arrangements, the previous multi-dimensional scores can be saved in a database (e.g., multi-channel cybersecurity assurance vault 120) such that historical data and trends can be identified.

Figure 4:
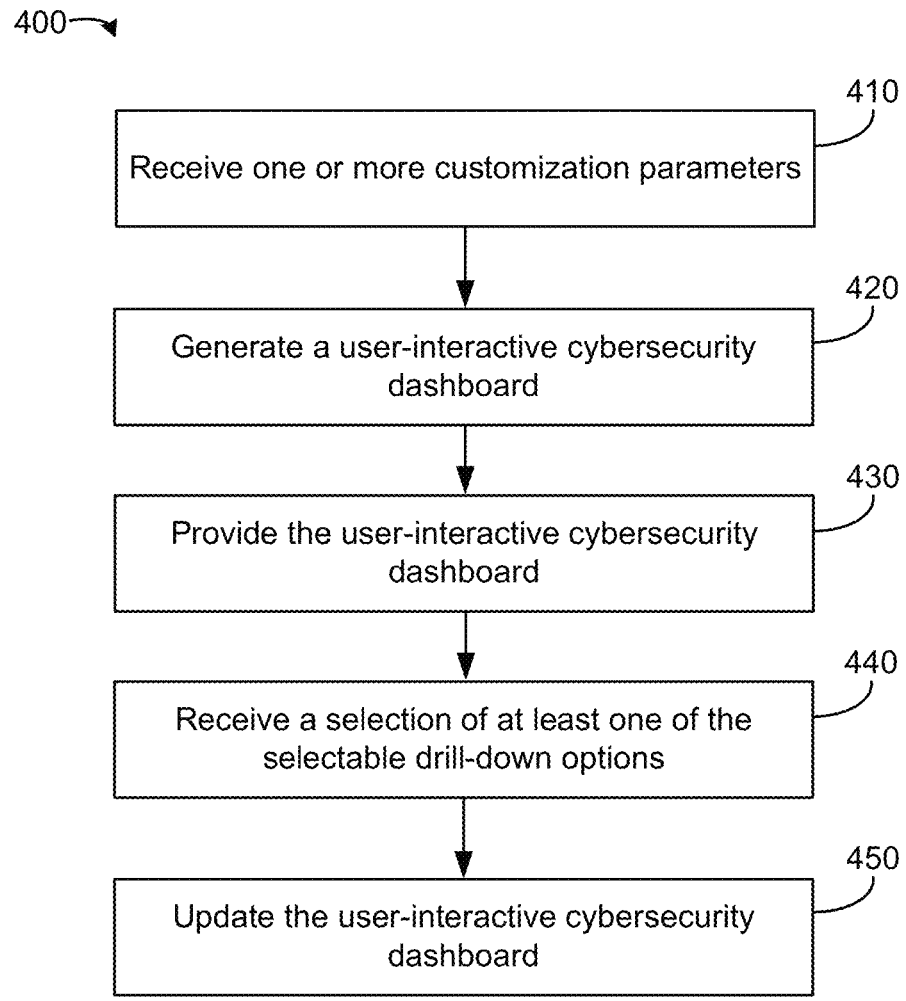
FIG. 4 is a flowchart for a method of providing a user-interactive cybersecurity dashboard, according to some arrangements.

Referring now to FIG. 4, a flowchart for a method 400 of providing a user-interactive cybersecurity dashboard is shown, according to some arrangements. The multi-channel cybersecurity assurance system 110 and computing environment 100 can be structured to perform method 400.

In broad overview of method 400, at block 410, one or more processing circuits (e.g., multi-channel cybersecurity assurance system 110 in FIG. 1, computer system 1100 in FIG. 11) receive one or more customization parameters. At block 420, the one or more processing circuits generate a user-interactive cybersecurity dashboard. At block 430, the one or more processing circuits provide the user-interactive cybersecurity dashboard. At block 440, the one or more processing circuits receive a selection of at least one of the selectable drill-down options. At block 450, the one or more processing circuits update the user-interactive cybersecurity dashboard. Additional, fewer, or different operations may be performed depending on the particular arrangement. In some arrangements, some or all operations of method 300 may be performed by one or more processors executing on one or more computing devices, systems, or servers. In various arrangements, each operation may be re-ordered, added, removed, or repeated.

Referring to method 400 in more detail, at block 410, the one or more processing circuits (e.g., multi-channel cybersecurity assurance system 110 in FIG. 1) can receive, via a computing device of an institution, one or more customization parameters. In various arrangements, a user associated with the institution can set one or more customization parameters. In various arrangements, the customization parameters can be any parameters that can adjust the look and feel of a user-interactive cybersecurity dashboard (sometimes referred to herein as a "user-interactive interface"). For example, the customization parameter could relate to color schemes, height and/or width of items and/or panels on the user-interactive cybersecurity dashboard, the entity profiles utilized (e.g., all, by line-of-business, by industry), and/or language (e.g., English, Spanish, French).

At block 420, the one or more processing circuits can generate a user-interactive cybersecurity dashboard based on the entity data and the customization parameters, wherein the user-interactive cybersecurity dashboard includes one or more graphical user interfaces. In various arrangements, the user-interactive cybersecurity dashboard can generate panels for the user-interactive cybersecurity dashboard. In some arrangements, the panels can include a variety of data and options.

At block 430, the one or more processing circuits can provide, to the computing device of the institution, the user-interactive cybersecurity dashboard, wherein the user-interactive cybersecurity dashboard is presented on a display of the computing device. The user-interactive cybersecurity dashboard can be rendered at a computing device (e.g., user devices 140, entity devices 150, third-party devices 155) to facilitate interactions and analyze various entity data, cybersecurity risk scores, performance metrics, trends, tracking, and/or remediation items associated with one or more entity profiles. In various arrangements, the user-interactive cybersecurity dashboard can be generated, updated and/or monitored by the content management system 170 in FIG. 1.

At block 440, the one or more processing circuits can receive, via the user-interactive cybersecurity dashboard, a selection of at least one of the selectable drill-down options. In various arrangements, a variety of data and entities can be categorized and/or grouped together based on a variety of characteristics, such as line-of-business, subsidiary, department, location, industry, and/or financial trends.

At block 450, the one or more processing circuits can, in response to receiving the selection, update, by the one or more processing circuits, the user-interactive cybersecurity dashboard based on the entity data and the selection. In various arrangements, the user-interactive cybersecurity dashboard can be updated to include the data of the selected drill-down option. For example, in response to a selection of drill-down option to drill-down to marketing and sales line-of-business, the one or more processing circuits may update trends, scores, and graphs such that the user-interactive cybersecurity dashboard displays only the marketing and sales line-of-business data.

Figure 5:
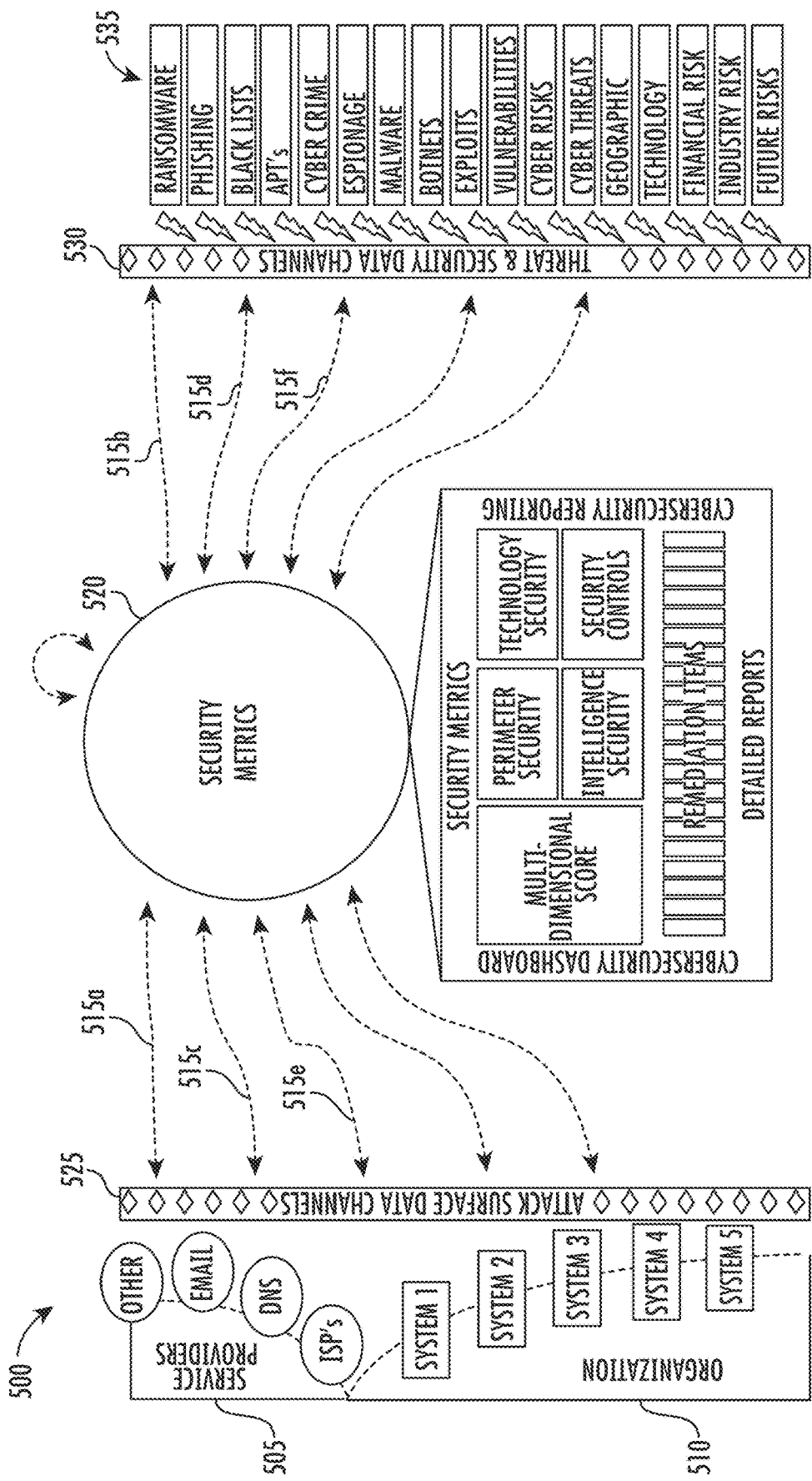
FIG. 5 is a block diagram depicting an example of a security architecture, according to some arrangements.

Referring now to FIG. 5, a block diagram depicting an example of a security architecture 500 is shown, according to some arrangements. The computing environment is shown to include service entity data sources 505, organization data sources 510, data channel communication networks 515a and 515b, attack surface data channels 525, threat and security (T&S) data channels 530, and threat and security (T&S) data sources 535. The security architecture 500 may include features and functionality described above in detail with reference to FIG. 1. In various arrangements, the security architecture can be implemented utilizing various types of digital electronic circuitry (e.g., one or more processing circuits, algorithms, in computer software). In some arrangements, the security architecture can be implemented utilizing a machine learning algorithm (e.g., a neural network, convolutional neural network, recurrent neural network, linear regression model, sparse vector machine, or any other algorithm known to a person of ordinary skill in the art). The security architecture 500 can be communicatively coupled to other architectures, such as over a network 130, as described in detail with reference to FIG. 1. The security architecture 500 can have an internal logging system that can be utilized to collect and/or store data (e.g., in a multi-channel cybersecurity assurance vault 120, as described in detail with reference to FIG. 1). In some arrangements, the security architecture 500 can be executed on one or more processing circuits, such as those described herein in detail with reference to FIGS. 1 and 11. In various arrangements, the security metrics model 520 comprises features and functionality as the multi-channel cybersecurity assurance system 110 in FIG. 1. For example, the security metrics model 520 can comprise executable code for executing multi-channel data and/or pipeline fusion operations, data storage entities to store entity profiles relationally linked to fused data, etc.

Expanding generally on the security metrics model 520, in various arrangements, the one or more processing circuits of the security metrics model 520 can be communicatively coupled to various data channels (e.g., 525 and 530) via data channel communication networks (e.g., 515a, 515b, 515c, 515d, 515e, 515f). The various data channels can connect, via the data channel communication networks, to various data sources (e.g., 505, 510, and 535) that provide various data that can be utilized to quantify cybersecurity of various entities (e.g., providers, users, institutions). Accordingly, the one or more processing circuits of the security model metrics 520 can receive, scan, and collect various data from various data sources such that multi-channel data fusion operations can be performed to generate one or more cybersecurity risk scores, and/or multi-dimensional scores. In various arrangements, the various data can be divided into subsets of data (e.g., by data channel, by vendor, by line-of-business).

The one or more processing circuits of the security metrics model 520 can utilize the generated scores and multi-channel data fusion operations to generate cybersecurity dashboards, cybersecurity reports, and remediation items and/or remediation actions such that entities and users can utilize the information to detect and address cybersecurity vulnerabilities, monitor relationships (e.g., network relationships, hardware relationships, financial relationships) between entities and users, and quantify cybersecurity for entities and users, to improve overall avoidance and prevention of cybersecurity incidents (e.g., hacking activities, data breaches, cyberattacks, and other detrimental cyber-incidents).

In some arrangements, an institution may utilize the one or more processing circuits of the security architecture 500 to create profiles for entities (sometimes referred to as "providers" and/or "vendors"). In various arrangements, the profiles may be variously organized and/or categorized (e.g., industry, market capitalization (market cap), earnings, public/private, headquarters location, financial health). The entity profiles can be further divided into entity specific organization and categories (e.g., line-of-business, subsidiary, department, location). In some arrangements, the creation of a profile can be referred to herein as "initial data fusion operations", and the updating of a profile can be referred to herein generally as a "data fusion operations". Initial data fusion operations can include the creation of an entity profile such that entity information is added to the entity profile (e.g., industry, market capitalization (market cap), earnings, public/private, headquarters location, financial health). Initial data fusion operations can also include the initial receipt, scan, and collection of entity data from various data sources (e.g., 505, 510, and 535) associated with various data channels (e.g., 525 and 530) via data channel communication networks (e.g., 515a, 515b, 515c, 515d, 515e, 515f). Furthermore, data fusion operations can refer to updating the entity data based on receiving, scanning, and collecting of entity data from various data sources (e.g., 505, 510, and 535) associated with various data channels (e.g., 525 and 530) via data channel communication networks (e.g., 515a, 515b, 515c, 515d, 515e, 515f) at a point in time after the initial data fusion operations. That is, data fusion operations can be performed a plurality of times. In various arrangements, data fusion operations can be performed in real-time such that the entity data is continuously updated. In some arrangements, data fusion operations can be performed based on a difference in a period of time between the most recent data fusion operation (e.g., 15 nanoseconds, 2 milliseconds, 5 seconds, 1 minute, 3 hours, 12 hours, 1 day, 2 weeks).

In various arrangements, each profile of the plurality of profiles may be given a class/data fusion scheduling classification (e.g., tier I, tier II, tier III) such that profiles may be enriched or tracked based on the class. For example, Company X may be tier I, Company Y may be tier II, and Company Z may be tier III. In this example, Company X may be required to be enriched in real-time, whereas Company Y may be required to be enriched at least every 5 days, and whereas Company Z may be required to be enriched at least every 2 weeks. Accordingly, classes may be given to various profiles based on various rules and/or factors such as industry type (e.g., financial, construction, engineering), historical cyber-incidents (e.g., profile may be tier I if they had a cyber-incident in last 3 days, profile may be tier II if they have not had a cyber-incident in 3 months), trends (e.g., 6 cyber-incidents in past 3 hours), any multi-channel data fusion operations performed by security metrics model 520, and/or a combination of rules and/or factors (e.g., a particular profile can be tier I if they are in the financial industry and 5 cyber-incidents occurred in the last hour). In some arrangements, a profile can change classes such that classes can be determined and modified based on various rules and/or factors.

In various arrangements, the initial and subsequent data fusion operations can also include analyzing, by the one or more processing circuits of the security metrics model 520, subsets of data (e.g., entity data) including assigning each item in the subset of data to a specific cybersecurity dimension (e.g., perimeter security, technology security, intelligence security, security controls) of a plurality of cybersecurity dimensions and detecting one or more vulnerabilities of the subsets of data to determine an impact of each vulnerability. That is, each specific cybersecurity dimension can be indicative of particular information and/or associated with an entity. In some arrangements, the plurality of cybersecurity dimensions can include at least one of a perimeter security dimension, a technology security dimension, an intelligence security dimension, and security controls dimension. In various arrangements, a plurality of profiles for a plurality of entities can be created.

Expanding generally on the perimeter security dimension, in various arrangements, the perimeter security dimensions are based on the communication endpoints of the entity detected via scanning and/or other forms of intelligence gathering. Communication endpoints can be domains, subdomains, IP addresses, or ports that are constructs that identify specific processes or a types of network service. Communication endpoints can be protocol specific (e.g., transmission control protocol (TCP), user datagram protocol (UDP)) and assigned an address combination. The address combination may include a 16- or 128-bit unsigned number representing an Ipv4 or Ipv6 IP address and another 16-bit unsigned number commonly referred to as "port number." Port numbers can be divided into ranges (e.g., well-known ports, registered ports, and dynamic or private ports) and assigned numbers accordingly. For example, File Transfer Protocol (FTP) Data Transfer may be port number: 20, Secure Shell (SSH) Secure Login may be port number: 22, Domain Name System (DNS) service may be port number: 53, Dynamic Host Configuration Protocol (DHCP) may be port number: 67 and 68, Hypertext Transfer Protocol (HTTP) may be port number: 80. In various arrangements, entities can electronically transmit and receive network packets (e.g., formatted units of data, sometimes referred to as the payload) via communication endpoints of the entity. That is, the entity can utilize communication endpoints on computer hardware (e.g., computing devices, servers, databases, processing circuits, Internet of things (IoT) devices) as an interface between the entities computer hardware and other computer hardware and/or peripheral devices (e.g., via network 130 in FIG. 1**). In various arrangements, one or more communication endpoints can be closed (sometimes referred to as disabled) such that the interface of various port numbers cannot be utilized. In some arrangements, one or more communications endpoints can be open (sometimes referred to as enabled) such that communication interfaces corresponding to various port numbers can be utilized.

Each communication endpoint, such as ports, can be subject to cybersecurity incidents. In particular, some ports may be more vulnerable (e.g., critical ports) and/or prone than other ports to cyber-incidents. Accordingly, the perimeter security dimension can be based on open, closed and/or filtered communication endpoints of entities.

Expanding generally on the technology security dimension, in various arrangements, the technology security dimension is based on technologies and frameworks utilized by the entity. Technologies can comprise any computing device and/or software application utilized by the entity to perform and execute various functions on various computing devices. Frameworks (sometimes referred to as software frameworks) can be any type of support programs, compilers, code libraries, tools sets, and/or application programming interfaces (APIs) utilized by the entity. Various software frameworks can include AJAX framework, web framework, middleware, application framework, enterprise architecture framework, decision support systems, computer added design software, and application development framework. In some arrangements, entities can utilize various technologies and frameworks in a computer network environment. In various arrangements, various technologies and frameworks can be subject to cybersecurity incidents (e.g., past cyber-incidents, detected vulnerabilities, based on end of life, current events). In particular, certain technologies and frameworks may be more vulnerable than others to cyber-incidents. Accordingly, the technology security dimension is based on computing devices, software applications, and software frameworks utilized by the entity.

Expanding generally on the intelligence security dimension, in various arrangements, the intelligence security dimension is based on public and private content associated with the entity. Public content may include any content accessible on the world wide web (www), Internet, television, radio, public communication, production software, and newspaper or magazine. Private content may include sensitive data, confidential data, financial data, encrypted data, beta software and private communication data. In various arrangements, various services and sources can be complied into a list of known IP addresses and hosts that include public and private content. In some arrangements, entities can provide content (e.g., news articles) to the public and/or provide content (e.g., financial data, sensitive data) privately to internal or external entities. In various arrangements, other entities that are not the scanned entity can provide content to the public and/or provide content privately to internal or external entities associated with the scanned entity. In various arrangements, various content can be indicative of cybersecurity vulnerabilities and/or threats. In particular, certain content may be indicative of specific vulnerabilities and/or threats to the entity that may result in cyber-incidents. Accordingly, the intelligence security dimension is based on various public and private content.

Expanding generally on the security controls dimension, in various arrangements, the security controls dimension is based on mitigation techniques utilized by the entity. Mitigation techniques can include various software and/or hardware implemented by the entity for mitigating cybersecurity vulnerabilities and threats, proactively increasing cybersecurity, and reducing the likelihood of a cyber-incident. While mitigation techniques may not eliminate all cyber-incidents, they can provide extra layers of security against cyber-incidents (e.g., improved protection). Some mitigation techniques can include implementing antivirus and antispyware software, implementing employee training in cyber security principles, implementing one or more firewalls, updating software and operating systems as they become available, implementing backup systems, implementing access control to physical buildings, computers and network components, implementing secure Wi-Fi networks, implementing virtual data and information access controls, and implementing the changing of passwords frequently. In some arrangements, entities can implement various mitigation techniques. In various arrangements, various mitigation techniques can be indicative of reduced cybersecurity vulnerabilities and/or threats. In particular, certain mitigation techniques may provide enhanced cybersecurity to the entity. Accordingly, the security controls dimension is based on various software, hardware, policies and procedures implemented by the entity to proactively increase cybersecurity and mitigate cybersecurity vulnerabilities and/or threats. In various arrangements, there may be fewer or additional dimensions based on various factors and preferences. For example, a cybersecurity dimension may include a third-party security dimension based on third-party cybersecurity, where the third-parties are entities that communicate and/or provide services or products to the entity.

In one example, the one or more processing circuits of the security metrics model 520 can receive Institution J data (e.g., entity data) from data sources 535, via the T&S data channels 530, and over the data channel communication networks (e.g., 515b, 515d, 515f). In this example, data sources such as ransomware data sources, phishing data sources, blacklists data sources, and financial risk data sources, can store and/or provide Institution J data to the security metrics model 520. Further in this example, each data channel communication network may connect and facilitate the exchange of data between the data channels 530 and the security metrics model 520 over a network (e.g., network 130). In some arrangements, each data channel of the T&S data channels 530 can be communicatively coupled to a specific data source of the data sources 535 (e.g., data channel W can be communicatively coupled to geographic data source X). In various arrangements, each data channel of the T&S data channels 530 can be communicatively coupled to a plurality of data source of the data sources 535 (e.g., data channel Y can be communicatively coupled to geographic data source X and industry risk data source Z).

In another example, the one or more processing circuits of the security metrics model 520 can receive Institution J data (e.g., entity data) from data sources 505, via the attack surface data channels 525, and over the data channel communication networks (e.g., 515a, 515c, 515e). In this example, data sources such as service provider email data sources, service provide Internet service provider data sources, can store and/or provide Institution J data to the security metrics model 520. Further in this example, each data channel communication network may connect and facilitate the exchange of data between the data channels 525 and the security metrics model 520 over a network (e.g., network 130). In some arrangements, each data channel of the attack surface data channels 525 can be communicatively coupled to a specific data source of the data sources 505 (e.g., data channel K can be communicatively coupled to service provider email data source L). In various arrangements, each data channel of the attack surface data channels 525 can be communicatively coupled to a plurality of data source of the data sources 505 (e.g., data channel K can be communicatively coupled to service provider email data source L and service provide Internet service provider data source M).

In yet another example, the one or more processing circuits of the security metrics model 520 can receive Institution J data (e.g., entity data) from data sources 510, via the attack surface data channels 525, and over the data channel communication networks (e.g., 515a, 515c, 515e). In this example, data sources such as system 1, system 2, system 3, can store and/or provide Institution J data to the security metrics model 520. Further in this example, each data channel communication network may connect and facilitate the exchange of data between the data channels 525 and the security metrics model 520 over a network (e.g., network 130). In some arrangements, each data channel of the attack surface data channels 525 can be communicatively coupled to a specific data source of the data sources 510. In various arrangements, each data channel of the attack surface data channels 525 can be communicatively coupled to a plurality of data source of the data sources 510.

In various arrangements, one or more processing circuits of the security metrics model 520 can generate cybersecurity risk scores (e.g., perimeter security, technology security, intelligence security, security controls) and a multi-dimensional score. The one or more processing circuits of the security metrics model 520 can utilize the generated scores to generate cybersecurity dashboards, cybersecurity reporting, remediation items, and detailed reports.

In various arrangements, cybersecurity reporting can include one or more processing circuits of the security metrics model 520 being structured to provide notifications and/or messages to entities based on the generated scores and/or vulnerabilities. Providing a notification and/or message can include email, text message, phone call, mail, fax, online notification, website notification (e.g., via the dashboard described herein), alert, and/or a combination of some, getting transmitted over a network (e.g., network 130 in FIG. 1). In some arrangement, the notification may include a detailed report including remediation items, historical data, and/or trends. The detailed report can contain various data based on the analyses performed by the one or more processing circuits of security metrics model 520 (e.g., resembles similar features and functionality of modeler 116 in FIG. 1). The detailed report can include cybersecurity risk scores (e.g., intelligence, perimeter, technology, security controls), multi-dimensional scores, remediation items, remediation actions, security reports, data analytics, graphs, charts, historical data, historical trends, vulnerabilities, summaries, help information, domain information, subdomain information, and/or any other properties parsed from device connectivity data, IP traffic data, etc. In various arrangements, the detailed report may be presented on a computer device (e.g., mobile phone screen, monitor, display, smart watch, smart device). The information can be grouped, filtered and/or sorted via various characteristics, including line-of-business, relationship-type, business function, criticality, geographic footprint, relationship-owner.

In various arrangements, cybersecurity reporting can include one or more processing circuits of the security metrics model 520 being structured to provide notifications and/or messages to entities based on the generated scores and/or vulnerabilities and/or based on selectable policy criteria, such as SLAs, vulnerability-status, cyber risk scores, etc. Providing a notification and/or message can include email, text message, phone call, mail, fax, online notification, website/dashboard notification, alert, and/or a combination of some, getting transmitted over a network (e.g., network 130 in FIG. 1).

Referring now to FIG. 6, an example illustration of a plurality of scoring tables and a visibility table is shown, according to some arrangements. As shown, the plurality of scoring tables (e.g., 605, 610, 615, and 620) includes items (sometimes referred to herein as "items of impact"), a dimension, and a value (sometimes referred to herein as "impact"). Also as shown, the visibility table includes items and discovered instances of the specific items. The calculation of values and identification of items and instances is described above in detail with reference to FIG. 1.

Figure 7:
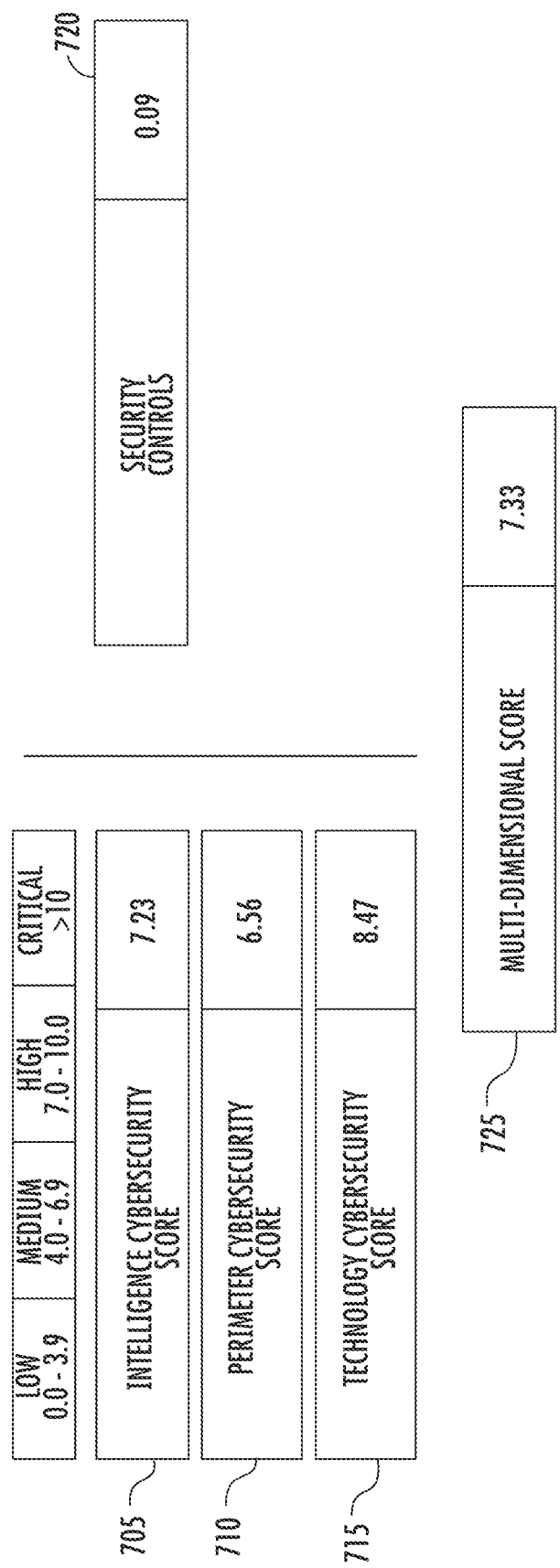
FIG. 7 is an example illustration of security model scoring, according to some arrangements.

Referring now to FIG. 7, an example illustration of security model scoring is shown, according to some arrangements. As shown, a plurality of cybersecurity risk scores by dimension (e.g., 705, 710, 715, and 720) can be aggregated to generate a multi-dimensional score 725. The generation of the multi-dimensional score and cybersecurity risk scores is described above in detail with reference to FIG. 1.

Figure 8:
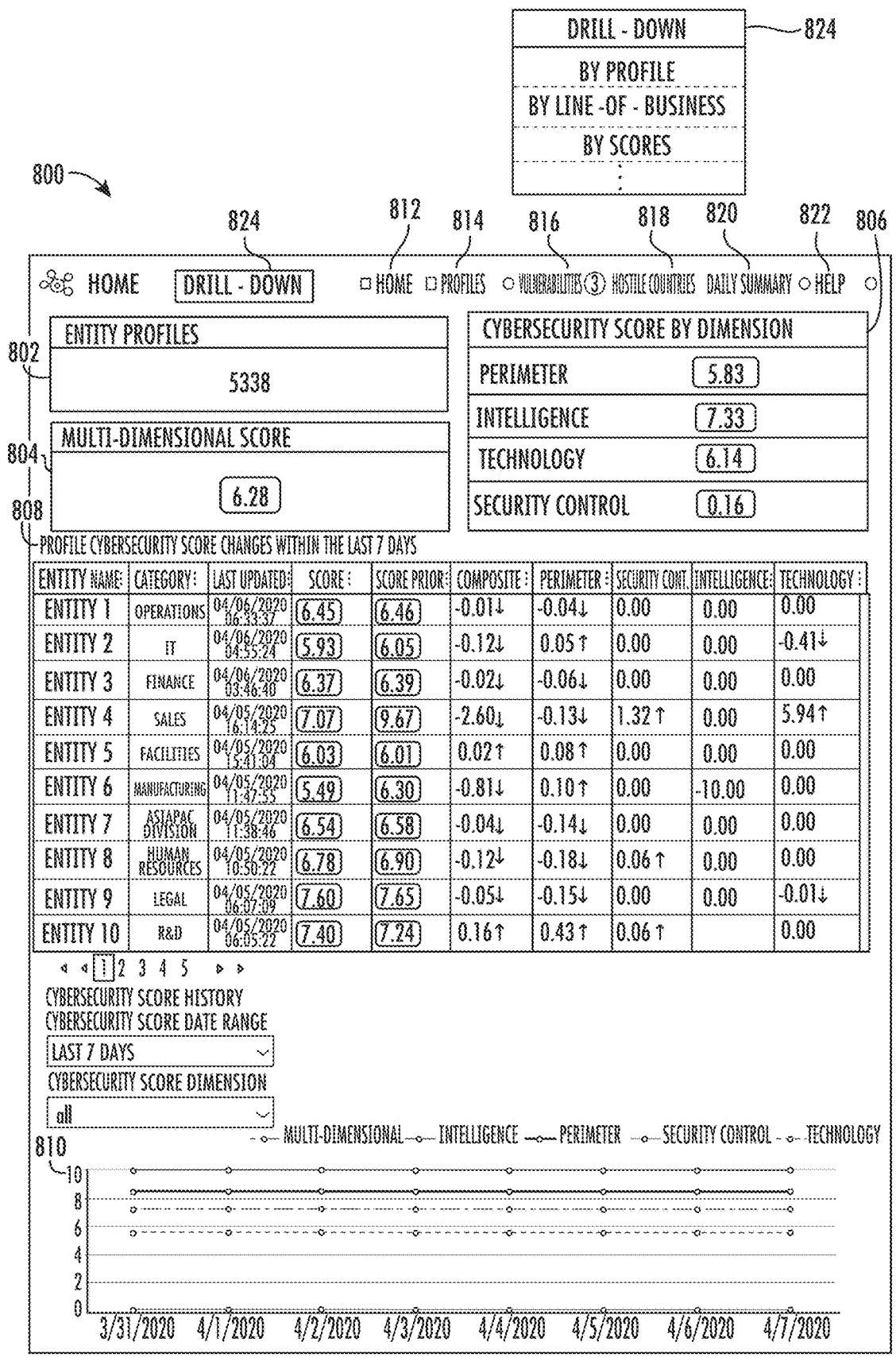
FIG. 8 is an example illustration of an arrangement of a user-interactive graphical user interface, according to some arrangements.

Referring now to FIG. 8, an example illustration of an arrangement of a user-interactive graphical user interface 800 (collectively referred to herein as "user-interactive interface 800") is shown, according to some arrangements. Generally, a user-interactive interface 800 can be rendered at a computing device (e.g., user devices 140, entity devices 150, third-party devices 155) to facilitate interactions and analyze various entity data, cybersecurity risk scores, performance metrics, trends, tracking, remediation items, associated with one or more entity profiles. In various arrangements, the user-interactive interface 800 can be generated, updated and/or monitored by the content management system 170 shown in FIG. 1. The user-interactive interface 800 can include a plurality of interfaces (e.g., sometimes referred to herein as a "dashboards") and objects. For example, the multi-channel cybersecurity assurance system 110 can execute operations to provide the user-interactive interface 800 with at least one entity profiles panel 802, at least one multi-dimensional score panel 804, at least one cybersecurity risk score by dimension panel 806, at least one profile cybersecurity risk score trends panel 808, at least one graphical trends panel 810, at least one navigation button (e.g., 812, 814, 816, 818, 820, and 822), and a drill button 824, where each panel may include a plurality of sub-panels. In some arrangements, each panel within the user-interactive interface 800 operates by receiving input from an input device (e.g., a pointing device, a keyboard, a touchscreen, tactile feedback, or another form of input device). In response, the computing device executing the user-interactive interface 800 may request data such as profile trends from a database (e.g., multi-channel cybersecurity assurance vault 120, in particular, entity datasets 122 in FIG. 1) corresponding to the multi-channel cybersecurity assurance system 110, via the network 130. In various arrangements, the computing device executing operations to generate and display the user-interactive interface 800 may request data such as profile trends from a data storage unit of the computing device. In some arrangements, the user of user-interactive interface 800 can modify the colors of items, highlight items, zoom in/out, customize the look and feel of the user interface interface 800. In some arrangements, the user of user-interactive interface 800 may dynamically (or automatically) modify the colors of items, highlight items, zoom in/out, customize the look and feel of the user interface interface 800, without receiving user input.

The user-interactive interface 800 can execute at the multi-channel cybersecurity assurance system 110, user devices 140, entity devices 150, third-party devices 155, or some or all of these to provide the user-interactive interface 800. In some arrangements, the user-interactive interface 800 can be provided within a web browser. In various arrangements, the multi-channel cybersecurity assurance system 110 executes to provide the user-interactive interface 800 at the computing devices (e.g., 140, 150, 155 in FIG. 1) without utilizing the web browser. In one arrangement, an application executed by an entity device (e.g., entity devices 150) can cause the user-interactive interface 800 to present on a monitor, screen, or projection surface/device of the entity device.

In various arrangements, the user-interactive interface 800 can include the drill-down button 824 that can include drill-down functionality such that data presented on the user-interactive interface 800 can be broken down and magnified. In various arrangements, in response to the selection of the drill-down button 824, a drop-down menu can be displayed such that a user can select a plurality of drill-down options. For example, the user-interactive interface 800 can be drilled-down by profile (e.g., as shown). In another example, the user-interactive interface 800 can be drilled-down by line-of-business such that specific profiles can be displayed based on one or more parameters indicative of one or more lines-of-business. In yet another example, the user-interactive interface 800 can be drilled-down by score such that specific profiles can be displayed based on a cybersecurity risk score and/or multi-dimensional score.

In some arrangements, the user-interactive interface 800 can include the entity profiles panel 802 that can include the number of entity profiles stored in the entity datasets 122 of FIG. 1. In some arrangements, the number may be based on specific entities that have been drilled down on (e.g., via drill-down button 824). For example, a user of the user-interactive interface 800 may drill-down to a particular line-of-business of specific entities. In this example, the entity profiles panel 802 could update based on the number of entity profiles that are included in that particular line-of-business.

In various arrangements, the user-interactive interface 800 can include the multi-dimensional score panel 804 that can include an average of all the entity profile multi-dimensional scores. In some arrangements, the average may be based on specific entities that have been drilled down on (e.g., via drill-down button 824). For example, a user of the user-interactive interface 800 may drill-down to a particular multi-dimensional score of the consumer goods industry. In this example, the multi-dimensional score panel 804 can be updated based on the average of all the entity profiles multi-dimensional scores in the consumer goods industry.

In some arrangements, the user-interactive interface 800 can include the cybersecurity risk score by dimension panel 806 that can include an average of all the entity profile cyber-security scores by dimension. In some arrangements, the average may be based on specific entities that have been drilled down on (e.g., via drill-down button 824). For example, a user of the user-interactive interface 800 may-drill down to a specific entity. In this example, the cybersecurity risk score by dimension panel 806 could update based on the cyber-security scores by dimension of the specific entity.

In various arrangements, the user-interactive interface 800 can include the cybersecurity risk score trends panel 808 that can include a list of entities (sometimes referred to as "vendors" or "partners") and some entity data associated with each entity (e.g., category, last updated, score, score prior, composite, perimeter, security, intelligence, technology). In various arrangements, any list of grouped profiles and/or features of entity profiles can be displayed. The cybersecurity risk score trends panel 808 can include trend information and recent changes to various entity profiles such as cybersecurity risk scores, multi-dimensional scores, remediation items, vulnerabilities.

In some arrangements, the user-interactive interface 800 can include the cybersecurity risk score by graphical trends panel 810 that can include a graphical representation of trends of a multi-dimensional score and cybersecurity risk scores. The trends can be long-term trends that represent cybersecurity over a period of time (e.g., last 7 days, last month, last 5 minutes). In various arrangements, a user can modify the graphical trends panel 810 utilizing the various input options (e.g., cybersecurity risk score history, cybersecurity risk score date range, cybersecurity risk score dimension) such that the graphical representations can update in response to input by the user. In some arrangements, the graphic trends can display trends in remediation items, trends in vulnerabilities, trends in data fusion operation process. In various arrangements, the graphic trends panel 810 can be modified by clicking and dragging, dropping, inserting, or removal operations to one or more areas of the graphic trends panel 810.

In various arrangements, the user-interactive interface 800 can include navigation buttons that can include a home button 812, a profiles button 814, a vulnerabilities button 816, a hostile countries button 818, a daily summary button 820, and a help button 822. In some arrangements, each button can provide navigation to additional graphical user interfaces of the user-interactive interface 800. The home button 812, when selected, can cause the user interface interface 800 to update and display the home screen. The profiles button 814, when selected, can cause the user interface interface 800 to display a drop-down menu that enables the selection of various profiling features. For example, a user can browse profiles such that a list of all profiles is displayed, create profiles such that a new profile can be created, search profiles such that profiles can be searched by letters, numbers, and/or special characters, and profiles by line-of-business such that profiles can be displayed (and sometimes sorted) by line-of-business. The vulnerabilities button 816, when selected, can cause the user interface interface 800 to update and display all known vulnerabilities. The hostile countries button 818, when selected, can cause the user interface interface 800 to update and display list and/or graphical representation of a map of hostile countries based on a plurality of data (e.g., governmental databases, user designation, entity profile data, network traffic). The daily summary button 820, when selected, can cause the user interface interface 800 to update and display a daily summary of some or all entity profiles. The daily summary may be customized by user such that it is user specific and can display summarized data. The help button 812, when selected, can cause the user interface interface 800 to update and display a help screen.

In some arrangements, updates to the user-interactive interface 800 based on received input of a user can be replicated throughout the panel. For example, if a user drills-down (e.g., via drill-down button 824) the entity profiles panel 802, to display vendor profiles in the financial industry, the multi-dimensional score panel 804, cybersecurity risk score by dimension panel 806, profile cybersecurity risk score trends panel 808, and graphical trends panel 810, may update as well. Accordingly, each input received at any panel and/or button can cause one or more updates to the user-interactive interface 800. In various arrangements, the user-interactive interface 800 can update based on real-time multi-channel data fusion operations and analysis by the multi-channel cybersecurity assurance system 110 in FIG. 1 (e.g., updated cybersecurity risk score, updated multi-dimensional score, new entity profile, new vulnerability, new remediation item).

Figure 9:
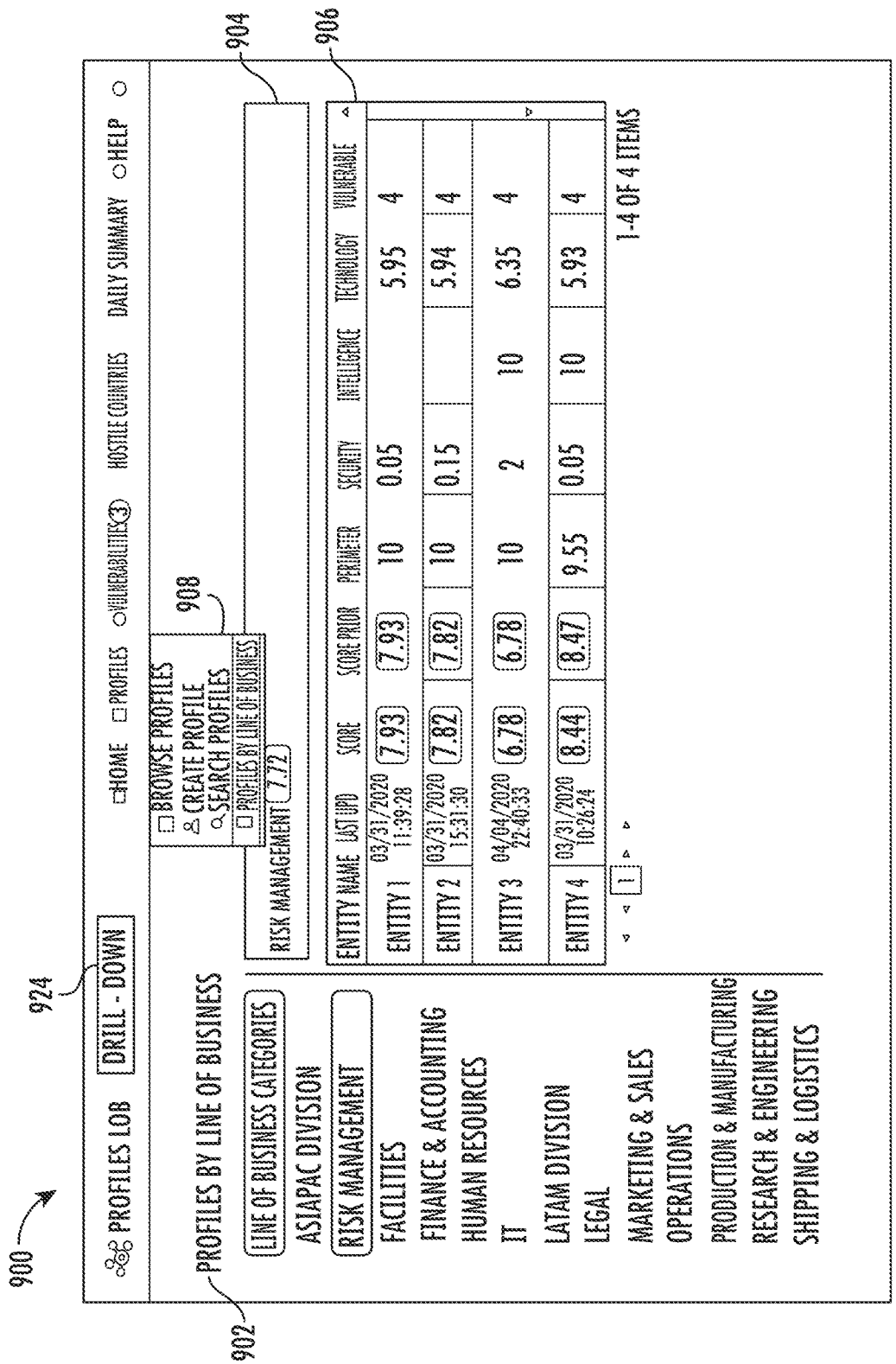
FIG. 9 is an example illustration of an arrangement of a user-interactive graphical user interface, according to some arrangements.

Referring now to FIG. 9, an example illustration of an arrangement of a user-interactive graphical user interface 900 (collectively referred to herein as "user-interactive interface 900") is shown, according to some arrangements. The user-interactive interface 900 comprises features and functionality described in detail with reference to FIG. 8. As shown, the user-interactive interface 900 can include a profile by line-of-business dashboard 902 such that line-of-business can be drilled-down on (e.g., utilizing the drop-down menu 908 and/or drill-down button 924). As shown, the line-of-business multi-dimensional score panel 904 displays the multi-dimensional score based on the line-of-business of one or more entity profiles. Also as shown, the line-of-business cybersecurity risk score trends panel 906 can include a list of entities (sometimes referred to as "vendors") and some entity data associated with each entity (e.g., category, last updated, score, score prior, composite, perimeter, security, intelligence, technology). In various arrangements, any list of grouped profiles and/or features of entity profiles can be displayed. The line-of-business cybersecurity risk score trends panel 906 can include trend information and recent changes to various entity profiles such as cybersecurity risk scores, multi-dimensional scores, remediation items, vulnerabilities. Further as shown, the drop-down menu 908 can include various navigational options such as browse profiles such that a list of all profiles is displayed, create profiles such that a new profile can be created, search profiles such that profiles can be searched by letters, numbers, and/or special characters, and profiles by line-of-business such that profiles can be displayed (and sometimes sorted) by line-of-business (as shown).

Figure 10:
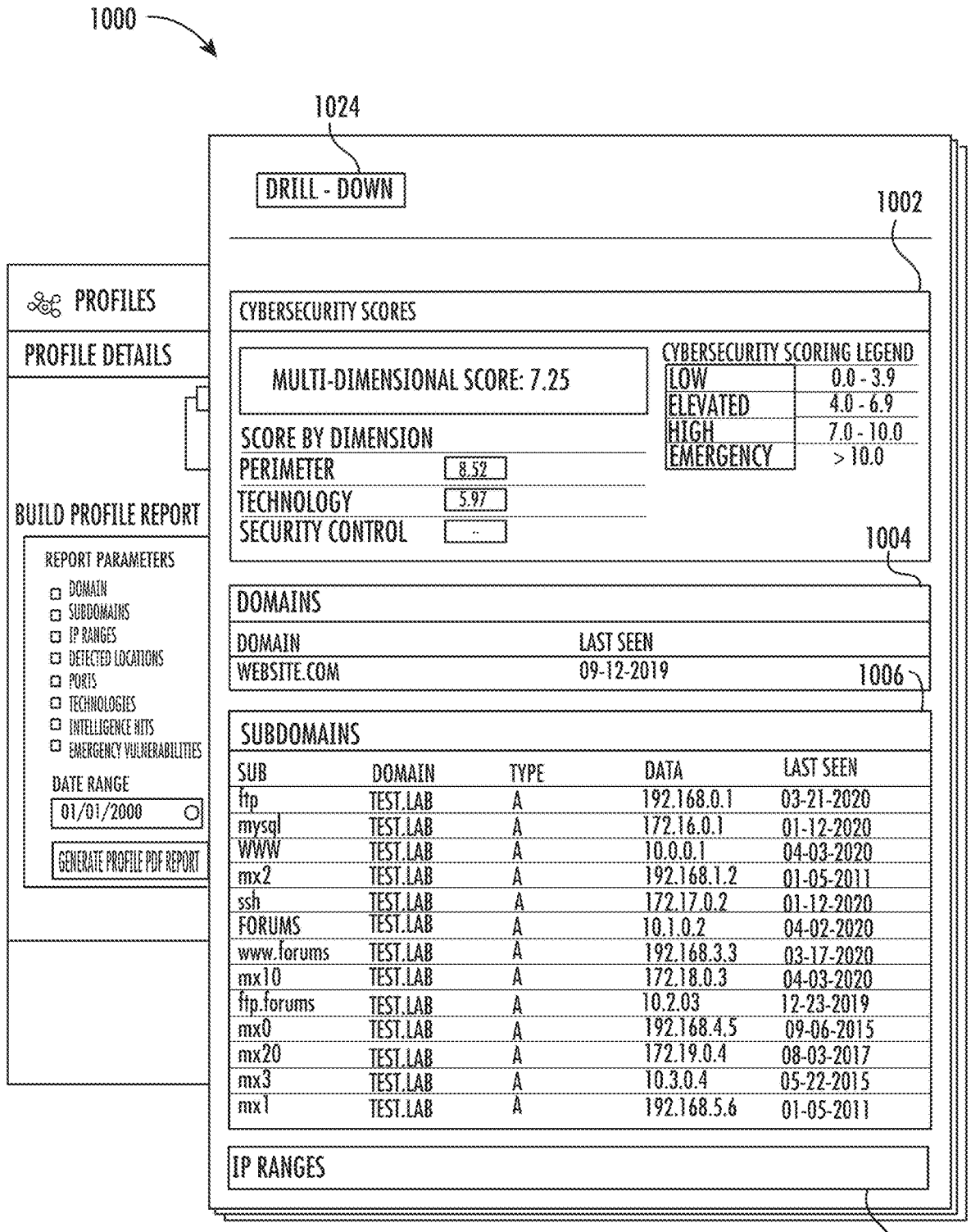
FIG. 10 is an example illustration of an arrangement of a user-interactive graphical user interface, according to some arrangements.

Referring now to FIG. 10, an example illustration of an arrangement of a user-interactive graphical user interface 1000 (collectively referred to herein as "user-interactive interface 1000") is shown, according to some arrangements. The user-interactive interface 1000 resembled similar features and functionality described in detail with reference to FIGS. 8-9. As shown, the user-interactive interface 1000 can include a profile specific dashboard that includes profile cybersecurity risk scores panel 1002, profile domains panel 1004, profile subdomains panel 1006, profile IP ranges 1008, and a drill-down button 1024. As shown, a profile can be associated with various domains, subdomains, and IP ranges such that entity data can be received, collected, and scanned based on analyzing the various domains, subdomains, and IP ranges. The multi-channel data fusion operations are explained in detail with reference to FIG. 1. In various arrangements, the user-interactive interface 1000 can display vulnerabilities and remediation items of the specific profile and provide metrics (e.g., graphs, tables) based on the number of vulnerabilities, remediation items, and the historical and trend information of them.

Figure 11:
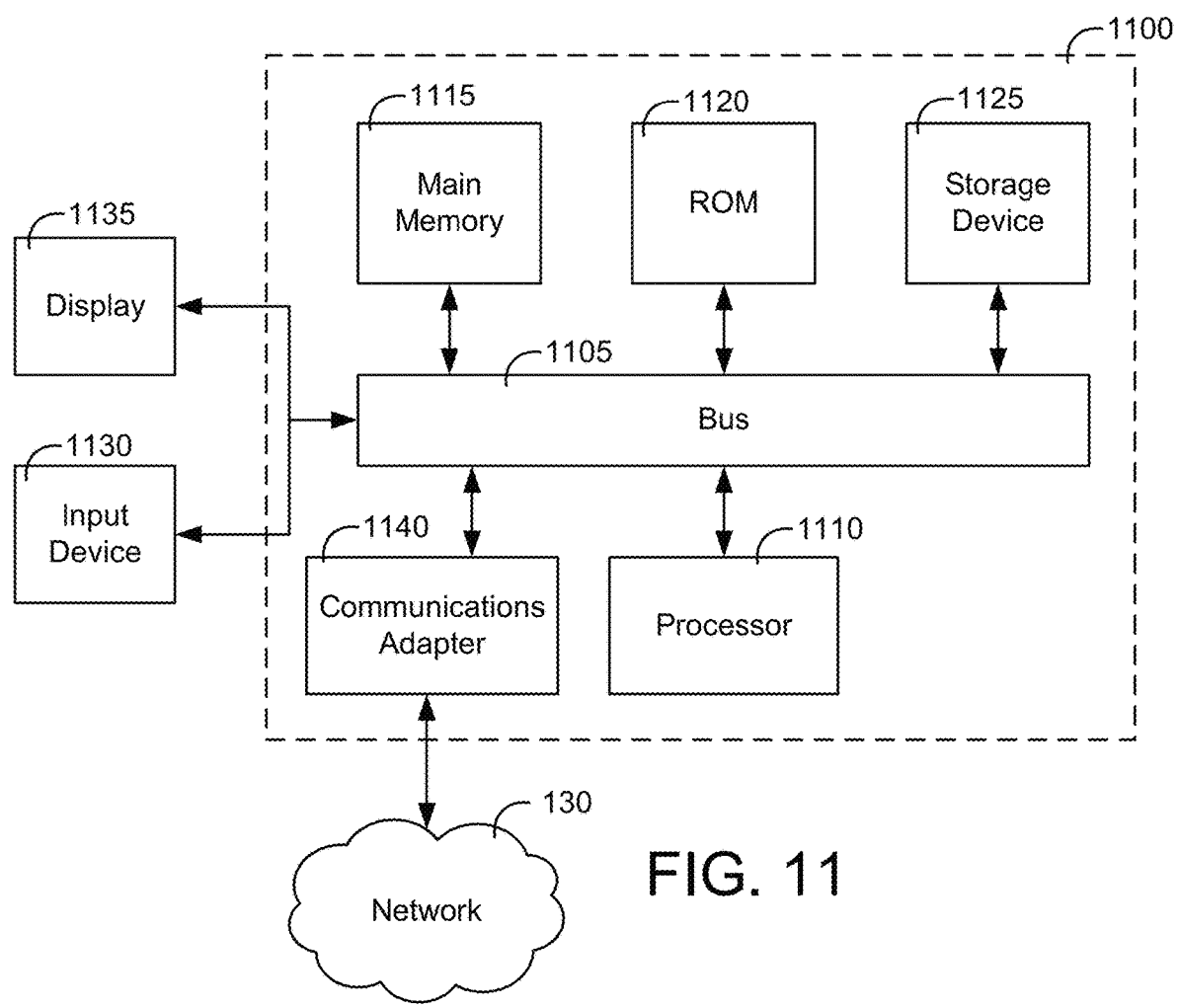
FIG. 11 is a block diagram illustrating an example computing system suitable for use in the various arrangements described herein.

Referring now to FIG. 11, a depiction of a computer system 1100 is shown. The computer system 1100 that can be used, for example, to implement a computing environment 100, multi-channel cybersecurity assurance system 110, user devices 140, entity devices 150, third-party devices 155, data sources 160, content management system 170, and/or various other example systems described in the present disclosure. The computing system 1100 includes a bus 1105 or other communication component for communicating information and a processor 1110 coupled to the bus 1105 for processing information. The computing system 1100 also includes main memory 1115, such as a random-access memory (RAM) or other dynamic storage device, coupled to the bus 1105 for storing information, and instructions to be executed by the processor 1110. Main memory 1115 can also be used for storing position information, temporary variables, or other intermediate information during execution of instructions by the processor 1110. The computing system 1100 may further include a read only memory (ROM) 1120 or other static storage device coupled to the bus 1105 for storing static information and instructions for the processor 1110. A storage device 1125, such as a solid-state device, magnetic disk or optical disk, is coupled to the bus 1105 for persistently storing information and instructions.

The computing system 1100 may be coupled via the bus 1105 to a display 1135, such as a liquid crystal display, or active matrix display, for displaying information to a user. An input device 1130, such as a keyboard including alphanumeric and other keys, may be coupled to the bus 1105 for communicating information, and command selections to the processor 1110. In another arrangement, the input device 1130 has a touch screen display 1135. The input device 1130 can include any type of biometric sensor, a cursor control, such as a mouse, a trackball, or cursor direction keys, for communicating direction information and command selections to the processor 1110 and for controlling cursor movement on the display 1135.

In some arrangements, the computing system 1100 may include a communications adapter 1140, such as a networking adapter. Communications adapter 1140 may be coupled to bus 1105 and may be configured to enable communications with a computing or communications network 130 and/or other computing systems. In various illustrative arrangements, any type of networking configuration may be achieved using communications adapter 1140, such as wired (e.g., via Ethernet), wireless (e.g., via WiFi, Bluetooth), satellite (e.g., via GPS) pre-configured, ad-hoc, LAN, WAN.

According to various arrangements, the processes that effectuate illustrative arrangements that are described herein can be achieved by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 11, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 11 as singular, stand-alone devices, one of ordinary skill in the art will appreciate that, in some arrangements, the computing system 1100 may comprise virtualized systems and/or system resources. For example, in some arrangements, the computing system 1100 may be a virtual switch, virtual router, virtual host, virtual server. In various arrangements, computing system 1100 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

Figure 12:
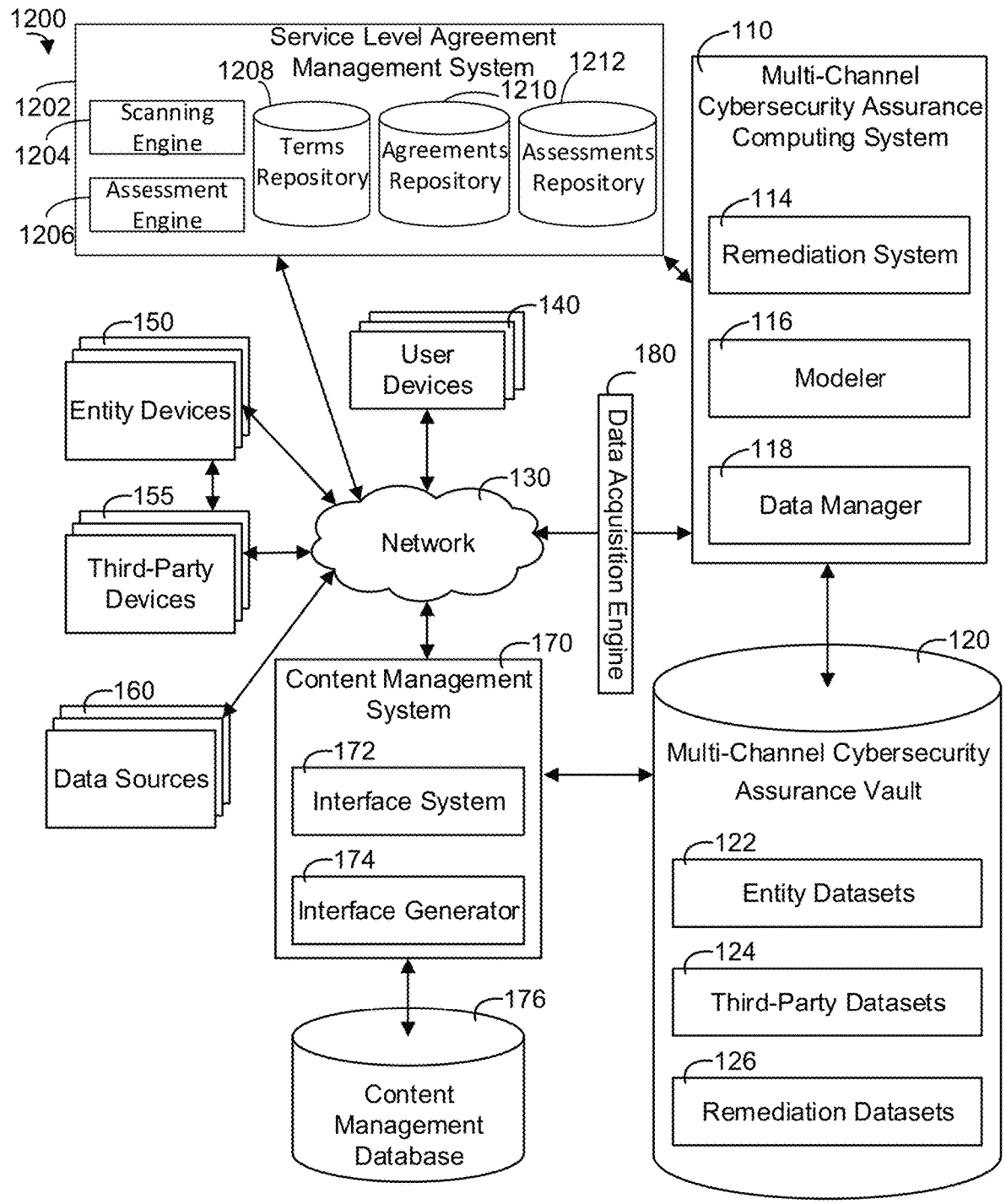
FIG. 12 is a block diagram depicting an example of a multi-channel cybersecurity assurance computing system and computing environment, according to an example arrangement, relative to FIG. 1.

Referring now to FIG. 12, a block diagram depicting an example of a multi-channel cybersecurity assurance computing system and computing environment 1200 is shown, according to an alternative arrangement. The multi-channel cybersecurity assurance computing system and computing environment 1200 as depicted further includes a service level agreement management system 1202. The service level agreement management system 1202 includes a scanning engine 1204, an assessment engine 1206, a terms repository 1208, an agreements repository 1210, and an assessments repository 1212. In combination, these components of the service level agreement management system 1202 are structured to facilitate the monitoring of computing resources in a system infrastructure of an entity based on one or more service level agreements with the entity. As used herein, the term "entity" is also sometimes referred to as "vendor" and can include a technology, applications, or services vendor to the operator of the cybersecurity assurance computing system and computing environment 1200.

The service level agreement management system 1202 can be structured as discussed herein with reference to the system components of FIGS. 1 and 11. That is, in various arrangements, the service level agreement management system 1202 contains a processor, memory, a network interface controller, and an input/output controller. The service level agreement management system 1202 may be implemented as a discrete (e.g., stand-alone) server, a group of two or more computing devices/servers, a distributed computing network, a cloud computing network, and/or other types of computing systems capable of accessing and communicating with one another using local and/or global networks (e.g., the network 130).

The scanning engine 1204 is structured to initiate (e.g., cause a third-party to perform) and/or perform dynamic infrastructure scans of a target system. That is, the scanning engine 1204 may cause scans to be performed (e.g., as described above with reference to the data acquisition engine 180 and FIGS. 1-3) and utilize the results independently, or in conjunction with, third-party scans initiated by the scanning engine 1204. In some arrangements, third-party scans may transmit result data back to the scanning engine 1204 (e.g., via the network 130). In other arrangements, the scanning engine may directly pull results from a third-party (e.g., via an API GET request made over the network 130). The target system may include a variety of network-enabled (e.g., structured to communicate over the network 130) components and applications associated with a vendor. A vendor is also sometimes referred to as an entity with reference to FIGS. 1-11. In some embodiments, the target system may consist of web servers (e.g., user displayed content and application programming interface (API) access points), email servers, payment processing servers, report generating software (e.g., application), and/or any variety of tangible network-enabled software or hardware associated with the vendor.

The assessment engine 1206 is structured to receive scan results (e.g., for a particular vendor and from the scanning engine 1204) and determine an assessed service level for the particular vendor. The assessed service level can be a value (e.g., LOW, MEDIUM, HIGH, a numerical score on a scale of 1-10, 1-100, etc.) corresponding to a degree of compliance for a vendor based on the terms contained in a service level agreement (SLA). The SLA is associated with the vendor as described further below and with reference to FIG. 13. Accordingly, the assessment engine 1206 is communicatively coupled to and configured to exchange information with the scanning engine 1204, terms repository 1208, agreements repository 1210, and the assessments repository 1212.

Still referring to FIG. 12, the service level agreement management system 1202 further includes a terms repository 1208. The terms repository 1208 is configured to retrievably hold (e.g., in cache memory), store (e.g., in non-transitory memory), and categorize data pertaining to terms of a service level agreement (e.g., as stored and discussed below with reference to the agreements repository 1210). In some arrangements, the terms repository 1208 contains an assessment mapping that defines a term through at least one key performance indicator(s) (KPI), a data set of KPI thresholds, a response protocol electronic item, a responsible party electronic item, and a performance credit or penalty electronic item. The assessment mapping can be based on any suitable algorithm. The electronic items within a particular assessment mapping can be retrievably stored in a single storage entity (e.g., a table) or in a relational fashion across a plurality of storage entities.

As referred to herein, the KPIs represent quantifiable measurements, ranges, and/or thresholds which are reflective of a particular term. For example, a vendor may have an SLA containing a system availability term. The system availability term may correlate (e.g., via mapping in the terms repository 1208) to a KPI. The KPI may define threshold(s) reflective of an expected average availability of hosted technology during each calendar month (e.g., at least or greater than 99.9%).

In another example, a vendor may have an SLA that includes a transaction response time term. In an example scenario, the transaction response time term may correlate to one or more KPIs. Examples of such KPIs are an average transaction response time for a calendar month and an average transaction response time for a consecutive three-day period. Furthermore, a KPI may be standardized in order to provide a uniform measurement across multiple vendors. For example, the KPI directed to an average availability of hosted technology during each calendar month may be expressed as Equation 4:

$$\text{Availability per Calendar Month} = \frac{(\text{Scheduled Uptime} - \text{Scheduled Downtime} - \text{Unscheduled Downtime})}{(\text{Scheduled Uptime} - \text{Scheduled Downtime})} * 100$$

The terms of the equation are discussed further below with reference to FIG. 13.

The service level agreement management system 1202 further includes an agreements repository 1210. The agreements repository 1210 is configured to retrievably hold (e.g., in cache memory), store (e.g., in non-transitory memory), and categorize data pertaining to service level agreements (e.g., for particular vendors/entities). In some arrangements, the service level agreements contained in the agreements repository 1210 may contain a combination of raw data and data mapping elements. For example, the agreements repository 1210 may contain a service level agreement, which may contain both raw data (e.g., plaintext alphanumeric values) and data objects which map to terms (e.g. an assessment record can map via double-layer mapping between SLA(s), terms, and assessment maps, where each pair of terms can be a one-to-one or a one-to-many relationship). Accordingly, in some arrangements, a processor of the service level agreement management system 1202 may retrieve the various mappings and associations and compile them into plaintext before a human-readable version of the SLA may be displayed (e.g., through a user interface as described with reference to FIGS. 14-16).

The service level agreement management system 1202 further includes an assessments repository 1212. The assessments repository 1212 is configured to retrievably hold (e.g., in cache memory), store (e.g., in non-transitory memory), and categorize data pertaining to assessments previously completed by the assessment engine 1206. The previously completed assessments may contain various data points related to performance against a particular SLA and/or, more specifically, a detected SLA violation, such as an affected component (e.g., server IP/port), a time and date of the violation (e.g., when the issue was detected), a notified party (e.g., admin X at Vendor Y was notified at time/date), a service level value as assessed by the assessment engine 1206 (e.g., Low, Medium, High, etc.), a remediation action taken (e.g., admin X at Vendor Y began monitoring intermittent outages at time/date in response to the notification of violation), and a response parameter regarding the violation (e.g., admin X at Vendor Y submits a response to the violation as part of the remediation process).

Figure 13:
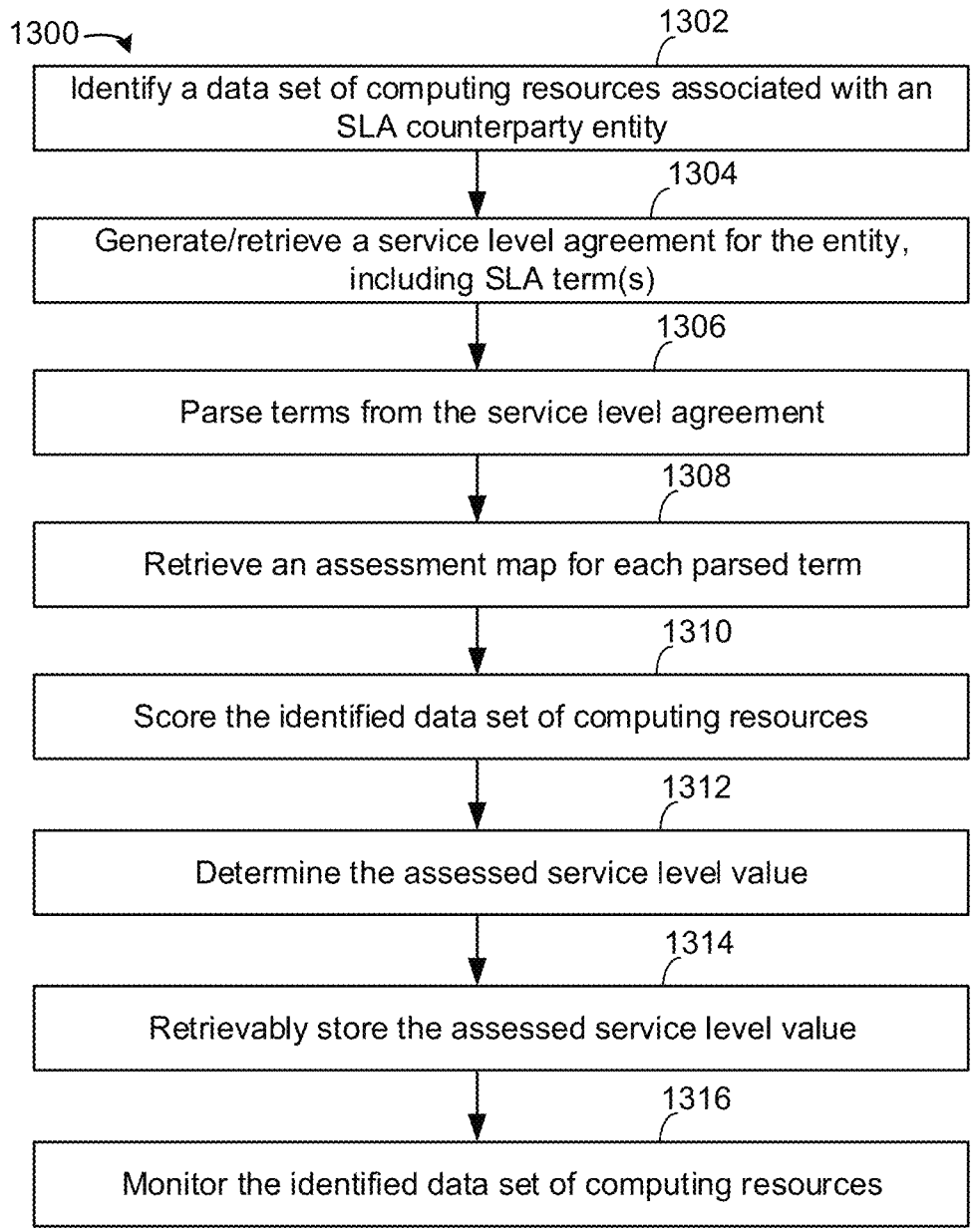
FIG. 13 is a flow diagram of a method for monitoring and enforcing a service level agreement using the system of FIG. 1, according to an example arrangement.

Referring now to FIG. 13, a flow diagram for a method 1300 for monitoring and enforcing a service level agreement is shown according to an example embodiment. Method 1300 may be performed using the system of FIG. 12, thus reference to the components of FIG. 12 may be used to aid the description of method 1300. As a general overview, method 1300 includes: identifying a data set of computing resources associated with an service level agreement counterparty entity (e.g., vendor); generating/retrieving a service level agreement for the identified entity, including at least one SLA term; parsing the term(s) from the service level agreement; retrieving an assessment map for each parsed term; scoring the identified data set of computing resources; determining the assessed service level value; retrievably storing the assessed service level value; and monitoring the identified data set of computing resources.

The method 1300 begins at process 1302, where the service level agreement management system 1202 identifies a data set of computing resources associated with an SLA for a counterpart entity (e.g., the vendor to whom the SLA is directed) via the scanning engine 1204. The data set of computing resources may be identified via a dynamic infrastructure discovery process as described in FIG. 1. For example, in various arrangements, the scanning engine 1204 can be configured to initiate a scan, via the data acquisition engine 180, for a plurality of data from a plurality of data sources based on analyzing device connectivity data, network properties (e.g., status, nodes, element-level (sub-document level), group-level, network-level, size, density, connectedness, clustering, attributes) and/or network information (e.g., IP traffic, domain traffic, sub-domain traffic, connected devices, software, infrastructure, bandwidth) of a target computer network environment and/or environments of the entity or associated with the entity (e.g., the vendor). The operations to fuse various properties of data returned via the scan can include a number of different actions, which can parsing device connectivity data, packet segmentation, predictive analytics, cross-referencing to data regarding known vulnerabilities, and/or searching data regarding application security history. These operations can be performed to identify hosts, ports, and services in a target computer network environment. The target computer network environment can be identified by a unique identifier, such as a domain identifier (e.g., a top-level domain (TLD) identifier, a subdomain identifier, a URL string pointing to a particular directory), an IP address, a subnet, etc. Further, the target computer network environment can be defined with more granularity to encompass a particular component (e.g., an entity identified by an IP address, software/applications/operating systems/exposed API functions associated with a particular port number, IP address, subnet, domain identifier). In some arrangements, one or more particular target computer network environments can be linked to an entity profile (e.g., in the entity datasets 122). In one example, scanning can include parsing out packet and/or device connectivity data properties that may indicate available UDP and TCP network services running on the target computer network environment. In another example, scanning can include parsing out packet and/or device connectivity data that indicates the operating systems (OS) in use on the target computer network environment. In yet another example, scanning and data fusion operations can include retrieving content from a news source that indicates a particular security vulnerabilities in a particular component (e.g., software, port number, operating system) identified from the parsed packet data. These various data items can be relationally mapped to one another using any suitable property designated as a mapping key, using a combination of properties, or using a segment of a property. Some examples or mapping keys may include IP addresses, software, application, port number, protocol name and/or protocol version, entity or company name, company location, device location, etc. However, one of skill will appreciate that other suitable properties derived from device connectivity data, IP packet data, and/or intelligence data can be used as mapping keys.

In some implementations, various new components of an entity infrastructure can be dynamically discovered.

At process 1304, the service level agreement management system 1202 references (e.g., generates based on an applicable template or retrieves) a service level agreement for the entity (e.g., the vendor) from the agreements repository 1210. That is, the service level agreement management system 1202 may initially analyze characteristics of the entity (e.g., scale, criticality of systems, client or internally facing systems, etc.) and subsequently select a default SLA template which most accurately correlates to the characteristics of the entity. Accordingly, the service level agreement management system 1202 may then generate an SLA for the entity (e.g., create a new copy of the selected SLA template and modify it with pertinent details of the entity). The retrieval process may be a direct query to the repository (e.g., a native query in MySQL, PostgreSQL, etc.) or, in some arrangements, an API call to a web server that provides data on behalf of the repository. In other arrangements, the service level agreement management system 1202 may generate a default SLA (e.g., containing predetermined terms, KPIs, KPI thresholds, etc.) in response to detecting a new system/component (e.g., as discussed below with reference to FIG. 16). The service level agreement may then be held in a cache or non-transitory memory of the service level agreement management system 1202 for future manipulation.

At process 1306, the service level agreement management system 1202 parses a data set of terms from the retrieved service level agreement of process 1302. The terms contained in the parsed data set of terms may include a variety of contractual directives that dictate a required level of service associated with particular facets or dimensions of the technology hosted by an entity (e.g., vendor). In some arrangements, the service level agreement management system 1202 may parse the terms via an iterative process which reads and identifies terms from each line (i.e. record) of the service level agreement. In other arrangements, the service level agreement management system 1202 may parse the terms via a process which seeks and jumps to specific lines of the service level agreement (e.g., where predetermined line numbers contain term entries). In such arrangements, the processing power of the service level agreement management system 1202 may be conserved as the predetermined line number system prevents parsing superfluous or extraneous information not required by the method 1300 (e.g., human-readable aspects that are included for displaying the SLA to humans, such as via the user interface described in FIGS. 14-16).

At process 1308, the service level agreement management system 1202 retrieves an assessment map for the terms contained in the data set of parsed terms from the terms repository 1208. The assessment map may be a relational map that defines a term through at least one key performance indicator(s) (KPI), a data set of KPI thresholds, a response protocol, a responsible party, and a performance credit or penalty. For example, a particular entity may have an SLA containing terms directed to the availability of the technology hosted by the entity. In such an example, the assessment map may be defined by Equation 5:

Availability = $KPI$(average availability of hosted technology during each calendar month), $KPI$ thresholds, Response protocol, responsible party, performance credit Continuing the example of an SLA containing terms directed to availability, the KPI of average availability of hosted technology during each calendar month may be broken down into an equation, such as Equation 4 discussed above with reference to FIG. 12. The equation of the KPI includes equation terms for an actual service level of the entity to compare to the data set of KPI thresholds. Consider the following information as an example baseline: there are 1440 minutes in a day; there are (i) 44,640 minutes in a 31 day calendar month; (ii) 43,200 minutes in a 30 day calendar month; (iii) 41,760 minutes in a 29 day calendar month; and (iv) 40,320 minutes in a 28 day calendar month. Additionally, the equation may further include a cap value. The cap value is the maximum number of minutes in a calendar month that all or part of the hosted technology is allowed to be unavailable due to scheduled maintenance. In some arrangements, the cap value may be pre-set to a suitable default level, such as 480 minutes. Accordingly, with a cap value of 480 minutes, an entity would be allowed up to approximately eight hours of scheduled maintenance per calendar month. In other arrangements, the cap value may be negotiated with each respective entity (e.g., based on the scale and criticality of the system supported by the entity). In some arrangements, any reduction in availability (e.g., downtime) beyond the cap value, regardless of whether the availability reduction was scheduled or not, must be accounted for in the unscheduled downtime term of the equation. To further elaborate on the equation, consider the following variable definitions: Scheduled Downtime is the total number of minutes in a calendar month that all or part of the hosted technology is not available due to scheduled maintenance of the system, or components of the system (e.g., within the cap value); Scheduled Uptime is the total number of minutes in a calendar month that the hosted technology may be available (e.g., per days in the month as discussed above); Unscheduled Downtime is the total number of minutes in a calendar month that all or part of the hosted technology is not available, less the scheduled downtime (e.g., scheduled downtime within the cap value). In some arrangements, the scheduled maintenance of a system or component of a system requires a notice from the entity prior to the maintenance and within a predetermined amount of time (e.g., 10 business days before the maintenance). Therefore, an example KPI computation for an actual service level may be defined by Equation 6:

$$\text{Availability per Calendar Month} = \frac{(44,640 - 480 - 60)}{(44,640 - 80)} * 100 = 99.86\%$$

The data set of KPI thresholds provides value ranges to compare a desired level of service to the actual service level (e.g., the 99.86% in the example above). For example, a particular data set of KPI thresholds may represent three service levels: High (>99.9%), Medium (>96%), and Low (<96%). Accordingly, the entity of the equation is assessed to be in the "Medium" category of service level for the availability per calendar month KPI.

A response protocol provides an entity with recommendations to improve the actual service level for the associated KPI. Continuing the example, the response protocol may instruct the entity to download and use a diagnostic tool which monitors the service for unscheduled downtime, and subsequently captures and stores the relevant log files (e.g., the sections of the log corresponding to service outages). Depending on the nature of the issue, the response protocol may also be a more direct solution, such as running a script or application, as may be applicable for an error correction KPI (e.g., as discussed below with reference to various SLA examples).

The responsible party may be any user designated as an official point of contact for the entity, such as a: service administrator, project manager, lead developer, account manager, etc. In some arrangements, the responsible party may represent both a point of contact for the entity and a point of contact for a provider institution associated with the service level agreement management system 1202 (e.g., an SLA account manager).

The performance credit or penalty is a punitive measure levied against an entity (e.g., vendor) based on assessed service values (e.g., as they correlate to KPI thresholds). Continuing the availability SLA example, an entity may receive a 0% performance credit for achieving a "High" service level (e.g., no penalty), a 20% performance credit for a "Medium" level of service, and a 35% performance credit for a "Low" level of service. In some arrangements, the performance credit may be applied to the next bill received from the entity, thereby effectively reducing the income of the entity as a punitive measure. Furthermore, in some arrangements, the performance credit values (e.g., 0%, 20%, and 35%) may be adjusted to be individually customized for the entity (e.g., punitive measures adjusted based on the scale and criticality of the system associated with the SLA). In some arrangements, the entity may have been pre-paid for services or utilize a non-standard billing schedule, and therefore be required to issue a refund within a predetermined amount of time (e.g., within a week). In arrangements where the entity has or supports both a production environment and at least one non-production environment (e.g., a development environment), the entity may receive a service level agreement with different terms for every environment. For example, the non-production environments may have much-less stringent, or even absent, terms pertaining to an availability SLA (e.g., as the provider institution associated with the service level agreement management system 1202 has no vested interest in the uptime of a non-public testing/development environment). Accordingly, an environment identifier may be generated and stored relationally to a particular assessment map or SLA. The environment identifier may include a device address (e.g., parsed from the received device connectivity data after a scan), a URL, a path to a particular file or directory, or another suitable identifier.

In some arrangements, there may exist multiple SLAs for a particular entity. The terms of the SLAs may be directed to a variety of technological and business practices. As an example, an entity may have an SLA with terms directed to transaction response time. It may have KPIs, such as, for example, the average transaction response time for each calendar month and the average transaction response time for each consecutive three day period. A transaction response time is measured as the total number of seconds, or portions thereof (e.g., milliseconds), that it takes for an entity system to process a request from an authorized user. The total number of seconds representing the transaction response time may begin from the moment a system of the entity receives a request and end when the system of the entity transmits a response. In some arrangements, the total number of seconds may be adjusted for applicable system latency (e.g., the period of delay between an instruction to transfer data and the actual action of transferring of the data). Furthermore, the transaction response SLA may be customized based on the entity (e.g., a fast response or low latency requiring service may need adjusted KPI threshold values). An example KPI equation for the average transaction response time for each calendar month may be expressed as Equation 7:

$$\text{Average transaction response time for each calendar month} = \frac{\left( \begin{array}{c} \text{Total transaction response times for all requests} \\ \text{from authorized users in a calendar month} \end{array} \right)}{\text{(Total number of requests from authorized users in a calendar month)}}$$

An example KPI equation for the average transaction response time for each consecutive three day period may be defined by Equation 8:

$$\text{Average transaction response time for each consecutive three day period} = \frac{\left( \begin{array}{c} \text{Total transaction response times for all requests} \\ \text{from authorized users in a consecutive three (3)day period} \end{array} \right)}{\text{(Total number of requests from authorized users in a consecutive three (3)day period)}}$$

Example KPI threshold values which, in some arrangements, correlate to performance credits may be:

| High   | Between 0-0.5 seconds  | 0% performance credit  |
|--------|------------------------|------------------------|
| Medium | Between 0.51-2 seconds | 20% performance credit |
| Low    | Longer than 2 seconds  | 35% performance credit |

Another example SLA may contain terms directed to maintenance response times. An SLA with terms directed to maintenance response times may have direct one-to-one KPIs (e.g., a Boolean equation, where the entity is either in compliance or not). For example, it may have KPIs, such as, the entity will ensure that it responds within (i) thirty (30) minutes of an initial service request from the provider institution for assistance with a moderately severe error, and within (ii) four (4) business hours (based on the time zone of the responsible party associated with the provider institution that makes an initial service request) for extremely severe errors. In some examples, the business hours may count the hours between 8:30 A.M. and 5:30 P.M. Additionally, in some arrangements, the SLA may have a flat-rate performance credit (e.g., rather than a percentage). Furthermore, in some arrangements, the entity may negotiate with the provider institution to receive a customized SLA (e.g., adjustments made to the maintenance response times and the performance credit values). Example KPI threshold values (e.g., number of occurrences where an entity failed to meet the KPIs as discussed above) with flat-rate performance credits may be:

| High   | 0 occurrences         | $0 performance credit |
|--------|-----------------------|-----------------------|
| Medium | 1-2 occurrences       | $1,000 per occurrence |
| Low    | 3 or more occurrences | $2,500 per occurrence |

Yet another example SLA may contain terms directed to error correction times. Such an SLA may also have direct one-to-one KPIs, such as, for example, the entity will provide: (i) an error fix within four (4) hours for an extremely severe error after the first report from the provider institution, or from when the entity first became aware of the error, whichever occurred first. If the entity should provide a temporary workaround, an actual error fix must be completed within twenty-four (24). (ii) an error fix within eight (8) hours for a moderately sever error after the first report from the provider institution, or from when the entity first became aware of the error, whichever occurred first. If the entity should provide a temporary workaround, an actual error fix must be completed within seventy-two (72) hours. (iii) an error fix for a low-severity error no later than the next scheduled update after the first report from the provider institution, or from when the entity first became aware of the error, which occurred first. If the next scheduled update is less than 30 days from the identification of the error, the entity may fix the error in the subsequent update. In some arrangements, the entity may negotiate with the provider institution to receive a customized SLA (e.g., adjustments made to the error correction times and the performance credit values). Example KPI threshold values (e.g., number of occurrences where an entity failed to meet the KPIs as discussed above) with flat-rate performance credits may be:

| High   | 0 occurrences         | $0 performance credit |
|--------|-----------------------|-----------------------|
| Medium | 1-2 occurrences       | $1,000 per occurrence |
| Low    | 3 or more occurrences | $2,500 per occurrence |

Another example SLA may contain terms directed to reporting obligations (e.g., such as an obligation to report for the Harmonized Tariff Schedule (HTS)). Such an SLA may also have direct one-to-one KPIs, such as, for example, the entity will ensure that each report due to the provider institution is: (i) complete; (ii) accurate; and (iii) provided in a timely manner according to a predetermined schedule. In some arrangements, the entity may negotiate with the provider institution to receive a customized SLA (e.g., adjustments made to the performance credit values). Example KPI threshold values (e.g., number of occurrences where an entity failed to meet the KPIs as discussed above) with flat-rate performance credits may be:

| High   | 0 occurrences         | $0 performance credit |
|--------|-----------------------|-----------------------|
| Medium | 1-2 occurrences       | $1,000 per occurrence |
| Low    | 3 or more occurrences | $2,500 per occurrence |

Still referring to FIG. 13, at process 1310, the service level agreement management system 1202 scores the identified data set of computing resources from process 1302. The scoring may occur as described above (with reference to FIGS. 1-11) and may utilize the modeler 116 (or data manager 118), which can be configured to assign dimensions to each item of data that have been received, collected, and/or scanned. Each item of data can be linked to one or more specific data channels and each cybersecurity dimension can include a plurality of items of data (collectively referred to herein as "subsets of data"). Accordingly, each cybersecurity dimension can include a subset of data that the modeler 116 can utilize to analyze and generate cybersecurity risk scores for each cybersecurity dimension. In various arrangements, each cybersecurity dimension can be incorporated into the multi-dimensional score such that standardized overall cybersecurity can be quantified. That is, each entity profile can receive a multi-dimensional score such that entity profiles can be compared, historical information can be tracked, and trends over time can be established. Furthermore, in some arrangements, the process 1302 and the process 1310 may be completed prior to, or separate from, the method 1300 as part of the scan and discovery process illustrated herein with reference to FIGS. 1-11.

At process 1312, the assessment engine 1206 of the service level agreement management system 1202 determines an assessed service level value for the identified data set of computing resources (e.g., as it pertains to an SLA). In some arrangements, the assessed service level value may be determined according to an average (or another suitable aggregation) of actual service levels as they relate to the KPI thresholds. For example, a system may have actual service levels of: 92% availability for the calendar month (Low) and 99.9% availability for the last 3 consecutive days (High). In an arrangement that utilizes averages, the assessment engine 1206 may average these service levels and determine an assessed service level value of "Medium" (e.g., for an availability SLA). In another arrangement, the assessment engine 1206 may assign numerical values to the Low, Medium, and High categories (e.g., 1, 2, and 3) and weights to the KPIs (e.g., total availability in a calendar month is more important than a period of 3 consecutive days) prior to averaging. For example, the assessment engine 1206 may impart a weight of 1.5 to the availability per calendar month KPI, resulting in an assessment of:

$$\text{Assessed Service Level Value} = \frac{1.5*1 + 1*2}{2} = 1.75.$$

In some arrangements, the assessment engine 1206 may truncate decimals (e.g., 1.75 equals an assessed value of "Low"). In other arrangements, the assessment engine 1206 may round the result to the nearest whole number (e.g., 1.75 equals an assessed value of "Medium").

At process 1314, the assessment engine 1206 retrievably stores the assessment, including the assessed service level, in the assessments repository 1212. The assessments may contain various data points related to the assessment, such as: the affected component (e.g., server IP/port), the time and date of the violation (e.g., when the issue was detected), the notified party (e.g., admin X at Vendor Y was notified at time/date), the service level value as assessed by the assessment engine 1206 (e.g., Low, Medium, High, etc.), the remediation action taken (e.g., admin X at Vendor Y began monitoring intermittent outages at time/date in response to the notification of violation), and the response parameter regarding the violation (e.g., admin X at Vendor Y submits a response to the violation as part of the remediation process, as described further with reference to FIGS. 14-16). The assessment may be stored via a direct query to the repository (e.g., a native query in MySQL, PostgreSQL, etc.) or, in some arrangements, an API call to a web server that provides and stores data on behalf of the repository.

At process 1316, the service level agreement management system 1202 monitors the identified data set of computing resources. That is, the service level agreement management system 1202 periodically initiates scans (e.g., such as described in process 1302) of the computing resources identified in the data set. In some arrangements, the interval defining the periodically initiated scans may be predetermined (e.g., daily, weekly, monthly, etc.). In other arrangements, the interval may be based on the assessed service level value (e.g., a low service value may require more frequent scans to verify compliance and improve the assessed service level).

Figure 14:
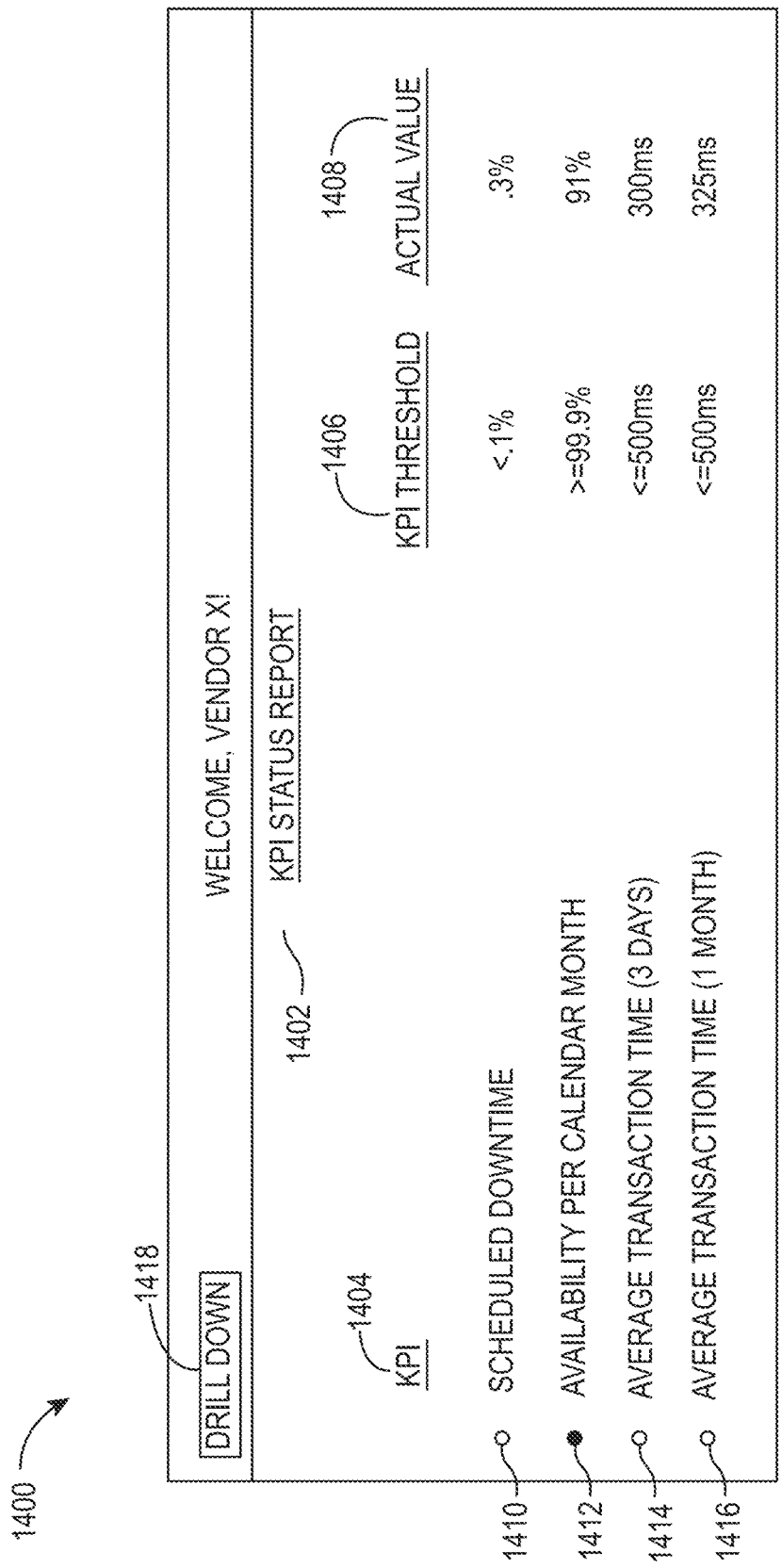
FIG. 14 is an example illustration of a service level agreement user-interactive graphical user interface, according to some arrangements.

Referring now to FIG. 14, an example illustration of a service level agreement user-interactive graphical user interface 1400 is shown, according to some arrangements. The display of 1400 may be provided to a user authorized with an entity (e.g., an account manager, administrator, etc.) via the content management system 170. The interface generator 174 of the content management system 170 can generate customized user-interactive dashboards for one or more entities, such as the entity devices 150 and/or the third-party devices 155, based on data received from multi-channel cybersecurity assurance system 110, the service level agreement management system 1202, any other computing device described herein, and/or any database described herein (e.g., 120, 176). The generated dashboards can include various data (e.g., data stored in the content management database 176, assessments repository 1212, and/or multi-channel cybersecurity assurance vault 120) associated with one or more entities including cybersecurity risk scores (e.g., intelligence, perimeter, technology, and/or security controls), multi-dimensional scores, remediation items, remediation actions/executables, assessments, security reports, data analytics, graphs, charts, historical data, historical trends, vulnerabilities, summaries, help information, line of business profiles, domain information, and/or subdomain information.

The display of 1400 includes a section title 1402; section columns 1404, 1406, and 1408; selectable section rows 1410, 1412, 1414, and 1416 corresponding to the section columns; and a "drill down" button 1418. The section title 1402, "KPI STATUS REPORT" as shown, labels and otherwise identifies the contents of the display 1400 to the authorized user. That is, the section title 1402 serves as a classifying title for the section columns and selectable section rows.

The section columns 1404, 1406, and 1408 are depicted as textual (e.g., Strings) entries which classify the data held in the rows below them. For example, section column 1404, "KPI", identifies the contents of the rows below (e.g., 1410, 1412, 1414, and 1416) as particular KPIs. Similarly, section column 1406, "KPI THRESHOLD", identifies the contents of the rows below as KPI thresholds. In the depicted example, the KPI threshold values are those corresponding to a "High" service level value. Continuing, section column 1408, "ACTUAL VALUE", identifies the contents of the rows below as actual service level values as determined during, for example, the method 1300.

The selectable section rows (e.g., 1410, 1412, 1414, and 1416) represent a particular KPI that the authorized user may wish to "drill down" on (e.g., as further discussed below with reference to the "drill down" button 1418). As depicted, the authorized user has made a selection of row 1412. Row 1412 shows data points pertaining to the "availability per calendar month" KPI such as the "High" service level KPI threshold value of >=99.9% and an actual value of 91% (e.g., per the last assessment).

Figure 15:
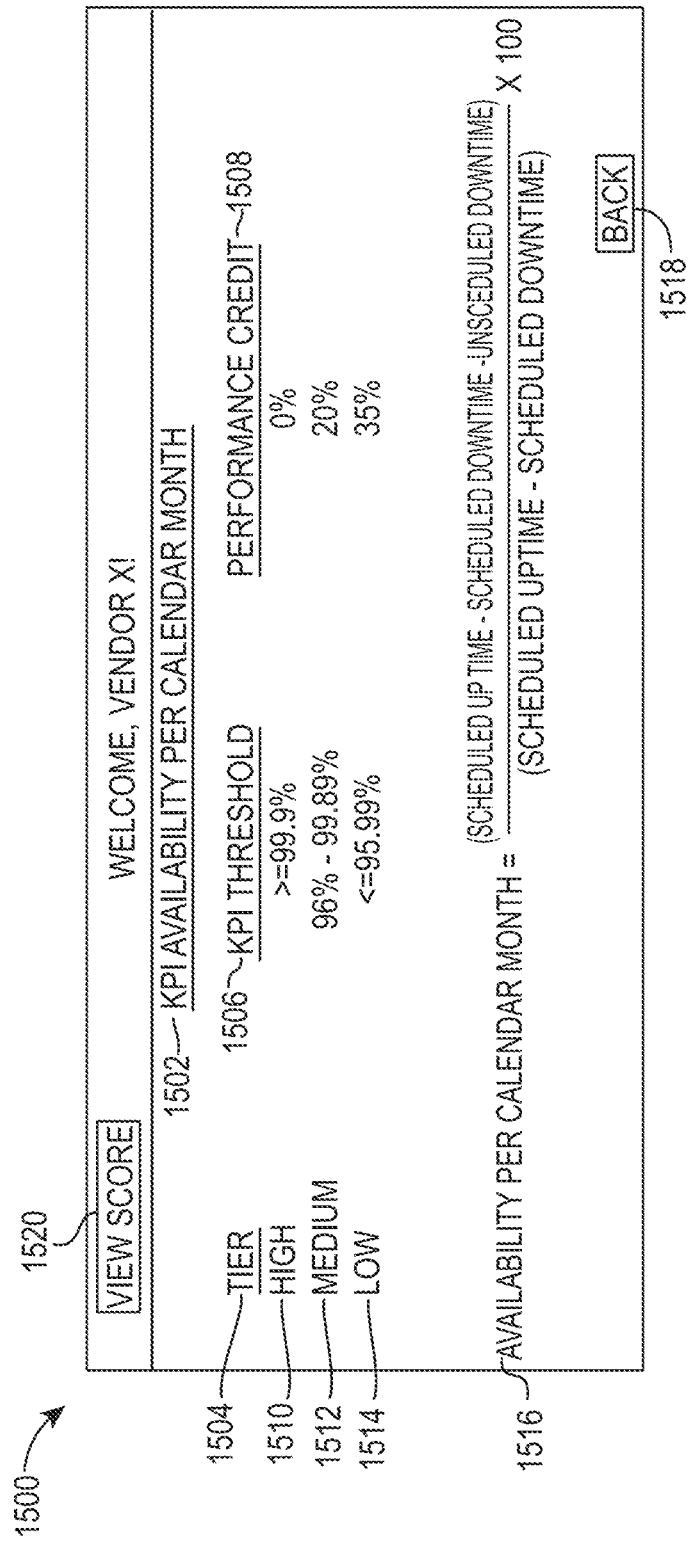
FIG. 15 is an example illustration of a service level agreement user-interactive graphical user interface, relative to FIG. 14, and according to some arrangements.

1418 shows a "drill down" button that transitions the authorized user to FIG. 15, based on the selected KPI row. That is, the authorized user may drill down from the display of 1400 to another display (e.g., the display of FIG. 15) which provides more information regarding the selected KPI.

Now referring to FIG. 15, an example illustration of a service level agreement user-interactive graphical user interface, relative to FIG. 14, is shown according to some arrangements. The display of 1500 may be similarly generated and provided via the content management system 170 as discussed above with reference to FIG. 14. The display of 1500 depicts a transition display in response to the authorized user selecting row 1412 of FIG. 14 and subsequently pressing the "drill down" button 1418.

The display 1500 includes a section title 1502; section columns 1504, 1506, and 1508; section rows 1510, 1512, and 1514; an equation relating to the KPI 1516; a "BACK" button 1518; and a "VIEW SCORE" button 1520. The section title 1502, "KPI AVAILABILITY PER CALENDAR MONTH" as shown, provides a textual (e.g., String) classification of the contents of the screen, based on the selected row of FIG. 14 (e.g., the contents of the depicted screen are related to the availability per calendar month KPI).

The section columns 1504, 1506, and 1508 are depicted as textual (e.g., Strings) entries which classify the data held in the rows below them. For example, section column 1504, "TIER", identifies the contents of the rows below (e.g., 1510, 1512, and 1514) as tiers of service levels (e.g., service level value). Similarly, section column 1506, "KPI THRESHOLD", identifies the contents of the rows below as the KPI thresholds (e.g., as they correlate to the tiers). Section column 1508, "PERFORMANCE CREDIT", identifies the contents of the rows below as the performance credit values (e.g., as they correlate to the tiers).

The section rows 1510, 1512, and 1514 represent data sets correlating to service level values (e.g., as defined by a particular SLA). For example, section row 1510 represents a data set correlating to a "High" service level value for the availability per calendar month KPI. A service level value of "High" is identified as having a KPI threshold of >=99.9% and a performance credit of 0%. Section row 1512 represents a data set correlating to a "Medium" service level value for the availability per calendar month KPI. A service level value of "Medium" is identified as having a KPI threshold of 96%-99.89% and a performance credit of 20%. Similarly, section row 1514 represents a data set correlating to a "Low" service level value for the availability per calendar month KPI. A service level value of "Low" is identified as having a KPI threshold of <=95.99% and a performance credit of 35%.

The equation relating to the KPI 1516 is a textual depiction of the equation utilized in the determination of actual service level value for the KPI identified by 1502. In the depicted example, the availability per calendar month formula (e.g., as illustrated and discussed above) is displayed.

The display 1500 includes a "BACK" button 1518. The button 1518 is a selectable (e.g., clickable) button of the provided graphical user interface which transitions the authorized user back to the display of FIG. 14. The authorized user may then make a new selection of a KPI to drill down from.

The "VIEW SCORE" button 1520 enables the authorized user to transition to a display containing their multi-dimensional score (e.g., as discussed above with reference to FIGS. 1-11).

Figure 16:
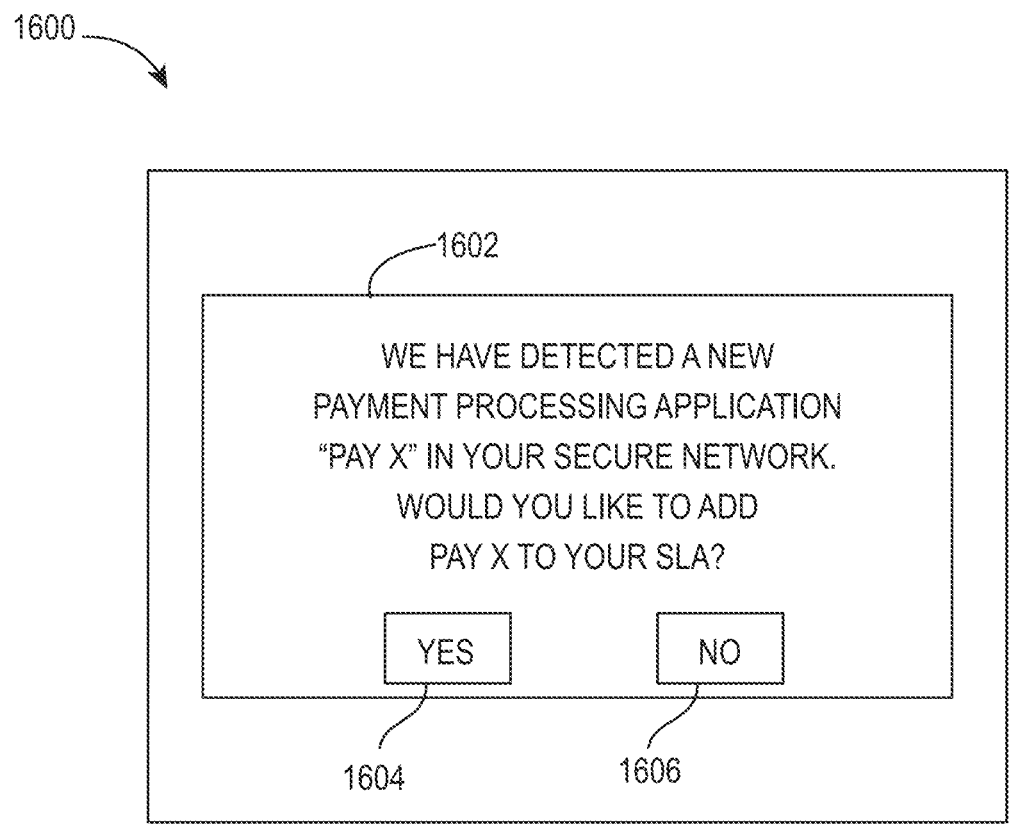
FIG. 16 is an example illustration of a service level agreement user-interactive graphical user interface, relative to FIGS. 14 and 15, and according to some arrangements.

Now referring to FIG. 16, an example illustration of a service level agreement user-interactive graphical user interface, relative to FIGS. 14 and 15, is shown, according to some arrangements. The display 1600 depicts a user-interactive pop-up style box 1602 generated in response to a discovery of a new system component (e.g., via dynamic infrastructure discovery as described in process 1302). The pop-up style box 1602 contains a text (e.g., String) statement, a "YES" button 1604, and a "NO" button 1606. In the depicted example, the text statement alerts the authorized user that the service level agreement management system 1202 has detected a new application, "PAYX" and prompts the authorized user to automatically generate a SLA for the application (e.g., with default KPIs, KPI Thresholds, and Performance Credit values).

The "YES" button 1604 is structured to initiate the process of 1304 in response to being selected (e.g., clicked). That is, the "YES" button 1604 may cause an SLA to be generated (e.g., as discussed above and in process 1302) for the detected PayX application and subsequently to be stored in the assessments repository 1212.

The "NO" button 1606 is structured to close the pop-up style box 1602 in response to being selected (e.g., clicked). That is, the "NO" button 1606 may cause the pop-up style box 1602 to disappear from the display 1600 (e.g., without generating and storing a new SLA).

Figure 17:
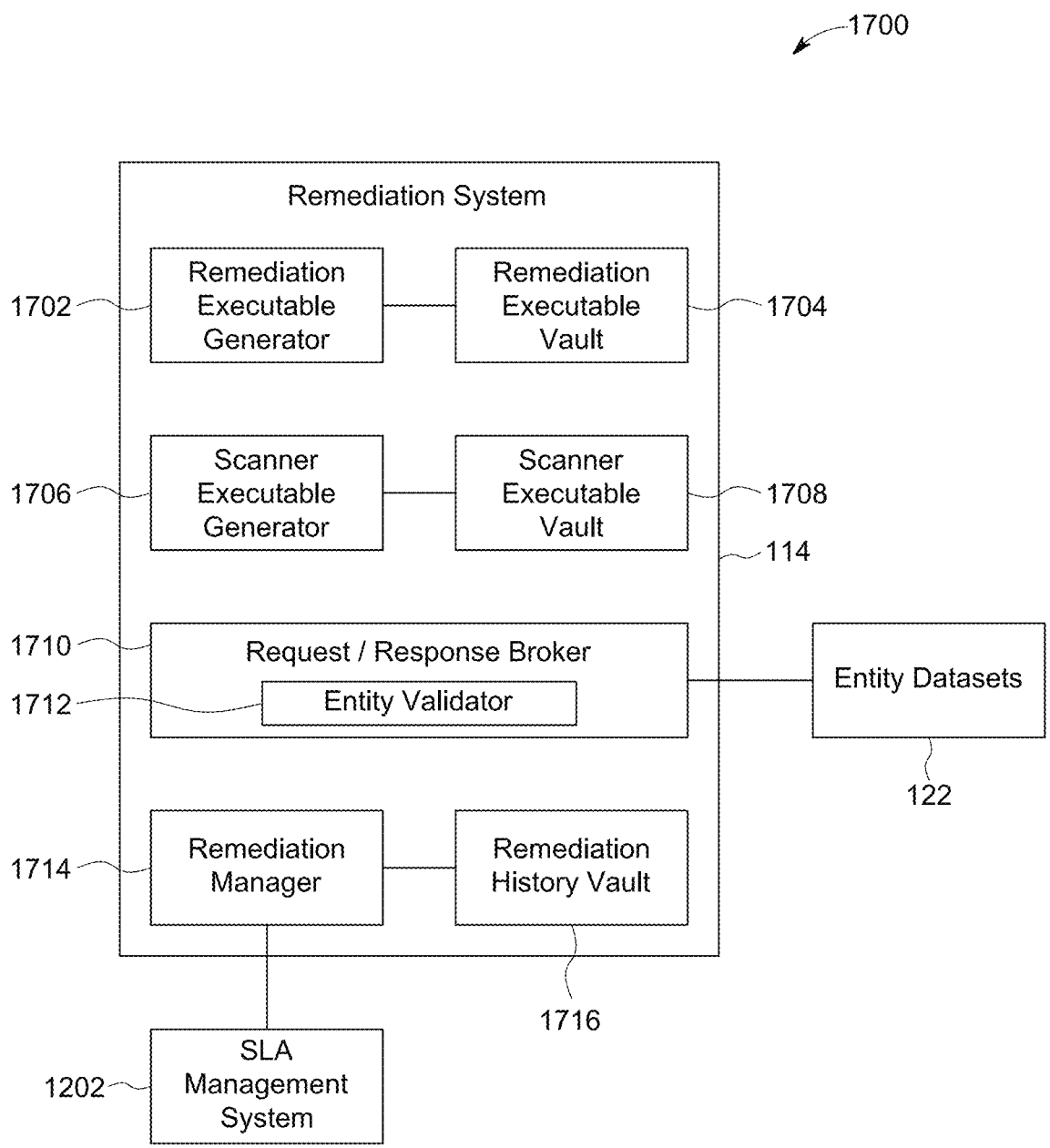
FIG. 17 is an example illustration of a remediation system of FIG. 1, according to some arrangements.

Now referring to FIG. 17, an example illustration 1700 of a remediation system 114 is shown, according to some arrangements. When a vulnerability is identified and not necessarily after a cybersecurity attack has taken place, the remediation system 114 is structured to support and/or execute remediation actions on a particular entity's infrastructure component. Accordingly, while traditional malware tools identify a malware component on a particular device after the component has been deployed or otherwise introduced to the target device (e.g., as a .dll, .exe, .sys or another type of executable file), the remediation system 114 identifies vulnerabilities before they are exploited (i.e. before malware is introduced to a particular target device.) In this vein, the remediation actions may include a variety of items, such as causing a software patch to be applied, causing a system and/or a port on a particular system to be shut down, and/or rerouting internet traffic to a decoy environment from a production environment. Generally, remediation actions can include temporary workarounds as well as permanent fixes. These items can be tracked relative to a service level agreement with the entity. Some remediation actions include causing the entity to perform an action (e.g., causing an entity to execute certain code provided to the entity). Some remediation actions include host-side remediation actions (e.g., preventing traffic from a particular node or application within an entity from reaching the host's systems by shutting down a host-side inbound interface).

In operation according to an example arrangement, device connectivity data for a particular entity (e.g., an organization's partner institution and/or vendor) is received by the remediation system 114. The device connectivity data can be received from a search and discovery engine for internet-connected devices, such as Shodan. Various properties (e.g., records, delimited values, values that follow particular predetermined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some embodiments, device connectivity data can be determined at least in part based on banner data exposed by the respective source entity. For example, device connectivity data can comprise metadata about software running on a particular device of a source entity.

Once a property is parsed from the device connectivity data, a vulnerability can be identified. The vulnerability can relate to the property (e.g., an application) or a combination of properties that includes the property (e.g., an application and port number). A hyperlink that includes a reference to a remediation executable is generated and transmitted to the entity. In some arrangements, a cybersecurity score is determined for the vulnerability and/or for the entity and the remediation process is initiated by generating and transmitting the remediation executable hyperlink to the entity only when the score is outside of a predetermined threshold (e.g., anything other than "low", any value exceeding 5). The remediation executable is provided to the entity via an entity-facing portal described in FIGS. 19-20. Once the entity remediates the vulnerability, the entity may electronically request a link to a rescan executable via the portal for a targeted scan. The rescan executable is structured to generate or receive updated device connectivity data to determine whether the vulnerability has been remediated.

As shown in FIG. 17, the remediation system 114 includes a remediation executable generator 1702 and a remediation executable vault 1704. When a vulnerability is identified, the remediation executable generator 1702 may generate a navigable link (e.g., a directory path, a file server reference, and/or a URL) to a remediation executable. The remediation executable may be any type of executable code (e.g., an .exe file, a .dll file, a .sys file) and may include pre-compiled computer-executable instructions to be executed in a target environment. In some arrangements, the remediation executable is a parametrized executable structured to accept parameter(s) for the target environment, such as the server path/name and/or application path/name. The remediation executable generator 1702 may retrieve the remediation executable and parametrize it using information determined by parsing device connectivity data for an entity, as described in reference to FIG. 18A.

In some arrangements, the remediation executable vault 1704 is populated manually by an administrator of the remediation system 114. In some arrangements, the remediation executable vault 1704 is populated by data received from an external data source, such as the National Vulnerability Database (NVD), CVSS, and other similar sources. Accordingly, in some arrangements, the data that informs the risk scoring model in the systems described elsewhere herein (e.g., in relation to FIG. 1) also informs the remediation options.

As shown, the remediation system 114 includes a scanner executable generator 1706 and a scanner executable vault 1708. When a vulnerability is identified and remediated, a user interface may be provided to an entity via the entity-facing portal. The user interface may include a user-interactive control for scanning the affected entity or component to determine that the vulnerability has been remediated. Accordingly, the scanner executable vault 1708 may store computer-executable code structured to start the process of obtaining updated device connectivity data. The computer-executable code may be parametrized to accept a particular entity identifier or component identifier. The scanner executable generator 1706 may use the data, parsed from the original device connectivity data set and indicative of the vulnerability, to parametrize the executable. For example, the executable can be parametrized using a domain identifier (e.g., a top-level domain (TLD) identifier, a subdomain identifier, or a URL string pointing to a particular directory), an IP address, a subnet, an application, a port number, etc.

As shown, the remediation system 114 includes a request/response broker 1710. The request/response broker 1710 is structured to mediate communications between a particular entity and host system. The request/response broker 1710 can be structured to access and/or manage entity identity information (e.g., entity profile information, such as that stored in the entity datasets 122). The communication endpoints may include the entity-facing portal such as that described in FIGS. 19 and 20. For example, a particular entity may use the portal to access remediation and targeted scan (rescan) executables. Accordingly, in some arrangements, the request/response broker 1710 includes an entity validator 1712. Prior to allowing a particular entity to initiate a rescan and obtain updated device connectivity data, the entity validator 1712 may be structured to receive, from the entity, a token. The token can be a combination of randomly generated alphanumeric characters, a hash of certain entity identifying information (e.g., entity profile identifier, entity name and/or entity URL), etc. The entity validator 1712 may compare the received token to a token previously generated and provided to the particular entity to ensure that the rescan request indeed comes from the entity. In some arrangements, the token may include one or more device identifiers (e.g., IP addresses, MAC addresses) for entity devices authorized to request a rescan. Accordingly, the entity validator 1712 may parse this information from the received token and cross-reference this information to information stored in the entity datasets 122 to determine that the rescan is being requested from a pre-approved device (e.g., an administrator device) within the entity. The operations herein improve the technology of allowing a particular entity to initiate a security scan on itself (versus other unauthorized entities) using a scanning tool external to the entity (i.e. the scanning tool managed by the remediation system 114).

As shown, the remediation system 114 includes a remediation manager 1714 and a remediation history vault 1716. The remediation manager 1714 is structured to receive device connectivity data (e.g., for a device associated with a particular entity) and generate a security profile based on the received device connectivity data. For example, the remediation manager 1714 may receive device connectivity data for a particular entity and determine the existence of any vulnerabilities in the received data (e.g., via direct analysis or via cross-referencing the data with other components of the multi-channel cybersecurity assurance computing system). The remediation manager 1714 may then generate and provide alerts (via email, portal notifications, SMS, etc.) to the entity regarding determined vulnerabilities. The alerts may include links to remediation executables and/or scanner executables parametrized for the particular entity. The alerts may also be delivered via the entity-facing portal of FIGS. 19 and 20.

The history of vulnerabilities may be tracked using the remediation history vault 1716. The information in the remediation history vault 1716 may include entity and/or entity component identifying information, such as domain identifier (e.g., a top-level domain (TLD) identifier, a subdomain identifier, or a URL string pointing to a particular directory), an IP address, and/or a subnet. The information in the remediation history vault 1716 may include vulnerability information (e.g., description, source, severity, etc.), references and/or parameters to remediation executable(s) and/or scanner executable(s), timestamps associated with the remediation timeline as represented by a history of electronic messages via the request/response broker 1710, etc. In some arrangements, the information in the remediation history vault 1716 may include archival (data retention) duration parameters that can be dynamically set based on the remediation timeline. For example, the data retention parameter may be initially set to a first value (e.g., 30 days, 60 days, 180 days). When it is determined that a vulnerability has been remediated within the timeframe defined by the first value, the data retention parameter may be set to a second, shorter value (e.g., 7 days, 14 days, 30 days). Accordingly, utilization of memory and other storage resources can be improved by dynamically setting data retention thresholds to the lowest possible value sufficient to remediate a particular vulnerability.

As shown, the remediation system 114 is communicatively coupled to the SLA management system 1202 of FIG. 12. In operation, the remediation system 114 may exchange electronic messages with the SLA management system 1202. For example, the remediation system 114 may identify a vulnerability on a particular entity device, determine the terms of a service level agreement that corresponds to the particular entity device, determine appropriate remedial action, and provide an executable related to the remedial action to the entity device. When the executable is executed by the entity, or when a fix or a workaround is otherwise applied, the remediation system 114 may provide a user interface to the entity to document the fix (i.e. as described relative to FIGS. 19 and 20) and may further determine the impact on the fix on the terms and KPIs of the service level agreement and generate a user interface for the entity comprising the updated service level agreement information reflective of the remediation.

Figure 20:
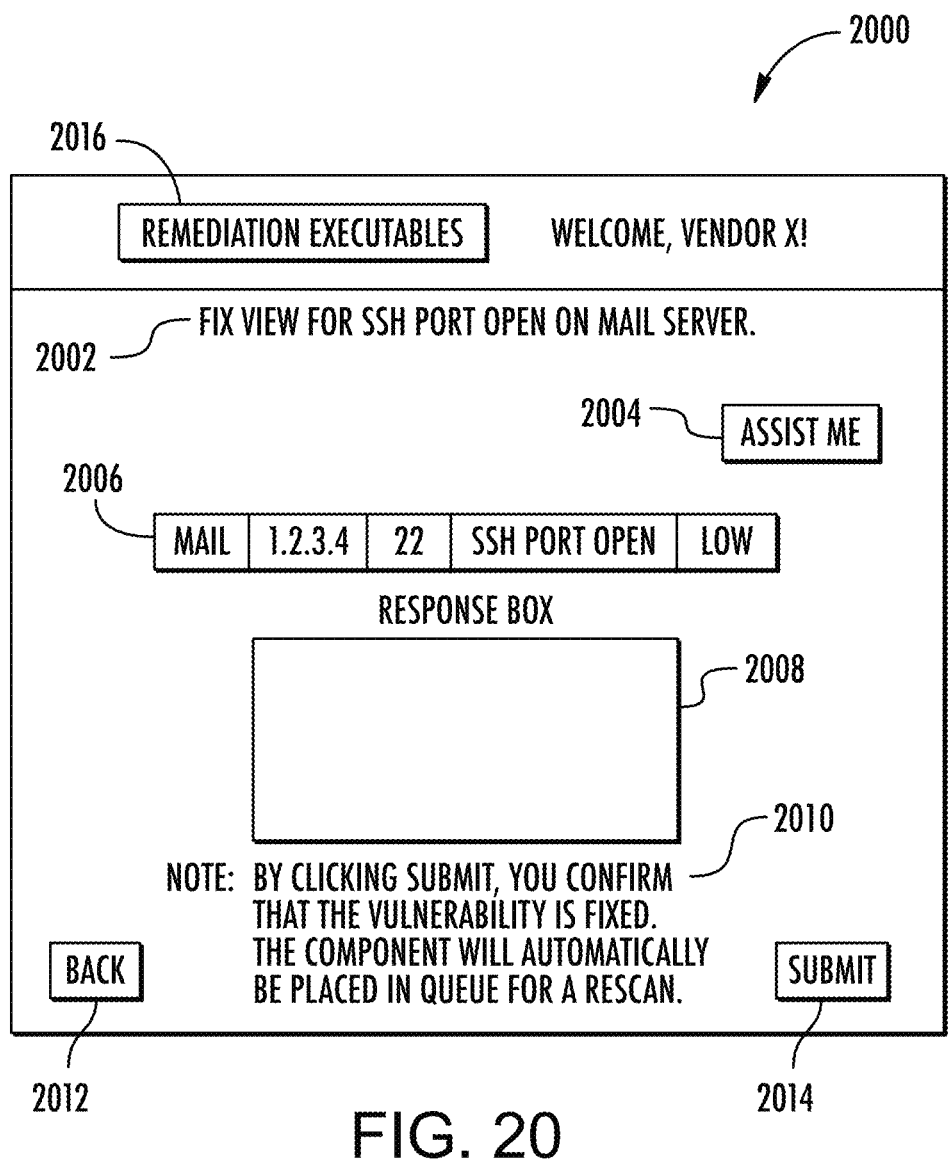
FIG. 20 is an example illustration of a second user-interactive graphical user interface for the entity-facing portal, according to some arrangements.

In operation, alerts generated by the remediation manager 1714 may include links to the entity-facing portal, which can be used by the entity to access and/or execute the remediation and/or scanner executables. Accordingly, the remediation manager 1714 may be communicatively coupled to the content management system 170 and/or the interface generator 174 of FIG. 1 (not shown). The remediation manager 1714 may cause the content management system 170 to generate and provide dynamic graphical user interfaces to a user associated with an entity (e.g., as illustrated in FIGS. 19 and 20). The remediation manager 1714 may communicate inputs of a user and metadata (e.g., descriptive data that provides context for other data) to the content management system 170, thereby acting as a proxy for data and information. Subsequently, the content management system 170 may then generate and provide content to the user. The content can be selected from among various resources (e.g., webpages, applications). For example, in various arrangements, a vulnerability alert dashboard may be integrated in an entity's application or provided via an Internet browser (e.g., as discussed below with reference to FIGS. 19 and 20).

Figure 18A:
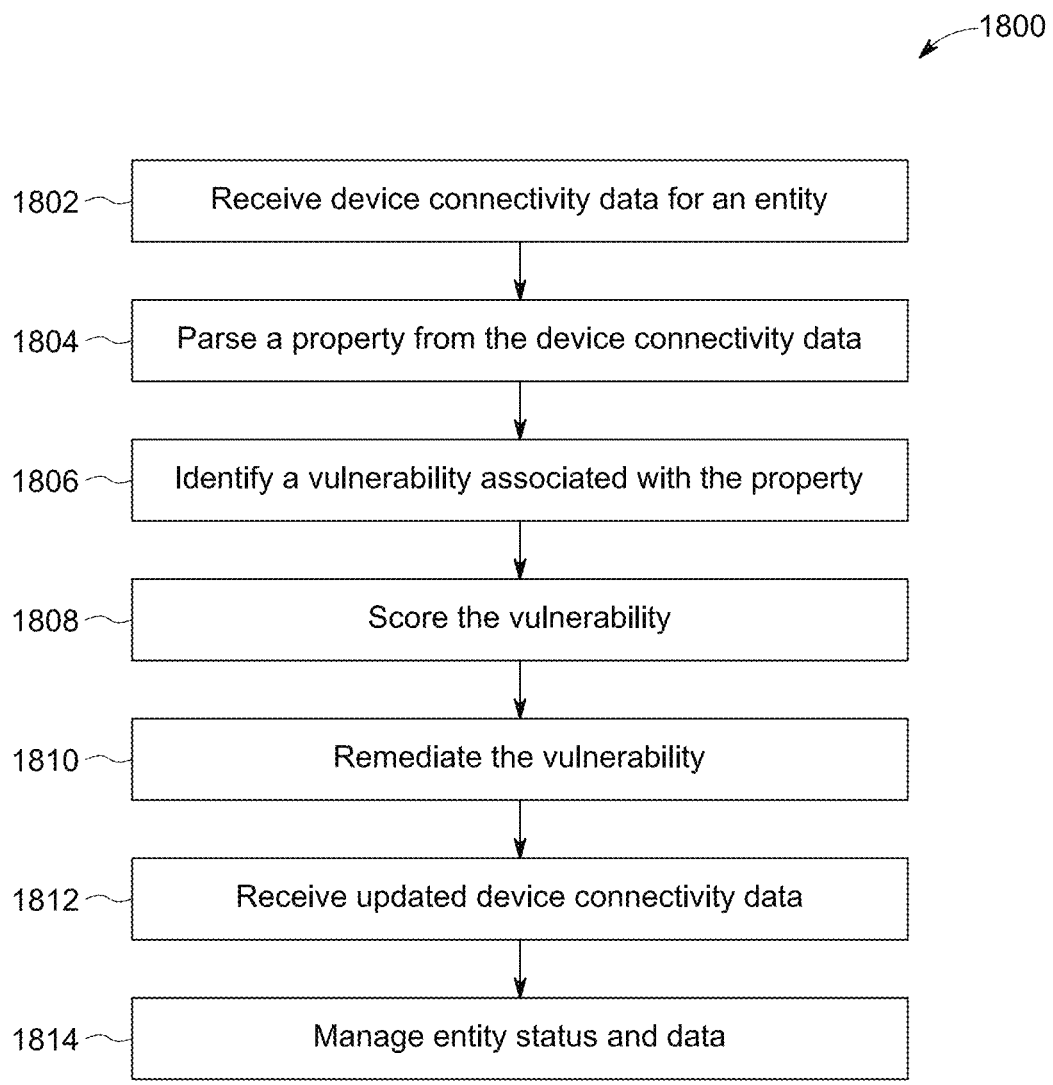
FIG. 18A is a flow diagram of a method for remediating vulnerabilities detected by the system of FIG. 1, according to some arrangements.

Now referring to FIG. 18A, a flow diagram of method 1800 for remediating vulnerabilities is shown, according to some arrangements. Method 1800 may be performed using the systems of FIGS. 1, 12 and/or 17. As a general overview, method 1800 includes receiving device connectivity data for an entity, parsing a property from the device connectivity data, identifying a vulnerability associated with the property, scoring the vulnerability, remediating the vulnerability, receiving updated device connectivity data, and managing entity status and data.

The method 1800 begins at process 1802 with the remediation manager 1714 of the remediation system 114 receiving device connectivity data (e.g., as discussed above, with reference to FIGS. 1-11) for an entity (e.g., vendor). The device connectivity data can be received from a search and discovery engine for internet-connected devices, such as Shodan. Various properties (e.g., records, delimited values, values that follow particular pre-determined character-based labels) can be parsed from the device connectivity data. The properties can include device-related data and/or IP traffic data. Device-related data can encompass data related to software, firmware, and/or hardware technology deployed to, included in, or coupled to a particular device. Device-related data can include IP address(es), software information, operating system information, component designation (e.g., router, web server), version information, port number(s), timestamp data, host name, etc. IP traffic data can include items included in packets, as described elsewhere herein. Further, IP traffic data included in the device connectivity data can include various supplemental information (e.g., in some arrangements, metadata associated with packets), such as host name, organization, Internet Service Provider information, country, city, communication protocol information, and Autonomous System Number (ASN) or similar identifier for a group of devices using a particular defined external routing policy. In some embodiments, device connectivity data can be determined at least in part based on banner data exposed by the respective source entity. For example, device connectivity data can comprise metadata about software running on a particular device of a source entity.

At process 1804, the remediation manager 1714 parses a property or a plurality of properties from the device connectivity data. According to various arrangements and depending on the structure of the data input, the process can include determining a delimiter and/or a data label and extracting the device connectivity data identified by the delimiter and/or the data label. For example, if device connectivity data is in a JSON file format or similar, the actual value for a port number ("80") can be preceded by a data label (e.g., "port number") and followed by a delimiter (e.g., a space, a colon, a semicolon, etc.) Accordingly, the output of the process 1804 is a collection of properties parsed from the device connectivity data.

At process 1806, the remediation manager 1714 identifies a vulnerability associated with a particular property. In some arrangements, the vulnerability data is determined and/or verified via a connected (e.g., via the network 130) component. In some arrangements, the vulnerability data is determined locally by the remediation system 114. For example, for each property in the collection of properties parsed from the device connectivity data, the remediation system 114 may reference the remediation executable vault 1704. If the property is found in the remediation executable vault 1704 previously populated with external data from NVD or a similar entity, the remediation manager determines 1714 determines that the property is associated with a vulnerability.

At process 1808, in some arrangements, instead of checking all parsed properties against the remediation executable vault 1704, the remediation manager 1714 is structured to cause the modeler 116 of FIG. 1 to risk-score the properties (as in FIG. 1-3) or to receive a list of already-scored properties. In some arrangements, only vulnerabilities associated with the properties where a score exceeds a predetermined threshold are remediated. Furthermore, in some arrangements, process 1808 may be facilitated by a third-party (e.g., a vulnerability reporting service). That is, the remediation manager 1714 may receive a scoring value (e.g., a Common Vulnerability Scoring System (CVSS) score, etc.) from a third-party. In some arrangements, the remediation manager 1714 may cross-reference vulnerabilities with a third-party computer system to derive such a score (e.g., CVSS) and subsequently determine a modified score based on the characteristics of the entity (e.g., as described above with reference to FIG. 13).

At process 1810, the remediation manager 1714 remediates the vulnerability.

In some arrangements, remediating a vulnerability includes executing an automatic action against a host (internal system) to protect the host from downstream impact of the vulnerability on the entity system(s). This may be done by generating, by the remediation executable generator 1702, a remediation executable parametrized to target an internal system or a component of an internal system. In some arrangements, the remediation executable is a parametrized set of executable instructions structured to enable a firewall for a particular application determined based on the device connectivity data. For example, all traffic flowing from a particular application on an entity's system determined to be a source of a cybersecurity attack (malware, ransomware, etc.) can be prevented from reaching the internal system(s). In some arrangements, the remediation executable is a parametrized set of executable instructions structured to cause internet traffic from a particular entity determined based on the device connectivity data to be diverted to a decoy computing environment. For example, all traffic flowing from a particular component (e.g., a component infected with a virus or highly vulnerable to be infected) on the entity's system (as determined, for example, based on an IP address or a subset thereof) is routed to a decoy environment rather than to a production environment. The decoy environment may include a server hosting a web page structured to display a "system inaccessible" message or similar. The routing can be accomplished by substituting the relevant destination parameters in the IP packet/traffic data originating from the particular component.

In some arrangements, remediating a vulnerability includes providing an alert to the entity system such that the entity can be made aware of and remediate the vulnerability. In an example arrangement, based on the determined vulnerability data, the remediation manager 1714 may generate or access a security risk profile (e.g., entity datasets 122) for the entity associated with the received device connectivity data. In some arrangements, the entity associated with the received device connectivity data may already have an existing security risk profile. In such an arrangement, the remediation manager 170 may then retrieve the existing security risk profile from the entity datasets 122.

Accordingly, the remediation manager 1714 retrieves from the entity datasets 122 external contact information for the entity. The external contact information may include a variety of information about the external contact, such as a name, a title (e.g., account manager), a phone number, an email, and/or API endpoint information (e.g., for initiating a push notification to an application associated with the entity and the provider institution). In some arrangements, the remediation manager 1714 may also retrieve internal contact information. The internal contact information may contain the same data points as discussed above (e.g., with reference to the external contact); however, the internal contact is associated with the provider institution. In such an arrangement, the internal contact may also receive vulnerability notifications in order to monitor the responsiveness of the entity with regards to the vulnerability.

Further, as part of the remediation process, the remediation manager 1714 generates and transmits a vulnerability notification based on the determined vulnerability data. For example, the remediation manager 1704 may determine (e.g., either directly or indirectly, as discussed above) that a vulnerability (e.g., an open port, an out of date application, etc., as discussed above relative to FIGS. 1-12) exists in the received device connectivity data and subsequently generate a vulnerability notification. In some arrangements, the vulnerability notification may be a human-readable alphanumeric message containing details of the vulnerability (e.g., affected component, IP/port of the affected component, a severity ranking, SLA terms associated with the vulnerability, etc.). In some arrangements, the vulnerability notification may simply state that a vulnerability exists and that the external contact should access the portal for more information. In some arrangements, the vulnerability notification includes a remediation executable generated by the remediation executable generator 1702 and parametrized specifically for the entity and the affected component. The parameter information may be determined based on one or more properties parsed from the device connectivity data. For example, the remediation executable can be referenced via a link to a patch structured to remediate a problem and/or further link(s) to instructions to execute the patch. The instructions may include step-by-step executable commands parametrized using the entity's affected component name(s), IP addresses, port numbers, etc. In another example, the remediation executable can be directly referenced as an .exe, where navigating to the link will cause the .exe to be executed (the patch to be downloaded, a command to shut down a certain port to be executed, etc.). The entity user can access and/or execute the remediation executable by clicking on the link.

The vulnerability notification may be transmitted via a variety of media (e.g., as agreed upon by the entity and the provider institution). The variety of media may include SMS, email, or a push notification to an application (e.g., via an API endpoint). The notification may be structured to allow the receiving entity to access the entity-facing portal from which remediation and scanning executables can be executed. In an example arrangement, the remediation manager 1714 provides (e.g., via a hyperlink in the vulnerability notification) a dynamically generated graphical user interface (e.g., generated at the time of access in order to present specific data) to the external contact. The dynamically generated graphical user interface (herein referred to as the portal) may contain a variety of information related to the vulnerability notification and other pending/current vulnerabilities (e.g., as identified by the security risk profile of the entity) associated with the entity (e.g., as discussed below, with reference to FIGS. 19-20). In some arrangements, the portal is provided to a user designated and authorized by the external contact (e.g., a developer working on the service).

Once a vulnerability is remediated by the entity (e.g., by executing the remediation executable or by performing other independent action), the entity device can use the portal to generate a request for a rescan of the relevant entity component. Accordingly, at process 1812, the remediation manager 1714 may receive updated device connectivity data, parse the updated device connectivity data for the particular property, and determine the remediation status based on the parsed data. The information accessible to the entity via the portal can be updated accordingly.

At process 1814, the remediation manager 1714 manages the entity status and data. One of skill will appreciate that process 1814 can be executed concurrently with other processes in method 1800. In some arrangements, at process 1814, the data in the remediation history vault 1716 can be retrievably stored and/or updated according to the progress of the remediation. For example, the archival parameters on a particular remediation instance record (e.g., the time-to-live property in MongoDB or similar) can be set to a shorter timeframe as remediation completes or to a longer timeframe if the remediation is not progressing as quickly as expected. In some arrangements, at process 1814, the data in the remediation history vault 1716 can be linked to a particular service level agreement from the SLA management system 1202. Performance relative to the service level agreement can then be automatically tracked based at least in part on data from the remediation history vault 1716. For example, the length of unscheduled downtime for a particular component can be determined based on the timestamp(s) in the remediation history vault 1716 that determine when the entity was notified of the vulnerability, when internal action (e.g., application firewall shutdown) was taken, and/or when the vulnerability was remediated. Accordingly, the systems herein provide a technical improvement of automatically tracking performance of a system component relative to an SLA.

Figure 18B:
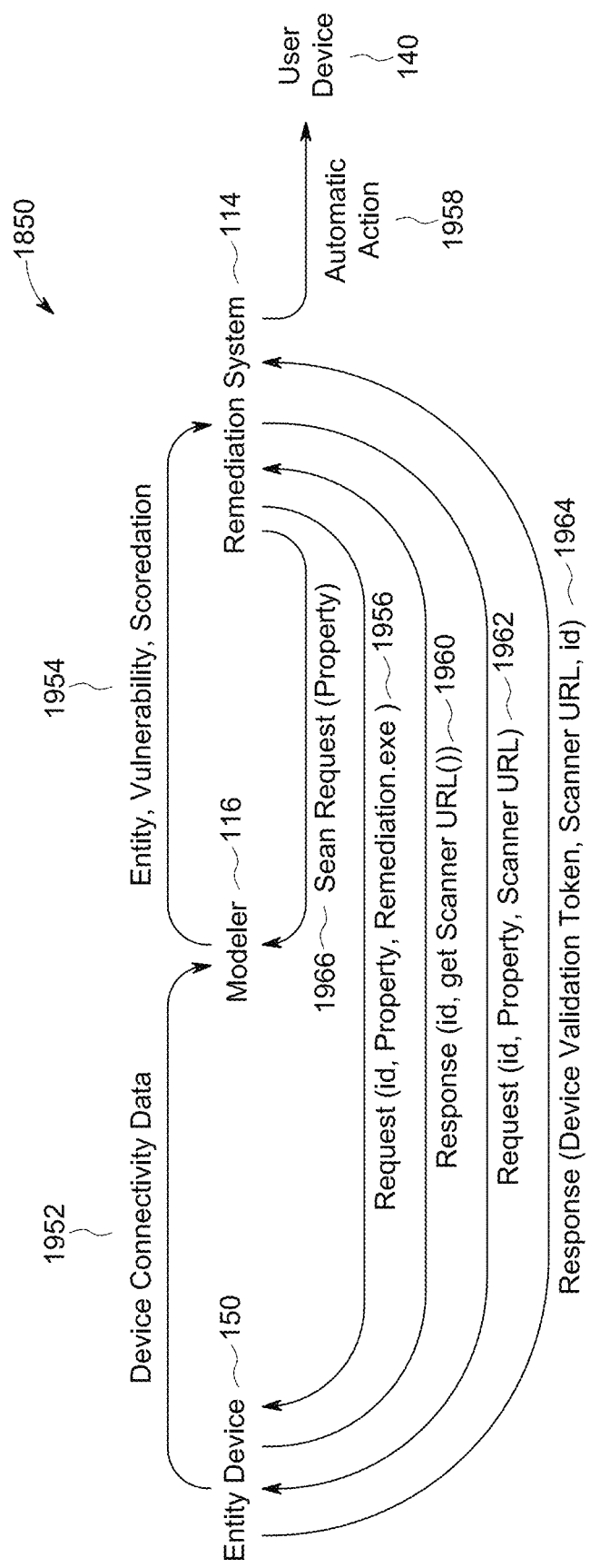
FIG. 18B is an event sequence diagram for remediating vulnerabilities detected by the system of FIG. 1, according to some arrangements.

Now referring to FIG. 18B, an event sequence diagram 1850 for remediating vulnerabilities is shown, according to some arrangements. The event sequence diagram 1850 further illustrates operations shown in FIG. 18A in some example arrangements. Generally, as shown, the event sequence diagram 1850 includes example electronic messages exchanged (as shown from left to right) between the entity device 150 of FIG. 1, modeler 116 of FIG. 1, remediation system 114 of FIGS. 1 and 17, and user device 140 of FIG. 1.

As referred to herein, the entity device 150 is a device that is part of a computing infrastructure of an entity. Although shown as a single entity device 150, it is understood that, in practice, the computing infrastructure of an entity will include multiple entity devices 150. A first entity device 150 may be the source of a particular vulnerability and a second entity device 150 may be an administrator device that allows the entity user to access the portal of FIGS. 19 and 20 to remediate the vulnerability. The modeler 116 can function similarly to the modeler 116 of FIG. 1 and, generally, may be structured to receive device connectivity data, parse device connectivity data, determine vulnerabilities based on the parsed data, and score the vulnerabilities. The remediation system 114 can function similarly to the remediation systems 114 of FIGS. 1 and 17. The remediation system 114 may be structured to receive parsed vulnerability data, generate and provide to the entity 150 various portal notifications and remediation executables, initiate requests for updated device connectivity data from the modeler 116, and cause various automatic actions to be performed on the user devices 140. The user devices 140 are the devices internal to an organization. The user devices 140 can be positioned downstream from the entity devices 150 and therefore may be vulnerable to the effects of vulnerabilities identified on the entity devices 150.

In an example arrangement, the modeler 116 receives device connectivity data (at 1952), determines and/or risk-scores a vulnerability, and transmits an electronic message to the remediation system 114 (at 1954). The remediation system 114 can receive in the electronic message of 1954 an entity identifier (e.g., from the entity profile of entity datasets 122 of FIG. 1 or 17), vulnerability and/or related properties parsed from the device connectivity data, and scoring-related data. The remediation system 114, based on receiving the electronic message (at 1954), can generate and provide a remediation request to the entity device 1950 (at 1956). The remediation request can include a request identifier, an entity identifier, the property affected by the vulnerability (e.g., IP address, subnet, device, application, port number), and a hyperlink to a first remediation executable parametrized based on the property. Further, the remediation system 114, based on receiving the electronic message (at 1954), can generate and provide a second remediation executable to the user device 140 (at 1958). The second remediation executable can be structured to perform an automatic action (e.g., port shutdown, enabling an application firewall, rerouting of traffic) structured to prevent the downstream effects of the vulnerability found on the entity devices 150.

The first remediation executable can be delivered to the entity via an entity-facing portal. Responsive to receiving (at 1956) a request to remediate the vulnerability, a user at the entity device 150 may interact with the portal to provide a response (at 1960). For example, the response may include an indication that the vulnerability has been remediated. The response can be parametrized using the request identifier previously provided by the remediation system 114. Accordingly, a history of a particular remediation can be tracked in the remediation history vault 1716 of FIG. 17, and each request and/or response can be timestamped. The response can include a parameter requesting a scanner URL. The parameter may further include property information such that only device connectivity data relevant to the vulnerability and its associated properties can be targeted for a rescan by the modeler 116.

Responsive to receiving the response (at 1960), the remediation system 114 may cause the scanner executable generator 1706 of FIG. 17 to generate information needed to prompt the user of the entity device 150 to confirm the parameters for a rescan. For example, in some arrangements, the remediation system 114 may use the request identifier previously provided by the remediation system 114 (at 1956) and returned (at 1960) to query the remediation history vault 1716 and determine the affected property from the device connectivity data. The affected property is the property associated with the vulnerability identified by the request identifier. Accordingly, network bandwidth is conserved by eliminating the need to include the affected property information in all requests and responses at 1956-1964.

The parameters for a scan may be provided (at 1962) back to the entity device 150. The parameters for the scan may be used to pre-populate portal controls for requesting a scan by the entity device 150, as described relative to FIGS. 19 and 20. Accordingly, technology is improved by preventing the user of the entity device 150 from requesting scans of components unrelated to the vulnerability and/or to the entity. The electronic message (at 1962) may further include a request for a token to verify the identity of the entity device 150 prior to performing a rescan at the request of the entity device 150. The token may have been previously provisioned to the entity device 150.

In response (at 1964), the entity device 150 may generate, via the portal, and transmit to the remediation system 114, an electronic message that includes the token and a scanner URL generated and parametrized based on the parameters selected, via the portal, by the user of the entity device 150 from the previously provided set of components available to be rescanned (at 1962). Prior to initiating a rescan based on the request, the remediation system 114 may validate the identity of the requesting entity device 150 using the token, as described in relation to FIG. 17. Upon successful validation, the remediation system 114 may generate and transmit an electronic message (at 1966) to the modeler 116, requesting updated device connectivity data.

Now referring to FIG. 19, an example illustration of a first user-interactive graphical user interface 1900 for an entity-facing portal is shown, according to some arrangements. Generally, FIG. 19 includes a display 1900, which is structured to provide an entity-facing portal. The entity-facing portal may perform various functions, including alerting an entity user to a vulnerability, allowing the entity user to access remediation executables, allowing the entity user to report fixes, allowing the entity user to rescan various components previously affected by the vulnerability to verify the fixes, etc.

Generally, the display 1900 may be provided to a user authorized with an entity (e.g., an account manager, administrator, etc.) and designated by the external contact, via the content management system 170 of FIG. 1. The interface generator 174 of the content management system 170 can generate customized user-interactive dashboards for one or more entities, such as the entity devices 150 and/or the third-party devices 155, based on data received from multi-channel cybersecurity assurance system 110, the service level agreement management system 1202, any other computing device described herein, and/or any database described herein. The generated dashboards can include various data (e.g., data stored in the content management database 176, assessments repository 1212, and/or multi-channel cybersecurity assurance vault 120) associated with one or more entities including cybersecurity risk scores (e.g., intelligence, perimeter, technology, and/or security controls), multi-dimensional scores, remediation items, remediation actions/executables, assessments, security reports, data analytics, graphs, charts, historical data, historical trends, vulnerabilities, summaries, help information, line of business profiles, domain information, and/or subdomain information.

As shown on the display 1900, the generated dashboard is a vulnerability alert dashboard. The vulnerability alert dashboard may be dynamically populated with the vulnerability data (e.g., as further discussed below) associated with an entity, as identified in the security risk profile.

The display 1900 (e.g., the vulnerability alert dashboard) includes a dashboard title 1902; dashboard columns 1904, 1906, 1908, 1910, and 1912; dashboard rows 1916, 1918, and 1920; a filter component 1914; a "FIX" button 1922; a "VIEW" button 1924; and a "REMEDIATION EXECUTABLES" button 1926. The dashboard title 1902, "LIST OF VULNERABILITES" as shown, provides a textual (e.g., string) classification of the contents of the screen.

The dashboard columns 1904, 1906, 1908, 1910, and 1912 are depicted as textual entries which classify the data held in the rows below them. For example, dashboard column 1904, "COMPONENT", identifies the contents of the rows below (e.g., 1916, 1918, and 1920) as component names and/or titles (e.g., the name of a component affected by a vulnerability). Similarly, dashboard column 1906, "IP", identifies the contents of the rows below as IP addresses (e.g., the IP address of the affected component). Dashboard column 1908, "PORT", identifies the contents of the rows below as port numbers (e.g., the port number of the affected component). Dashboard column 1910, "VULNERABILITY", identifies the contents of the rows below as vulnerabilities (e.g., a specific vulnerability title, such as the examples depicted). Dashboard column 1912, "SEVERITY", identifies the contents of the rows below as severity rankings (e.g., a severity ranking associated with the particular vulnerability).

The dashboard rows 1916, 1918, and 1920 represent data sets correlating to the vulnerability identified in dashboard column 1910 (e.g., as identified in the security risk profile of the entity). For example, dashboard row 1916 represents a data set correlating to a "LOW" severity vulnerability (e.g., "SSH PORT OPEN", as depicted), on the identified component (e.g., "MAIL", as depicted) and running at component address (e.g., "1.2.3.4:22", as depicted). Dashboard row 1918 represents a data set correlating to a "MEDIUM" severity vulnerability (e.g., "OUT OF DATE", as depicted), on the identified component (e.g., "APPLICATION X", as depicted) and running at component address (e.g., "1.2.4.3:75", as depicted). Similarly, dashboard row 1920 represents a data set correlating to a "HIGH" severity vulnerability (e.g., "CRITICAL BUG", as depicted), on the identified component (e.g., "APPLICATION Y", as depicted) and running at component address (e.g., "1.3.2.4:38", as depicted). In some arrangements, the dashboard rows are sorted and displayed according to the severity of the vulnerability (e.g., in an increasing or decreasing fashion).

The "FIX" button 1922 is structured to transition the authorized user to a "fix view" display (e.g., the display of 2000, as further discussed below with reference to FIG. 20), dynamically populated based on the correlating data set of the row in which it is contained.

In some arrangements, the "VIEW" button 1924 is structured to launch, open, and/or otherwise transition the authorized user to a virtual environment application of the provider institution (i.e., a front end to the remediation system 114 and/or modeler 116 of FIG. 1). The virtual environment application is configured to display raw vulnerability data of the scan(s) which identified the vulnerability. The virtual environment application is further configured to present a read-only environment to the authorized the user. In some arrangements, the read-only environment prevents data recording tools (e.g., screenshots) and further embeds tracking codes (e.g., a watermark which identifies the authorized user) into the displays in order to trace the origin of any leaks (e.g., data or document leaks).

The filter component 1914, (e.g., "FILTER BY: NONE", as depicted) provides the authorized user with an interactive component that dynamically filters the contents of the display 1900. The filter component 1914 may be implemented as a drop-down style menu, providing the authorized user with a selectable list of filter criteria (e.g., vulnerability type (e.g., open ports, bugs, out of date, etc.), vulnerability severity (e.g., LOW, MEDIUM, HIGH), etc. The display of 1900 (e.g., the vulnerability alert dashboard) may then be dynamically updated and refreshed in order to only display vulnerability data correlating to the selected filter criteria. For example, if the authorized user were to select a filter criteria of "LOW" vulnerability severity, the display of 1900 may dynamically update and refresh to display only dashboard rows with data sets correlating to "LOW" severity vulnerabilities (e.g., only the dashboard row 1916 in the depicted example would remain).

The "REMEDIATION EXECUTABLES" button 1926 is structured to transition the authorized user to a dynamically populated screen of downloadable files (e.g., executable files). In some arrangements, the downloadable files selected and dynamically populated being based on the list of current vulnerabilities relevant to the entity (e.g., as identified in the security risk profile). The selected downloadable files are structured to automatically resolve a current vulnerability of the entity (e.g., when executed on the affected component). In some arrangements, the downloadable files are pre-parametrized based on the property data parsed from the device connectivity data, such as the property data displayed in FIG. 19.

Now referring to FIG. 20, an example illustration of a second user-interactive graphical user interface for the entity-facing portal is shown, according to some arrangements. The display 2000 is provided to the authorized user responsive to a selection of a "FIX" button in FIG. 19 (e.g., the "FIX" button 1922). Generally, the display 2000 allows an entity user to report that the identified vulnerability has been resolved and/or request a rescan of the affected components on the entity's infrastructure.

The display of 2000 includes a dashboard title 2002, an "ASSIST ME" button 2004, a vulnerability summary bar 2006, a response box 2008, a disclaimer section 2010, a "BACK" button 2012, a "SUBMIT" button 2014, and a "REMEDIATION EXECUTABLES" button 2016. The dashboard title 2002, "FIX VIEW FOR SSH PORT OPEN ON MAIL SERVER" as shown, provides a textual classification of the contents of the screen.

The "ASSIST ME" button 2004 is structured to provide the authorized user with resources and contact information pertaining to the identified vulnerability (e.g., "SSH PORT OPEN", as depicted), in response to being selected (e.g., clicked). For example, in response to being selected, the "ASSIST ME" button 2004 may transition the authorized user to a dashboard that contains, for example, hyperlinks to articles discussing how to secure ports and contact information for a specialist located at the provider institution (e.g., a representative specializing in the technology relevant to the vulnerability).

The vulnerability summary bar 2006 provides a display of the data set correlating to the identified vulnerability (e.g., "SSH PORT OPEN", as depicted). The data set correlating to the identified vulnerability matches the data set provided in the dashboard rows of FIG. 19 (e.g., dashboard row 1916, as depicted) and is re-provided on the display of 2000 as a reference for the authorized user. In some arrangements, the vulnerability summary bar 2006 is not editable by the entity user to prevent requests for targeted scans other than on a need-to-know basis.

The response box 2008 is a text-entry area for the authorized user to submit a response parameter regarding the remediation of the identified vulnerability. Accordingly, the authorized user may enter (e.g., type, voice-to-speech, etc.) a response parameter into the response box 2008. Furthermore, in some arrangements, the response box may be structured to include an appeal selection component (e.g., a checkbox) which flags the response parameter as an appeal or contested response. For example, an entity may wish to submit that an alleged vulnerability is not actually a vulnerability, but rather an error in diagnostics. In such an arrangement, the vulnerability notification aspects of method 1800 (e.g., process 1810) may be temporarily suspended or silenced for a predetermined period of time (1 day, 3 days, 7 days, 30 days, etc.). The response parameter may subsequently be stored as part of the updated security risk profile (e.g., in response to selecting the "SUBMIT" button 2014, as discussed further below).

The disclaimer section 2010 is a message of intended use provided to the entity, regarding the "SUBMIT" button 2014. The message as depicted informs the authorized user that an implicit agreement occurs subsequent to selecting (e.g., clicking) the "SUBMIT" button 2014. In the depicted example, the implicit agreement informs the authorized user that selecting the "SUBMIT" button 2014 infers a confirmation of vulnerability remediation and an automatic queueing of the affected component for a targeted scan (e.g., as discussed above, with reference to FIGS. 17, 18A and 18B). In other arrangements, instead of or in addition to initiating a targeted scan when an entity user reports that a particular vulnerability has been resolved, the display 2000 may include a user-interactive control that allows the user to request a scan on particular components of the entity's infrastructure identified by the vulnerability summary bar 2006.

The "BACK" button 2012 is structured as a selectable (e.g., clickable) button that transitions the authorized user back to the display of FIG. 19 (e.g., without recording the response parameter and without queuing the affected component for a targeted scan).

The "SUBMIT" button 2014 is structured as a selectable (e.g., clickable) button that initiates the method 1800 from process 1810 (e.g., as discussed above, with reference to FIG. 18 and the disclaimer section 2010).

The "REMEDIATION EXECUTABLES" button 2016 is similarly structured in both function and form to the "REMEDIATION EXECUTABLES" button 1926 of FIG. 19. That is, button 2016 is structured to transition the authorized user to a dynamically populated screen of downloadable files (e.g., executable files).

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon)

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system comprising:
   a data channel structured to provide device connectivity data associated with an entity;
   a data channel communication network structured to communicate the device connectivity data from the data channel; and
   a processing circuit communicatively coupled to the data channel via the data channel communication network, the processing circuit structured to:
   identify a vulnerability associated with a property of the device connectivity data;
   generate a scanner uniform resource locator (URL) based on the property of the device connectivity data, the scanner URL comprising a parametrized scanner executable structured to accept as a parameter at least a part of the property of the device connectivity data; and
   transmit the scanner URL to a computing system.

2. The system of claim 1, wherein the processing circuit is further structured to:
   receive, from the computing system, a computer-executable instruction to scan the entity, the computer-executable instruction generated based on the scanner URL;
   provide, via the data channel, updated device connectivity data related to the computing system;
   parse the property from the updated device connectivity data;
   based on the property, determine whether the vulnerability exists on the computing system; and
   generate a cybersecurity risk score for the computing system.

3. The system of claim 2, wherein the processing circuit is further structured to:
   generate a token with the scanner URL based on the property of the device connectivity data;
   transmit the token to the computing system; and
   validate an identity of the computing system prior to providing the updated device connectivity data based on the token.

4. The system of claim 1, wherein the processing circuit is further structured to generate a remediation executable associated with the identified vulnerability prior to generating the scanner URL, and wherein the remediation executable comprises at least one of a patch or a parametrized set of executable instructions structured to remediate the vulnerability.

5. The system of claim 1, wherein the scanner URL is generated in response to performing operations to determine that a cybersecurity risk score associated with the entity exceeds a predetermined threshold.

6. The system of claim 1, wherein the scanner URL is generated in response to performing operations to determine that a generated cybersecurity risk score associated with the entity has exceeded a previously generated cybersecurity risk score.

7. The system of claim 1, wherein the scanner URL is generated in response to performing operations to remediate the vulnerability.

8. A computer-implemented method comprising:
receiving device connectivity data associated with an entity;
identifying a vulnerability associated with a property of the device connectivity data;
generating a scanner uniform resource locator (URL) based on the property of the device connectivity data, the scanner URL comprising a parametrized scanner executable structured to accept as a parameter at least a part of the property of the device connectivity data; and
transmitting the scanner URL to a computing system.

9. The method of claim 8, further comprising:
receiving, from the computing system, a computer-executable instruction to scan the entity, the computer-executable instruction generated based on the scanner URL;
providing updated device connectivity data related to the computing system;
parsing the property from the updated device connectivity data;
based on the property, determining whether the vulnerability exists on the computing system; and
generating a cybersecurity risk score for the computing system.

10. The method of claim 9, further comprising:
generating a token with the scanner URL based on the property of the device connectivity data;
transmitting the token to the computing system; and
validating an identity of the computing system prior to providing the updated device connectivity data based on the token.

11. The method of claim 8, further comprising generating a remediation executable associated with the identified vulnerability prior to generating the scanner URL, wherein the remediation executable comprises at least one of a patch or a parametrized set of executable instructions structured to remediate the vulnerability.

12. The method of claim 8, wherein the scanner URL is generated in response to performing operations to determine that a cybersecurity risk score associated with the entity exceeds a predetermined threshold.

13. The method of claim 8, wherein the scanner URL is generated in response to performing operations to determine that a generated cybersecurity risk score associated with the entity has exceeded a previously generated cybersecurity risk score.

14. The method of claim 8, wherein the scanner URL is generated in response to performing operations to remediate the vulnerability.

15. Non-transitory computer-readable media having instructions stored thereon that, when executed by a processor of a first computing system, cause the first computing system to perform operations comprising:
receiving device connectivity data associated with an entity;
identifying a vulnerability associated with a property of the device connectivity data;
generating a scanner uniform resource locator (URL) based on the property of the device connectivity data, the scanner URL comprising a parametrized scanner executable structured to accept as a parameter at least a part of the property of the device connectivity data; and
transmitting the scanner URL to a second computing system.

16. The media of claim 15, the operations further comprising:
receiving, from the second computing system, a computer-executable instruction to scan the entity, the computer-executable instruction generated based on the scanner URL;
providing updated device connectivity data related to the second computing system;
parsing the property from the updated device connectivity data;
based on the property, determining whether the vulnerability exists on the second computing system; and
generating a cybersecurity risk score for the second computing system.

17. The media of claim 16, the operations further comprising:
generating a token with the scanner URL based on the property of the device connectivity data;
transmitting the token to the second computing system; and
validating an identity of the second computing system prior to providing the updated device connectivity data based on the token.

18. The media of claim 15, the operations further comprising generating a remediation executable associated with the identified vulnerability prior to generating the scanner URL, wherein the remediation executable comprises at least one of a patch or a parametrized set of executable instructions structured to remediate the vulnerability.

19. The media of claim 15, wherein the scanner URL is generated in response to remediating the vulnerability.

20. The media of claim 15, wherein the scanner URL is generated in response to determining that a cybersecurity risk score associated with the entity exceeds a predetermined threshold.

* * * * *